US012271625B1

(12) United States Patent
Astolfi

(10) Patent No.: US 12,271,625 B1
(45) Date of Patent: Apr. 8, 2025

(54) KEY-VALUE ENGINE

(71) Applicant: The MathWorks, Inc., Natick, MA (US)

(72) Inventor: Anthony Paul Astolfi, Framingham, MA (US)

(73) Assignee: The Math Works, Inc., Natick, MA (US)

( * ) Notice: Subject to any disclaimer, the term of this patent is extended or adjusted under 35 U.S.C. 154(b) by 0 days.

(21) Appl. No.: 18/595,064

(22) Filed: Mar. 4, 2024

Related U.S. Application Data

(60) Provisional application No. 63/492,575, filed on Mar. 28, 2023.

(51) Int. Cl.
*G06F 3/06* (2006.01)
*G06F 16/22* (2019.01)

(52) U.S. Cl.
CPC .......... *G06F 3/0656* (2013.01); *G06F 3/0604* (2013.01); *G06F 3/0679* (2013.01); *G06F 16/2246* (2019.01)

(58) Field of Classification Search
CPC .... G06F 3/0656; G06F 3/0604; G06F 3/0679; G06F 16/2246
See application file for complete search history.

(56) References Cited

U.S. PATENT DOCUMENTS

| | | | | |
|---|---|---|---|---|
| 2018/0225321 | A1* | 8/2018 | Boles | G06F 16/9027 |
| 2020/0151268 | A1* | 5/2020 | Johnson | G06F 16/2246 |
| 2021/0406235 | A1* | 12/2021 | Killamsetti | G06F 16/2272 |
| 2023/0237029 | A1* | 7/2023 | Tal | G06F 16/215 |
| | | | | 707/692 |

OTHER PUBLICATIONS

Athanassoulis et al. "Designing Access Methods: The Rum Conjecture." *EDBT*, vol. 2016, pp. 461-466.
Becker et al. "An Asymptotically Optimal Multiversion B-Tree." *The VLDB Journal*, 1996, vol. 5, p. 264-75.
Bender et al. "An Introduction to B-Trees and Write-Optimization." *login; magazine*, vol. 40, No. 5 (2015). 7 pgs.
Bender et al. "Cache-Oblivious Streaming B-Trees." in *Proceedings of the nineteenth annual ACM symposium on Parallel algorithms and architectures*, 2007. (pp. 81-92).
Brodal et al. "Lower Bounds for External Memory Dictionaries." *SODA*, 2003, vol. 3, pp. 546-554.
Buchsbaum et al. "On External Memory Graph Traversal." *SODA*, 2000, pp. 859-860.

(Continued)

*Primary Examiner* — Robert W Beausoliel, Jr.
*Assistant Examiner* — Mohammad S Bhuyan
(74) *Attorney, Agent, or Firm* — Finnegan, Henderson, Farabow, Garrett & Dunner LLP

(57) ABSTRACT

A data storage system can implement a key-value engine configured for tunable read, write, and space amplification. The key-value engine can support multi-versioning, synchronous and asynchronous key updates, and read snapshots. The key-value engine is highly scalable and can support generalized parallel, in-memory computation. Experimental results demonstrate that a key-value engine consistent with disclosed embodiments can outperform a state-of-the-art production LSM-based key-value store in a wide range of metrics.

20 Claims, 39 Drawing Sheets

(56) References Cited

OTHER PUBLICATIONS

Comer, "Ubiquitous B-Tree." *ACM Computing Surveys (CSUR)* 11 (2), (1979): 121-37.
Conway et al. "(Splinterdb): Closing the Bandwidth Gap for {Nvme}{Key-Value} Stores." *2020 USENIX Annual Technical Conference,* USENIX ATC 20, 2020, pp. 49-63.
Dayan et al. "Optimal Bloom Filters and Adaptive Merging for Lsm-Trees." *ACM Transactions on Database Systems (TODS)* 43, No. 4 (2018): 1-48.
Dayan et al. "Monkey: Optimal Navigable Key-Value Store." *Proceedings of the 2017 ACM International Conference on Management of Data,* 2017, pp. 79-94.
Graefe, "B-Tree Indexes for High Update Rates." *ACM Sigmod Record 35,* No. 1 (2006): 39-44.
Idreos et al. "Key-value storage engines." *Proceedings of the 2020 ACM SIGMOD International Conference on Management of Data,* 2020, pp. 2667-2672.
Kim et al. "Lsb-Tree: A Log-Structured B-Tree Index Structure for Nand Flash Ssds." *Design Automation for Embedded Systems* 19, No. 1 (2015): 77-100.
Konishi et al. "The Linux Implementation of a Log- Structured File System." *ACM SIGOPS Operating Systems Review* 40, No. 3 (2006): 102-07.
Kruskal, "Searching, Merging, and Sorting in Parallel Computation." *IEEE Transactions on Computers* 32, No. 10 (1983).942-46.
Levandoski et al. "The Bw-Tree: A Latch-Free B-Tree for Log-Structured Flash Storage." *IEEE Data Eng. Bull.* 36, No. 2 (2013): 56-62.
O'Neil et al. "The Log-Structured Merge-Tree (Lsm-Trea)" *Acta Informatica* 33, No. 4 (1996): 351-85.
Rodeh et al. "Btrfs: The Linux B-Tree Filesystem" *ACM Transactions on Storage (TOS)* 9, No. 3 (2013): 1-32.
Twigg et al. "Stratified B-Trees and Versioned Dictionaries." 3rd Workshop on Hot Topics in Storage and File Systems, HotStorage 11, 2011.

\* cited by examiner

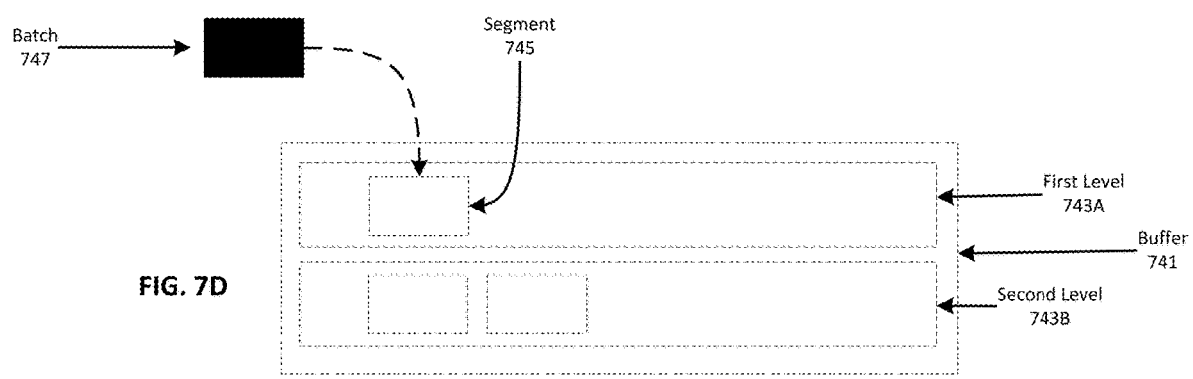
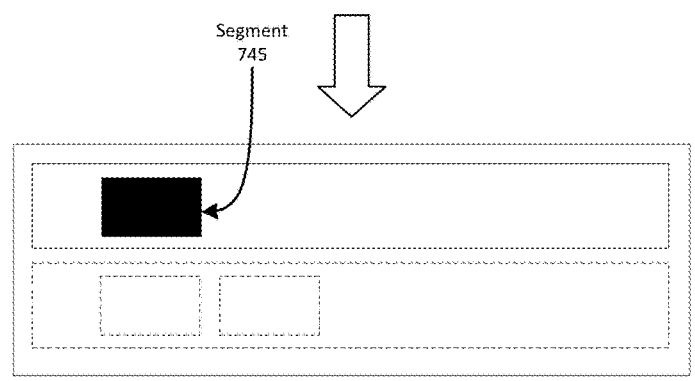

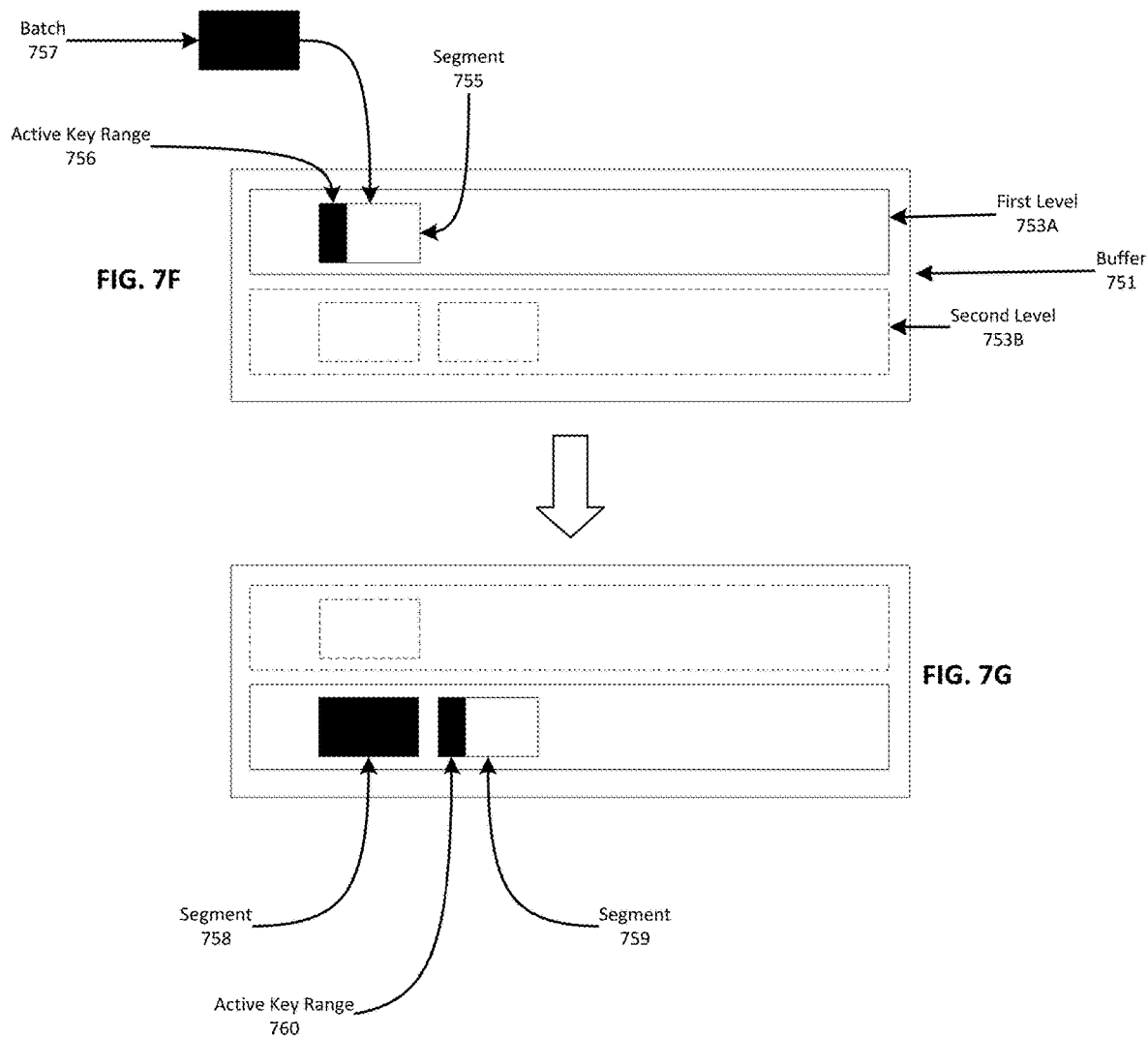

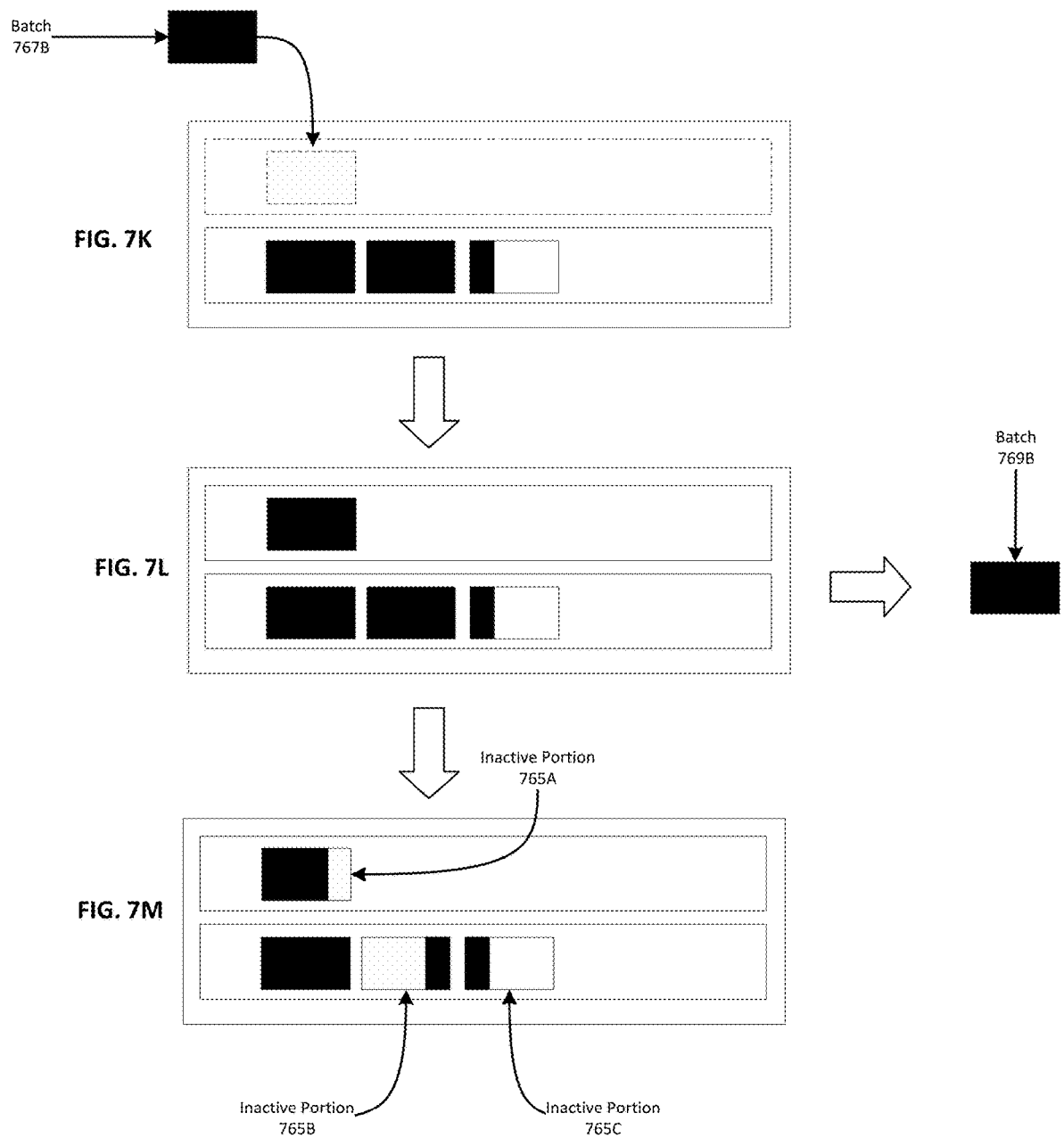

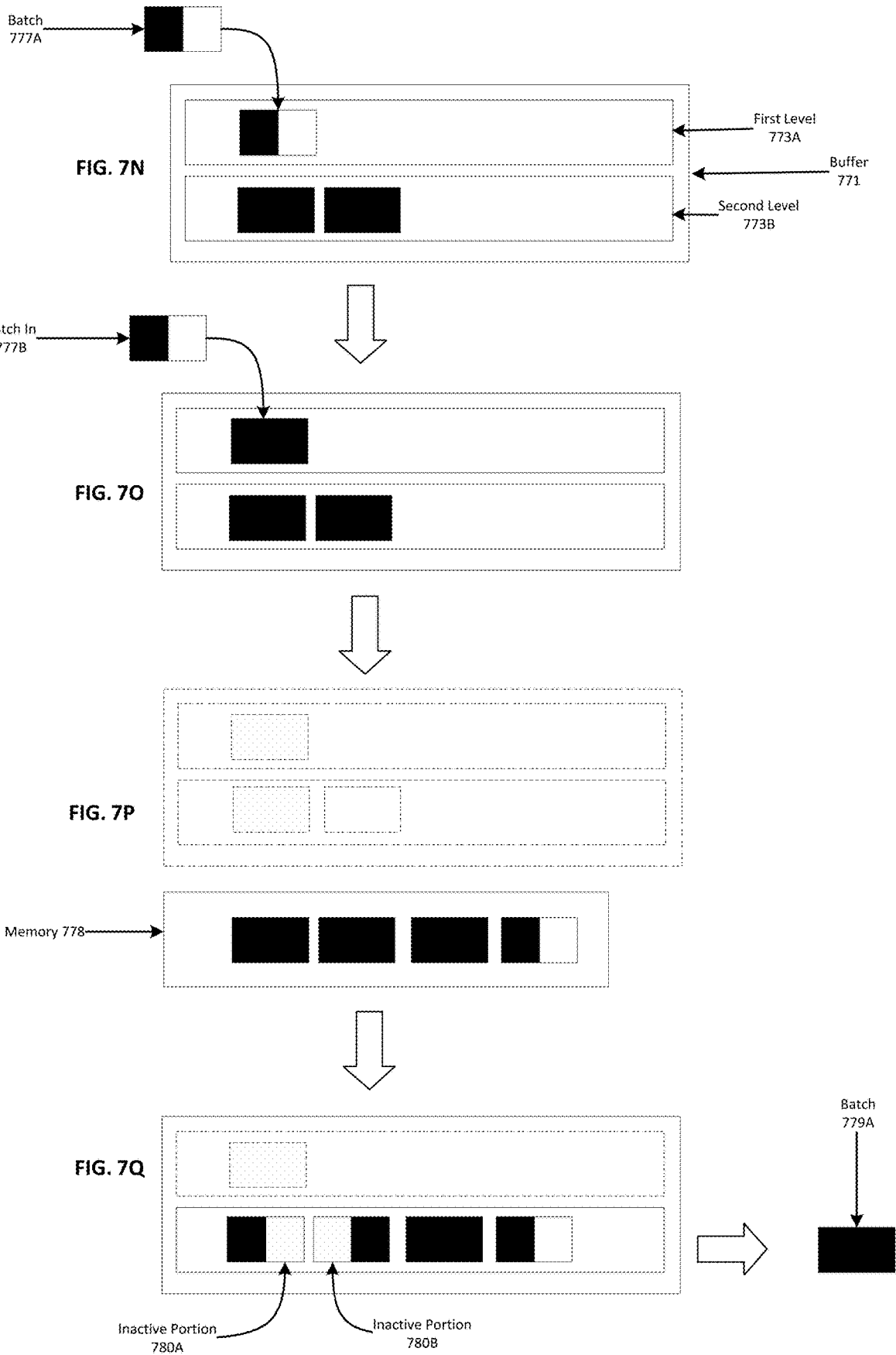

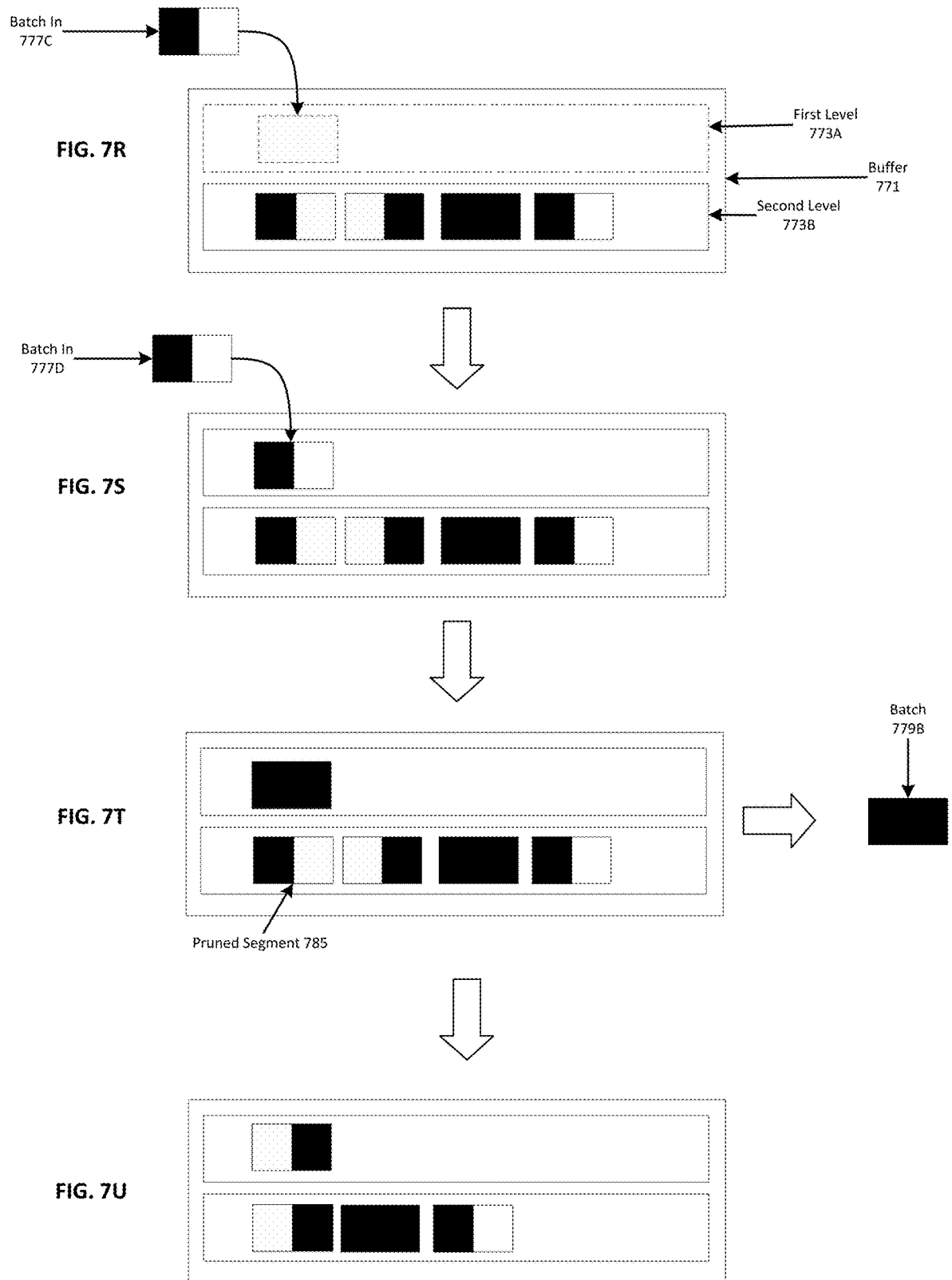

810

KEY-VALUE ENGINE

BACKGROUND

Key-value engines can be an important component of data storage systems, abstracting access to the physical hardware of the system and enabling innovation, optimization, and complexity management. However, the performance of a key-value engine can depend on the physical implementation and logical structure of the key-value engine. Conventional key-value engines build-in fundamental tradeoffs between certain performance characteristics. As a result, different tasks may require different key-value engines, increasing the complexity and maintenance burden of applications. Furthermore, conventional key-value engines are not configured to exploit the performance characteristics of existing solid-state memory technologies.

SUMMARY

The disclosed systems and methods concern at least a storage structure, a key-value engine configured to use the storage structure, and a data storage system configured to use the key-value engine.

The disclosed embodiments include a data storage system. The data storage system can include at least one processor and at least one computer readable medium containing instructions that, when executed by the at least one processor, cause the data storage system to implement a key-value engine. The key-value engine can include a storage structure including leaves and nodes. A first node can include child data indicating key ranges associated with child nodes of the first node. A first key range can be associated with a first child node. The first node can include a multi-level update buffer. The key-value engine can be configured to obtain a first batch of key-value entries; insert the first batch into the update buffer; determine satisfaction of an update condition for the first child node; extract a second batch of key-value entries from the update buffer; and provide the second batch to the first child node. The second batch can include key-value entries within the first key range.

The disclosed embodiments can include another data storage system. The data storage system can include at least one processor and at least one computer-readable medium containing instructions that, when executed by the at least one processor, cause the data storage system to perform operations. The operations can include appending a key-value entry to a write-ahead log. The operations can further include determining that a first portion of the write-ahead log satisfies a batch generation condition. The first portion of the write-ahead log can include the appended key-value entry. The operations can further include generating a first batch by deduplicating and sorting the first portion of the write-ahead log. The operations can further include writing the first batch to a storage structure including nodes and leaves. A first node of the storage structure can include first key-range pivots that indicate first child nodes and a first multi-level update buffer.

The disclosed embodiments can include a method of storing key-value entries. The method can include obtaining a first batch of key-value entries and applying the first batch to a storage structure. Application of the first batch can include inserting the first batch into an update buffer of a parent node in the storage structure. Application of the first batch can further include determining a buffer flush condition has been satisfied for a sub-structure inserted into the parent node. Application of the first batch can further include extracting, from the update buffer, a second batch of key-value entries, the second batch including key-value entries having keys within a key range associated with the sub-structure. Application of the first batch can further include generating an updated sub-structure by applying the second batch to the sub-structure. Application of the first batch can further include replacing, in the storage structure, the sub-structure with the updated sub-structure.

The disclosed embodiments include a method of retrieving at least one key-value entry. The method can include obtain including a search key range and search a storage structure for at least one key-value entry matching the search key range. The searching can include generating a first set of key-value entries matching the search key range by searching an update buffer of a root node of the storage structure. The searching can further include identifying a set of sub-structures having key ranges that overlap with the search key range. The searching can further include generating a second set of key-value entries matching the search key range by searching the set of sub-structures. The searching can further include generating the at least one key-value entry using the first set of key-value entries and the second set of key-value entries.

The disclosed embodiments include method of storing key-value entries in a multi-level buffer of a node in a storage-structure of a key-value engine. The method can include receiving a sorted batch of key-value entries and applying the sorted batch of key-value entries to the node. Application of the sorted batch of key-value entries to the node can include iterating through levels of the multi-level buffer, in each iteration updating the sorted batch of key-value entries by combining the sorted batch of key-value entries with key-value entries stored in a current level of the multi-level buffer until the current level of the multi-level buffer is inactive, and storing the sorted batch of key-value entries in the current level of the multi-level buffer.

The disclosed embodiments include a data storage system. The data storage system can include at least one processor and at least one non-transitory, computer-readable medium containing instructions. When executed by the at least one processor, the instructions can cause the data storage system to implement a key-value engine. The key-value engine can include a storage structure including nodes and leaves. A first node can include an update buffer containing key-value data. The first node can have child nodes. The key-value engine can be configured to: determine the update buffer satisfies a buffer flush condition; generate, in response to the determination, a batch of key-value data using the update buffer, wherein a size of the batch depends on a height of the first node in the storage structure and a space amplification parameter; and provide the batch to update a first child node of the child nodes.

The disclosed embodiments include a method of configuring a storage system. The method can include obtaining, by a key-value engine of the storage system, at least one of a space amplification parameter or a height-independent scaling parameter. The method can further include extracting, from an update buffer of a parent node in a storage structure implemented by the key-value engine of the storage system, a first batch of key-value data, wherein a size of the first batch depends on the at least one of the space amplification parameter or the height-independent scaling parameter. The method can further include providing the first batch of key-value data to a child node of the parent node.

The disclosed embodiments include a data storage system. The data storage system can include at least one processor and at least one computer readable medium containing instructions. When executed by the at least one processor, the instructions can cause the data storage system to implement a key-value engine. The key-value engine can include a storage structure including leaves and multiple levels of nodes. A first node can include pivots indicating child nodes associated with key ranges and an update buffer configured to store key-value entries. The first pivot can indicate a first child node associated with a first key range. The key-value engine can be configured to extract a batch of the key-value entries stored the update buffer and provide the batch to the first child node. The batch can include key-value entries within the first key range. A size of the batch can depend on a height of the first node in the storage structure and a value of a space amplification parameter.

The disclosed embodiments include a storage system. The storage system can include a key-value engine. The key value engine can include a storage structure in a first version comprising a root node connected to a child node. The child node can include a first node data portion, a second node data portion, and a child metadata portion, the child metadata portion including references to the first node data portion and the second node data portion. The root node can include a root metadata portion including a reference to the child metadata portion. The key-value engine can be configured to update the storage structure to a second version. The key-value engine can update the child node by generating an updated first node data portion containing updated key value entries and generating an updated child metadata portion containing references to the updated first node data portion and the second node data portion. In response to updating the child node, the key-value engine can update the root node by generating an updated root metadata portion containing a reference to the updated child metadata portion. The key-value engine can be configured to traverse the storage structure using the root metadata portion in response to a first scan request. The key-value engine can be configured to traverse the storage structure using the updated root metadata portion in response to a second scan request that specifies the second version.

The disclosed embodiments include a storage system. The storage system can include a key-value engine. The key value engine can include a storage structure including nodes. A first node can include a first data portion stored in a first type of solid-state memory. A size of the first data portion can be configured to align with an erasure block size of the first type of solid-state memory. The first data portion can be configured to store first key-value data. The first node can further include a metadata portion stored in a second type of solid-state memory. A size of the metadata portion can be configured to align with a sector size of the second type of solid-state memory. The metadata portion can be configured to store a first reference to the first data portion and a first filter for the first data portion. The key-value engine can be configured to read the metadata portion; load the first key-value data using the first reference to the first data portion; generate new data portions using the key-value data and the filter; and write the new data portions to the first type of solid-state memory.

The disclosed embodiments include a system for just-in-time computation. The system can include at least one processor and at least one non-transitory computer readable medium containing instructions. When executed by the at least one processor, the instructions can cause the system to perform operations for just-in-time computation. The operations can include storing batches of key-value data in a key-value engine. The key-value data can include an absolute key and relative keys for a first key. The relative keys can specify operators. The operations can further include receiving a request for a current value of the first key. In response to the request, the system can generate a key-value entry for the first key. Such generation can include retrieving the absolute key and the relative keys for the first key and combining the absolute key and the relative keys to generate the key-value entry for the first key. In response to the request, the system can further provide a response including the key-value entry for the first key.

As may be appreciated, the disclosed embodiments further include methods, systems, and computer-readable media corresponding to the above systems and methods.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings.

DETAILED DESCRIPTION

Figure 1:
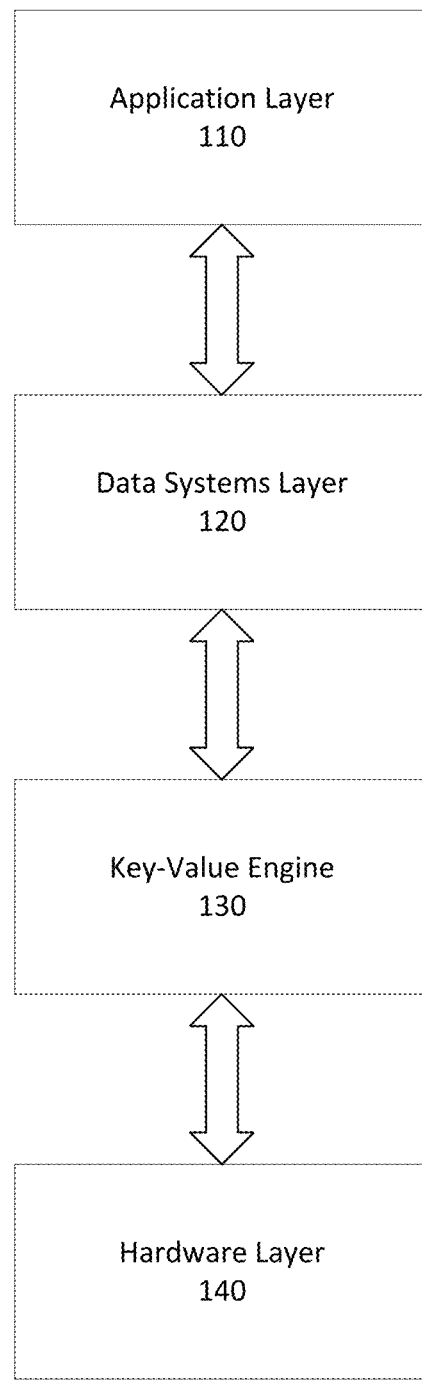
FIG. 1 depicts an exemplary data storage and management system, consistent with disclosed embodiments.

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. For example, unless otherwise indicated, method steps disclosed in the figures can be rearranged, combined, or divided without departing from the envisioned embodiments. Similarly, additional steps may be added, or steps may be removed without departing from the envisioned embodiments. Thus, the materials, methods, and examples are illustrative only and are not intended to be necessarily limiting.

A key-value engine can be an important component of a data storage system. A key-value engine can form a stand-alone data store (e.g., DynamoDB, Redis, Cassandra, or the like) or a low-level layer supporting implementation of other databases (e.g., relational databases, streaming and graph databases, filesystems such as ZFS/BTRFS, object storage systems like Amazon S3, or the like). A key-value engine can enable a data storage system to provide applications powerful capabilities using a suitable data model/API (e.g., implemented by a data systems layer), without dealing directly with the underlying hardware. As may be appreciated, the performance of the data storage system can depend on the performance of the key-value engine. In turn, the performance of a key-value engine can depend on the physical implementation and logical structure of the key-value engine.

The physical implementation of the key-value engine can depend on the physical storage media used by the data storage system. In some embodiments, the data storage system can include different types of physical storage media suitable for different usage patterns. For example, the data storage system can include various types of solid-state, computer-readable media, such as volatile memory (e.g., dynamic random-access memory, or the like), flash memory (e.g., NOR or NAND memory, or the like), or other types of non-volatile memory (e.g., capacitor-or battery-backed dynamic random-access memory, 3D cross point or phase change storage, spin-transfer torque magnetic random access memory, resistive random access memory, or the like). The data storage system may include different types of flash memory that may have different performance characteristics. For example, more-expensive, single-level cell (SLC) NAND may provide higher performance and greater resistance to wear, while less-expensive, multi-level cell NAND (e.g., three-level cell NAND, or the like) may provide higher data density.

Flash memory can comprise cells arranged into sectors, which in turn can be arranged into blocks. Read and write operations can be performed on sectors. However, a write operation may require the sector have a known state (e.g., an unwritten or erased sector may have a known state). In contrast, erase operations can be performed on blocks. Accordingly, rather than overwrite key-values stored in a sector as those values are modified, a controller for the solid-state, computer-readable media can be configured to write a new sector containing the new values. The old sector can then be identified as containing "stale" data. Once a block contains a sufficiently large number of stale sectors, a controller for the solid-state, computer-readable media can collect the remaining un-stale sectors, write them to a new block, and erase all the sectors in the old block. Individual cells may support a limited number of erase cycles. Therefor writes (and erasures) should be spread evenly over the blocks of the memory.

As may be appreciated, such flash memory may be well-suited for writing data in logical chunks aligned with the physical sub-components (e.g., sectors, erasure blocks, or the like) of the flash memory. However, such flash memory may be unsuited for writing sub-sector amounts of data to random logical addresses in memory. In contrast, other types of non-volatile memory can be addressed at a much more granular level than flash memory without a performance reduction or decrease in device lifetime (e.g., byte-addressable memory, or the like). Such types of memory may be more suitable for small writes.

Figure 11:
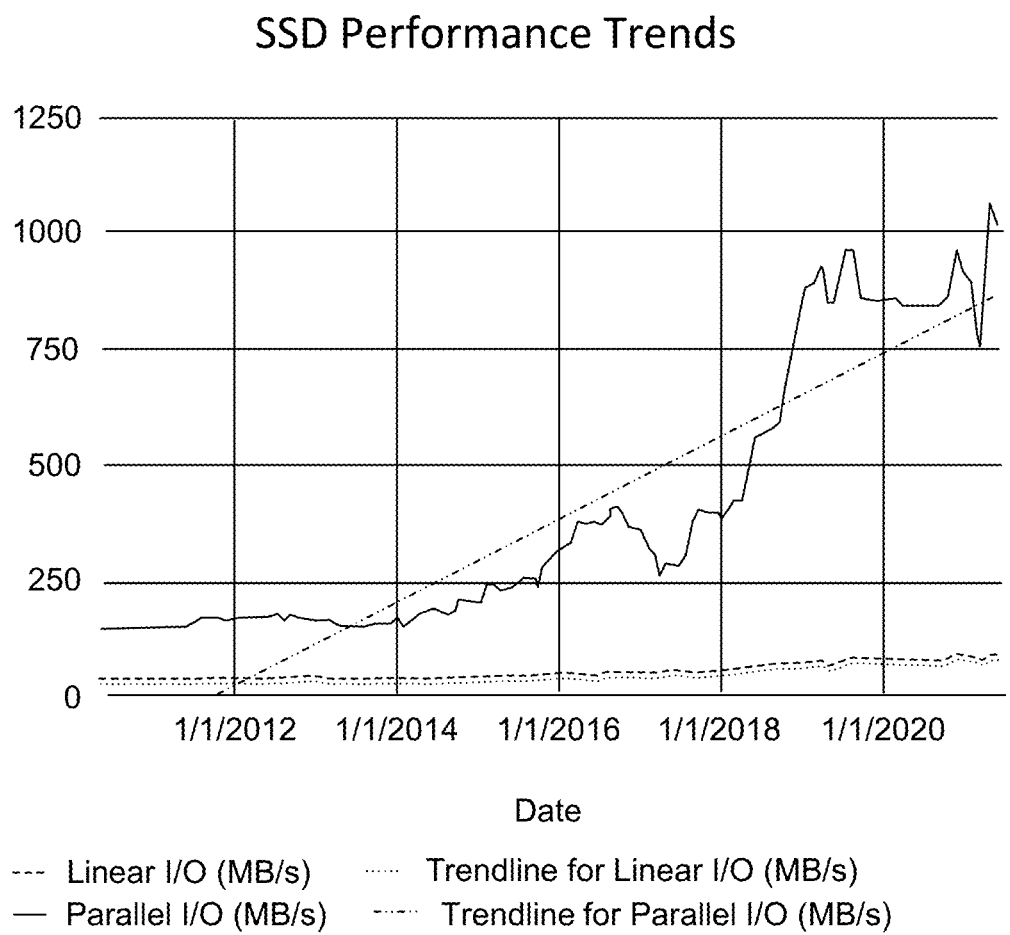
FIG. 11 depicts historical improvements in parallel I/O performance and linear I/O performance over time.

Furthermore, conventional data storage systems may be characterized by an increasing "bandwidth gap." As depicted in FIG. 11 and discussed herein, historical improvements in bandwidth have been substantially greater than reductions in latency. Such a bandwidth gap can make latency an important bottleneck in storage system performance and favor increasing parallelization of input/output (I/O) operations.

The logical structure of the key-value engine can affect performance characteristics including write amplification, read amplification, and space amplification. In general, these performance characteristics trade off against each other (according to a trilemma is commonly known as the RUM Conjecture). Thus key-value engines must attempt to balance write amplification, read amplification, and space amplification.

Write amplification can indicate a difference between the logical amount of data written to a database and the physical amount of data written to a storage system implementing the database. For example, an application can write a key-value entry to a database. A storage system implementing the database may require multiple writes to store the same key-value entry in the storage device.

Similarly, read amplification can indicate a difference between the logical amount of data read from a database and the physical amount of data read by a storage device implementing the database. For example, an application can read a key-value entry from a database. A storage system implementing the database may require multiple reads to retrieve the same key-value entry from the storage device. As may be appreciated, greater write and read amplification can decrease the performance of a storage device (e.g., due to bandwidth limitations and due to accelerated wear).

Space amplification can indicate a difference between the logical amount of data stored on a database and the physical amount of data stored on a storage device implementing the database. For example, a key-value entry may have a particular size (e.g., in bytes, or another suitable measure). A storage system implementing the database may require some multiple of that size to store the key-value entry in the storage device. As may be appreciated, increased space amplification can decrease the performance of a storage device (e.g., due to capacity constraints).

The performance characteristics of a key-value engine can depend on the data structures used to implement the key-value engine. Conventional key-value engines are often implemented using one of two different data structure types: the B-Tree family (e.g., traditional B-Trees, B+Trees, B*-Trees, or the like, collectively referred to as B-Trees) or Log-Structured Merge (LSM) Trees. Fundamental design differences between these two data structure types drive differences in key-value engine performance characteristics.

Different applications may have different read, write, and space amplification requirements. Applications that benefit from improved read performance typically favor B-Tree-based systems, while applications that benefit from improved data ingestion and update performance typically favor LSM-based systems, leading to a fragmented landscape of data management systems. Furthermore, some applications may perform different tasks with different read, write, and space amplification requirements. Such applications may require different data storage systems for these different tasks, increasing the complexity and decreasing the reliability of such applications.

The disclosed embodiments include scalable key-value engines configured for improved performance on conventional data storage systems and tunable read, write, and space amplification. As described herein, such key-value engines can support multi-versioning, generalized parallel computation, synchronous and asynchronous key updates, and read snapshots. Experimental results demonstrate that a key-value engine consistent with disclosed embodiments can outperform ROCKSDB, a state-of-the-art production LSM-based key-value store, over multiple metrics.

The disclosed embodiments are configured to address the differing performance characteristics of different types of physical memory. A key-value engine consistent with disclosed embodiments can include a write-ahead log and a storage structure. The write-ahead log can be configured to collect relatively large numbers of small updates, while the storage structure can be updated through relatively larger, infrequent writes. Furthermore, the storage structure can be implemented to separately store data and metadata referencing the data. The data can be stored in larger portions than the metadata, and the metadata can be rewritten more frequently than the data.

In some embodiments, different components of the key-value engine can be implemented using different, suitable types of physical memory. For example, the write-ahead log can be implemented using granularly addressable non-volatile memory (e.g., battery-backed DRAM, 3D cross point or phase change storage, spin-transfer torque magnetic random-access memory, resistive random-access memory, or the like), while the storage structure can be implemented using flash memory. In some embodiments, different components of the storage structure can be implemented using different, suitable types of flash memory. For example, metadata can be stored using single-level-cell (SLC) NAND, while data can be stored using multi-level-cell (MLC) NAND.

The disclosed embodiments are further configured to exploit the high bandwidth of conventional data storage systems. The scan and insert operations performed by the disclosed key-value engine are highly parallelizable, taking advantage of the high-bandwidth of existing systems by enabling multiple simultaneous reads or writes.

As described herein, fundamental design choices can drive key-value engine performance characteristics for conventional key-value engine architectures. In contrast, the disclosed key-value engine can be tuned to satisfy different read, write, and space amplification requirements using a space amplification parameter and a height-independent scaling parameter. Therefore, unlike conventional key-value engines, the disclosed key-value engine can be used for applications having different performance requirements (or different tasks within such applications). In some embodiments, tuning parameters can be altered dynamically, during operation of the key-value engine. Thus, the same key-value engine can be adapted to changing workloads, further simplifying application design.

Consistent with disclosed embodiment, the disclosed key-value engines can support multi-versioning. As a storage structure of a key-value engine is updated with new values, prior versions of the storage structure can remain accessible. In some embodiments, portions of the storage structure are associated with unique identifiers and updates written to the storage structure do not overwrite previously written portions. Instead, new portions are generated as needed to store updated metadata or updated key-value data. Updated metadata can include references to the unique identifiers of other portions containing updated metadata or updated key-value data, as well as references to existing, unchanged portions. Portions containing metadata and key-value data are sized to reflect the frequency with which these portions are updated during operation of the key-value engine. As unchanged portions containing metadata and key-value data persist, a prior version of the storage structure can remain accessible through a root node or checkpoint associated with that prior version of the storage structure.

Consistent with disclosed embodiment, the disclosed key-value engine can support a parallel computation system. As described herein, the key-value engine can be configured to support keys having absolute and relative values. The key-value engine can write relative values to the write-ahead log (and ultimately to the storage structure) as they are received. However, the key-value engine need not determine the absolute value for a key until a scan request for that key is received. Should the key-value engine write an absolute value to the write-ahead log, previously received relative values can be ignored, averting computational costs associated with processing such relative values. In this manner, a computation can be written to memory and then evaluated lazily when and if the result of that computation is required.

As may be appreciated, write requests and scan requests can be implemented using multiple independent processes, threads, cores, or the like. Furthermore, write and scan requests can be implemented for multiple keys at the same time. A scan request for multiple keys can involve collecting batches of keys satisfying the scan request and combining the batches by key. Such an operation can be implemented using a map-reduce framework, in which multiple mappers process individual batches of key-value data and provide the batch results of such processing to reducers that combine the batch results to generate key-level results (e.g., an absolute value for each key).

Data Storage System

FIG. 1 depicts an exemplary data storage system 100, consistent with disclosed embodiments. System 100 can include multiple layers, such as an application layer (e.g., application layer 110), a data systems layer (e.g., data systems layer 120), a key-value engine (e.g., key-value engine 130), and a hardware layer (e.g., hardware layer 140). As may be appreciated, the disclosed system 100 is not intended to be limiting. In some embodiments, layers may be combined (e.g., data systems layer 120 and key-value engine 130 can be combined, or key-value engine 130 and hardware layer 140 can be combined, or the like). For example, key-value engine 130 may be implemented directly on top of the storage hardware (e.g., an SSD may even contain a key-value store in the firmware). In some embodiments, additional layers may be used (e.g., a file system layer can mediate between key-value engine 130 and hardware layer 140, or the like).

Consistent with disclosed embodiments, applications running in application layer 110 can provide high-level requests to read or write data. These requests can be provided to data systems layer 120. Data systems layer 120 can be configured to provide simplified access to data accessible to system 100. Data systems layer 120 can be configured to provide an interface for requests from application layer 110 that hides the details or complexity of a particular data store. In some embodiments, data systems layer 120 can be configured to generate requests to scan or update a key value store based on the read and write requests received from application layer 110.

Consistent with disclosed embodiments, data systems layer 120 can provide requests to scan or update a key value store to key-value engine 130. Key-value engine 130 can be configured to provide an interface for requests from data systems layer 120 that hides how key-value data is stored (e.g., hiding components such as a cache structure, write-ahead log, and storage structure, as described herein). Consistent with disclosed embodiments, key-value engine 130 can enable the storage and retrieval of values using keys associated with the values.

In some embodiments, key-value engine 130 can provide requests to write data to hardware layer 140. As described herein, key-value engine 130 may be configured to provide write requests, but not update or delete requests, to hardware layer 140. In some embodiments, hardware layer 140 can be responsible for I/O operations with a computer readable media configured to store the key-value data. In some embodiments, hardware layer 140 can perform additional operations, such as garbage collection and wear leveling.

Key-Value Engine Architecture

Consistent with disclosed embodiments, a key-value engine can be configured to store key-value data including fixed or variable-length keys and fixed or variable-length values. A key-value entry can include a key serving as a unique identifier for a corresponding value. The disclosed embodiments are not limited to any particular structure or format of keys or values. In some embodiments, keys (and associated values) can be stored as byte strings.

In some embodiments, values for keys can be absolute values. Such absolute values do not rely on or refer to some other value. In some embodiments, values for keys can be absolute values or relative values. Relative values can rely on or refer to another value. As an example of an absolute value, a key can have the value "alpha" (e.g., an ASCII-encoded byte string). The command PUT{"bravo" } can instruct the key-value engine to overwrite the value "alpha" with the value "bravo". The command DELETE can instruct the key-value engine to delete the key and the associated value. As an example of a relative value, the command ADD_I32{+1} can cause the key-value engine to interpret the current value (e.g., "alpha") as a 32-bit little endian byte order integer and modify this value by adding 1. A key containing a relative value can be a "relative key." A key containing an absolute value can be an "absolute key."

In some embodiments, a relative value for a key can rely on or refer to another value for that key. Additionally or alternatively, a relative value for a key can rely on or refer to another value for another key. In some embodiments, a relative value can be expressly or implicitly associated with an operator. In some embodiments, such operators can include increment, decrement, sum, divide, multiply, truncate, bit-shift, exponentiate, sign flip, log, absolute value, dot product, cross product, invert, logical (e.g., or, and, nand, xor, not, and the like) min, and max operators, or other suitable operators. For example, a relative value for a key can expressly or implicitly specify summing the relative value for the key with another value for the key.

In some embodiments, a key-value engine can determine the value for a key by merging an absolute key and any subsequently stored relative keys. For example, in response to three insertion requests for key $k_1$, a key-value engine can insert into a storage structure the absolute value 1, the relative value increment 2, and the relative value exponentiate 2. In response to a read request for key $k_1$, the key-value engine can generate and return the value 9. In response to another insertion request for key $k_1$, the key-value engine can insert the absolute value 4. In response to another read request for key $k_1$, the key-value engine can return the absolute value 4.

Figure 2:
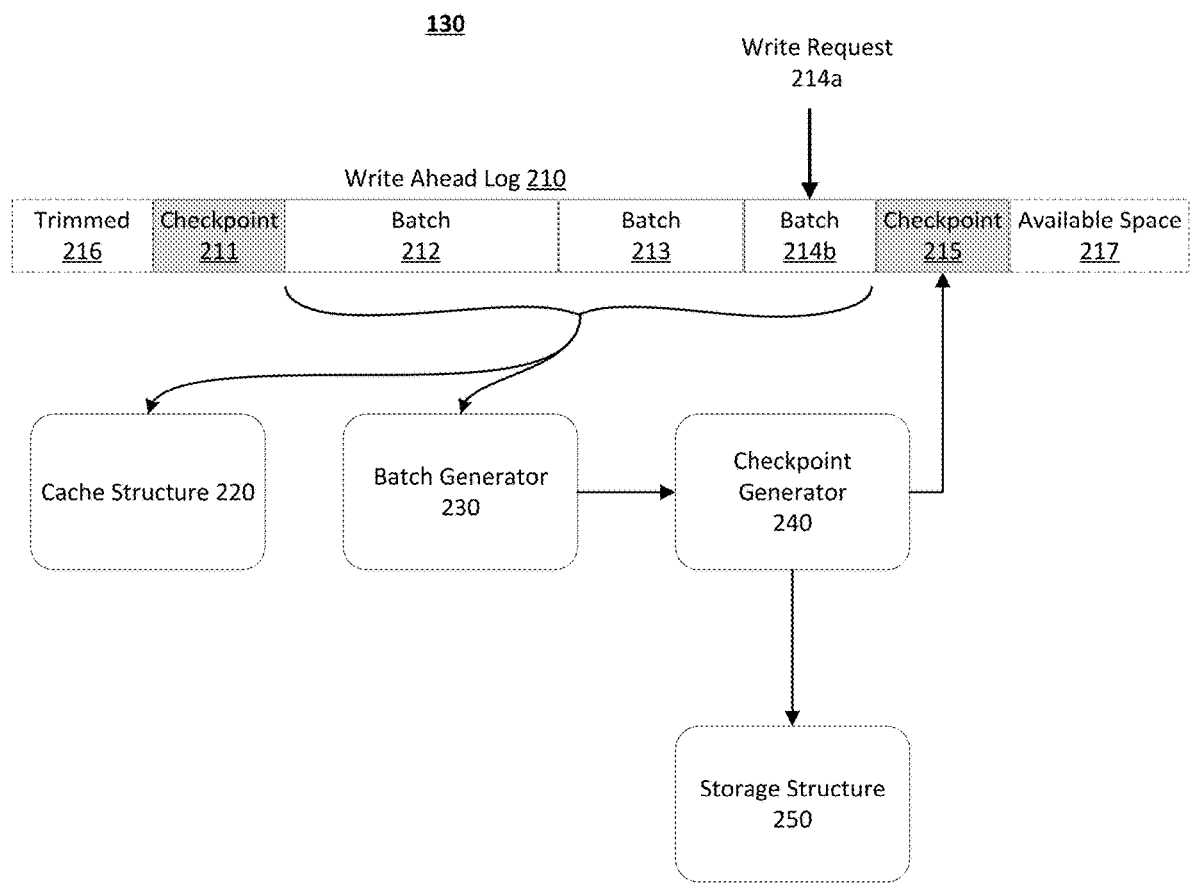
FIG. 2 depicts an exemplary architecture of a key-value engine, consistent with disclosed embodiments.

FIG. 2 depicts an exemplary architecture of a key-value engine (e.g., key-value engine 130, or the like), consistent with disclosed embodiments. The architecture of the key-value engine can provide responsiveness to queries originating in, or prompted by, an application, while providing a tunable tradeoff between read, write, and space amplification.

In some embodiments, the key-value engine can include a write-ahead log 210, a cache structure 220, and a storage structure 250. The key-value engine can implement a batch generator 230 and a checkpoint generator 240, which can interoperate to update storage structure 250 and the write-ahead log 210. As may be appreciated, the functionality of batch generator 230 and checkpoint generator 240 can be combined in a single component, or distributed among multiple components, without departing from the envisioned embodiments.

Write-Ahead Log

In some embodiments, write-ahead log 210 can be configured to store key-value entries until a condition for updating the storage structure has been satisfied. Write-ahead log 210 can be implemented using an append-only, log-structured storage model. In some embodiments, write-ahead log 210 can be stored in solid-state memory. In some embodiments, a type of the solid-state memory can be selected to support rapid, granular updates. For example, the solid-state memory can be granularly addressable, non-volatile memory (e.g., capacitor-or battery-backed DRAM, 3D cross point or phase change storage, spin-transfer torque magnetic random-access memory, resistive random-access memory, or the like). In some embodiments, write-ahead log 210 can be implemented to be recoverable in the event of a power failure. In some embodiments, SLC or MLC NAND can be used to implement write-ahead log 210. The append-and-trim update pattern of write-ahead log 210, in which key-value data is written to write-ahead log 210 in smaller batches and erased in larger blocks, can support the use of such memory. Alternatively or additionally, write-ahead log 210 can be implemented using volatile memory.

As depicted in FIG. 2, write-ahead log 210 can include a checkpoint (e.g., checkpoint 211) and writes (e.g., writes 212, 213, and 214b). A write can contain one or more entries. These entries can be unique by key. However, multiple writes (e.g., writes 212, 213, and 214b) can collectively contain multiple entries having the same key.

A checkpoint can indicate that all writes prior to the checkpoint have been integrated into storage structure 250. In some embodiments, a checkpoint can include a reference to a version of storage structure 250.

Consistent with disclosed embodiments, a reference to a component of the key-value engine (e.g., a node or component thereof, a leaf, a version of the storage structure, the write-ahead log, the cache structure, or other component of the key-value engine) can include information enabling the key-value engine to interact with the component (e.g., obtain the contents of the object, write a new version of the component, delete the component, or the like). Such information can be, include, or specify a pointer or address of the component in a memory or a storage device.

In some embodiments, the key-value engine can receive write request 214a from another component of a system (e.g., data systems layer 120, or the like). Write request 214a can originate with an application running on the system (e.g., an application running in application layer 110, or the like) or on another system. Write request 214a can include or specify key-value entries. As described herein, such key-value entries can include relative or absolute values.

In some embodiments, in response to write request 214a, the key-value engine can append write 214b to the end of write-ahead log 210. Write 214b can contain key-value entries included in or specified by write request 214a. In some embodiments, key-value entries contained in write 214b can be sorted by key.

In some embodiments, each time a checkpoint is appended to write-ahead log 210, checkpoint generator 240 can trim write-ahead log 210 based on the location of the newly appended checkpoint. Such trimming can limit the size of write-ahead log 210.

After checkpoint generator 240 appends checkpoint 215, key-value engine can append subsequent writes to the end of write-ahead log 210 in available space 217. In some embodiments, write-ahead log 210 can be implemented using a circular buffer, in which trimmed writes 216 and available space 217 form a single unused portion of the circular buffer.

In some embodiments, checkpoint generator 240 can trim all checkpoints and writes more than a lag number (a number greater than zero) of checkpoints prior to the newly appended checkpoint. In the example depicted in FIG. 2, the lag number is one and trimmed writes 216 indicates the writes trimming when the checkpoint generator 240 appended checkpoint 215. Had the lag number been zero, checkpoint generator 240 would have trimmed writes 216 after appending checkpoint 211, and would trim checkpoint 211, write 212, write 213, and write 214b after appending checkpoint 215.

Cache Structure

In some embodiments, the key-value engine can maintain cache structure 220. Cache structure 220 can be a data structure configured to enable the key-value engine to rapidly retrieve recently written key-value data (e.g., more rapidly than from storage structure 250). In some embodiments, cache structure 220 can be maintained using a cache memory or random-access memory of the system.

In some embodiments, the key-value entries contained in cache structure 220 can correspond to the key-value entries contained in the writes stored in write-ahead log 210. In some embodiments, cache structure 220 can contain a de-duplicated version of the key-value entries contained in such writes. For example, when the writes stored in write-ahead log 210 contain multiple values for the same key, cache structure 220 can contain the combination of these values. The key-value engine can be configured to watch write-ahead log 210 and update cached structure 220 as writes are appended to write-ahead log 210 (e.g., using a background task, routine/coroutine, process, operation, daemon, or the like). The disclosed embodiments are not limited to any particular implementation of cached structure 220. In some embodiments, cached structure 220 can be implemented using a tree structure (e.g., a binary tree, b+tree, or the like) or another suitable structure.

Batch Generator

In some embodiments, the key-value engine can implement a batch generator 230. Batch generator 230 can be a background task, routine/coroutine, process, operation, daemon, or the like configured to monitor write-ahead log 210. Batch generator 230 can be configured to determine that write-ahead log 210 satisfies a batch generation condition. In some embodiments, the batch generation condition can depend on the amount (e.g., number of entries, bytes, or another suitable measure) of key-value data stored in write-ahead log 210. In some embodiments, the batch generation condition can be satisfied when the amount exceeds a threshold. The threshold can be predetermined or can vary during operation of the key-value engine. In some embodiments, the threshold can depend on the value of tuning parameters, as described herein. In some embodiments, the threshold can depend on the data capacity of node segments or leaves, as described herein.

When write-ahead log 210 satisfies the batch generation condition, batch generator 230 can generate a sorted, deduplicated batch of key-value entries using the writes stored in write-ahead log 210. In some embodiments, batch generator 230 can create the sorted, deduplicated batch of key-value entries by combining the writes contained in write-ahead log 210 (when the writes are not sorted, batch generator 230 can first sort each batch). In some embodiments, the batch generator 230 can deduplicate the batch of key-value entries by combining or discarding relative and/or absolute values, as described herein.

Consistent with disclosed embodiments, the key-value engine can make the sorted, deduplicated batch of key-value entries available to checkpoint generator 240. For example, batch generator 230 can store the deduplicated batch of key-value entries in a memory accessible to checkpoint generator 240.

Checkpoint Generator

In some embodiments, the key-value engine can implement checkpoint generator 240. Checkpoint generator 240 can be a background task, routine/coroutine, process, operation, daemon, or the like configured to update storage structure 250 using the sorted, deduplicated batch of key-value entries generated by batch generator 230.

Checkpoint generator 240 can update storage structure 250 using a storage-structure level update operation, as described herein. As described herein, the update operation can include updating node(s) and potentially leave(s) of the storage structure. The updating operation can be implemented by generating new storage portions (e.g., metadata portions and data portions, as described herein). In some embodiments, the new data portions can be generated by checkpoint generator 240 in memory and then atomically committed to storage.

In some embodiments, checkpoint generator 240 can append a checkpoint to write-ahead log 210 upon completion of the update to storage structure 250. In some embodiments, checkpoint generator 240 can then trim write-ahead log 210 to the newly added checkpoint.

Storage Structure

Storage structure 250 can be configured to store key-value entries received in batches from batch generator 230. In some embodiments, storage structure 250 can be stored in solid-state memory. In some embodiments, the solid-state memory can be flash memory. Consistent with disclosed embodiments, storage structure 250 can include nodes (each of which may contain key-value data) and leaves (which contain key-value data). In some embodiments, a node can contain a multi-level update buffer. Key value data can be flushed to a node, move through the update buffer of the node, and then be flushed to a child node or leaf of the node. In some embodiments, the capacity of the update buffer can depend on at least one of the branching factor of the node, the capacity of data portions, or tuning parameters.

Engine Implementation

A key-value engine consistent with disclosed embodiments can be implemented using a file system component, a core component, a storage structure component, and a key-value engine interface component. As may be appreciated, the disclosed embodiments are not limited to such an implementation. One or more such components may be combined, or the functionality of a component can be separated into multiple components. For example, the file-system component can be part of a hardware layer (e.g., hardware layer 140, or the like). As an additional example, the key-value engine interface component can be part of a data systems layer (e.g., data systems layer 120, or the like). Additional components can be added, which may perform additional functions consistent with disclosed embodiments. Consistent with disclosed embodiments, the components can be implemented using software, firmware, hardware, or a combination of the foregoing. In some embodiments, the components can be implemented, as least in part, using a collection of libraries, compiled or interpreted code, or the like.

In some embodiments, a file-system component can be configured to implement a storage device interface and resource management (e.g., page allocation, reference counting, garbage collection, transaction multi-page writes, caching, and the like). The file system component can be configured to support serial-access abstractions, such as log-structured file systems. The file system lay component can be configured to support random-access abstractions, such as block-structured file systems.

In some embodiments, the file system component can be configured to use a write-once, append-only model. Such a model may simplify cache coherence. In some embodiments, the file system component can be configured to associate storage portions with unique identifiers. The unique identifiers can be a multi-part identifier. In some embodiments, the unique identifier can indicate a storage device (e.g., using a device id, address, or the like). In some embodiments, the unique identifier can indicate a physical or logical location of the storage portion on the storage device (e.g., a physical sector number, or the like). In some embodiments, the unique identifier can include version or numbering information (e.g., a monotonic generation count, or the like). Accordingly, in some embodiments, two unique identifiers having the same value can refer to the same data.

For example, a version number can be associated with an original data portion storing the key-value data for a segment in the update buffer of a node. A logical write to the segment can be implemented by creating a new data portion storing the updated contents of the segment, the new data portion having a new unique identifier associated with the original unique identifier of the original data portion. For example, the new unique identifier and the original unique identifier can include, or depend upon, common values indicating a path or logical location of the segment in the storage structure, the node, the update buffer, or the like. The new unique identifier and the original unique identifier can include, or depend upon, a differing generation count value (e.g., the generation count value for the new data portion can be one increment greater than the generation count value for the original data portion).

In some embodiments, the configuration of the file system component, as described herein, can ensure that stored key-value data remains consistent in the event of a crash (e.g., the file system layer can support per-data portion crash-safety).

In some embodiments, the file system component can be implemented using the LOW-LEVEL FILE SYSTEM (LLFS) developed by MATHWORKS, or another suitable file system layer. LLFS can be configured to assign each storage portion of data a unique identifier (PageId) that embeds a device id, "physical" sector number, and a monotonic generation count. LLFS can be configured to support both a serial-access log-structured device abstraction (LogDevice) and a random-access block-structured device abstraction (PageDevice). As may be appreciated, the write-ahead log can be implemented as an instance of LogDevice, while the storage structure can be implemented using instances of PageDevice.

In some embodiments, the core component can support core operations of the key-value engine. The core component can include data structure definitions for aspects of the key-value engine such as "key", "value", "edit" or other components of the key-value engine. In some embodiments, the component can specify in-memory and in-storage data structure definitions for certain components. In some embodiments, the same representations can be used for in-memory datatypes as when the datatypes are serialized onto storage. In some embodiments, the in-memory representation and the in-storage representation can differ for one or more components.

In some embodiments, the core component can define processes used by other components of the key-value engine, such as the merge process described herein, processes for updating scanning through a sequence of edits (e.g. a batch) and computing the packed size of the batch, updating node metadata (e.g., updating per-pivot byte counts based on a batch), or computing partition points within a batch (e.g., when splitting a merged key/value range into several leaf pages, or when splitting a node), or other processes disclosed herein.

In some embodiments, the storage structure component can support the implementation of the storage structure. In some embodiments, the storage structure component can support a storage structure update operation, as described herein. The update function can generate a new storage structure using a batch of key-value entries and a prior storage structure. In some embodiments, the prior storage structure and the new storage structure can share data. The new and prior storage structures can be implemented using references to storage portions. Such references can use the unique identifier of a storage portion. For example, a reference can be or include a pointer to storage portion. The value of the pointer can be or depend upon the unique identifier of the storage portion.

As described herein, the key-value engine can be implemented in some embodiments using a write-once, append-only model. A new storage structure can be generated by creating new data portion(s) containing any updated key-value entries and any new metadata portion(s) containing the metadata necessary to reference the new data portion(s) containing the updated key-value entries. In some embodiments, (e.g., embodiments using LLFS, or the like), the file system component can support a transaction protocol that guarantees that all durably committed reference count updates are applied exactly once.

Accordingly, in such embodiments, a storage structure can be immutable, as later versions of the storage structure do not overwrite key-value data referenced by earlier versions of the storage structure. Thus, such embodiments can support multi-versioning and snapshot-isolated reads. Furthermore, unchanged data can be shared between versions of the storage structure, improving the efficiency of the key-value engine.

Storage Structure Architecture

A storage structure consistent with disclosed embodiments can be configured to operate synergistically with conventional data storage systems. Such data storage systems may use a combination of different physical memory types. A storage structure can be configured for use with flash memory (though the disclosed embodiments are not limited to such an implementation). As described herein, metadata can be stored in portions that align with sector sizes (e.g., such a portion can be a multiple of sector sizes). Data can be stored in portions that align with block sizes (e.g., such a portion can be some multiple of block sizes). Metadata updates can be implemented by writing to unwritten or erased sectors. Data updates can be implemented by collecting all the key-value data written to a block, updating this key-value data, and writing an entire new block (and erasing an existing block if necessary). Metadata may be stored in higher endurance or higher performance flash memory (e.g., SLC NAND), while data may be stored in higher density, less-expensive flash memory (e.g., MLC NAND).

Figure 3A:
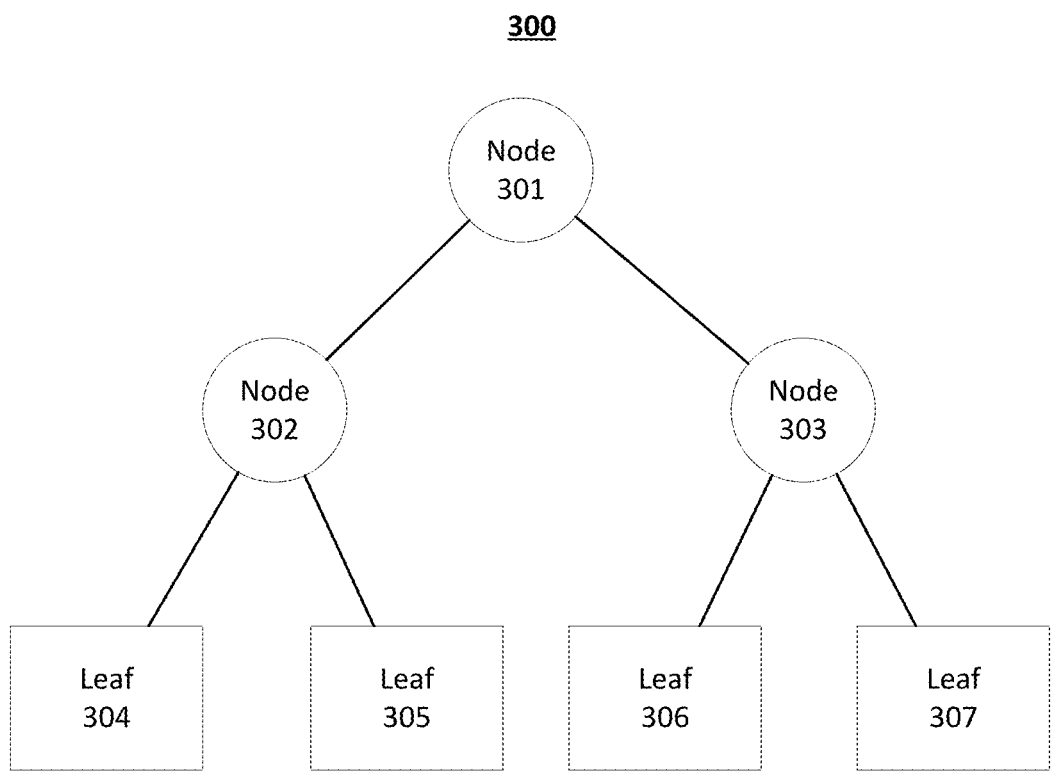
FIG. 3A depicts an exemplary storage structure, consistent with disclosed embodiments.

FIG. 3A depicts an exemplary storage structure 300, consistent with disclosed embodiments. In some embodiments, storage structure 300 can be a tree structure including nodes (e.g., nodes 301, 302, and 303) and leaves (e.g., leaves 304, 305, 306, 307).

Leaf

Consistent with disclosed embodiments, a leaf can contain key-value data. In some embodiments, the key-value data can be or include a sorted list of key-value entries. A leaf may contain thousands of key-value entries to hundreds of thousands of key value entries, or more. A leaf may contain 200 kilobytes of key-value data to 200 megabytes of key-value data, or more. The disclosed embodiments are not limited to any particular format or datatype of the key-value entries. In some embodiments, the key-value entries can be stored as byte strings.

Within a leaf, the keys in the key-value entries can be unique. In some embodiments, the key-value engine can be configured to remove any deleted key-value entries when updating a leaf. The key-value engine can therefore be configured to treat as active key-value entries read from a leaf.

In some instances, a storage structure can include only a single leaf. As may be appreciated, writing sufficient data to such a storage structure can cause the storage structure to be expanded to include additional leaves and nodes.

Node

A node can contain references to child nodes (or leaves). Such references can point to child nodes (or leaves) having mutually disjoint key ranges. In some embodiments, such references can be combined with metadata regarding the child nodes (or leaves) (e.g., a pivot can be combination of a reference to a child node or leaf, combined with metadata concerning the child node or leaf). In response to a read request specifying a key, the key-value engine can search the references to select a child node having a desired key range (e.g., a key range including the specified key). The child node can then be searched in turn. Consistent with disclosed embodiments, the efficiency of reading data from the storage structure can depend on the number of such child nodes (e.g., a branching factor of the storage structure). The more such child nodes (e.g., the greater the branching factor, referred to here as B), the faster the key-value engine can identify child nodes (or leaves) containing relevant keys.

Consistent with disclosed embodiments, the node can contain an update buffer. The configuration of the update buffer can be selected or adjusted to manage the efficiency of writing data to the data structure. As may be appreciated, in some embodiments, the key-value engine can be configured to use physical media having minimum read, write, or erase sizes (e.g., sectors, erasure blocks, or the like for flash memory). In such embodiments, the efficiency of writing data to the storage structure can depend on the amount of new data included in the block. Efficiency may decline when only a small portion of the data included in the block is new data. In some embodiments, the update buffer can improve efficiency using a layered structure, as described herein. A size of updates received by the node can be approximately equal to the capacity of the initial layer. As may be appreciated, merge operations can be more efficient when the sorted key-value datasets being merged are approximately equal in size. The capacity of each subsequent layer can therefore be twice or approximately twice the capacity of the preceding layer (e.g., the capacity of each subsequent layer can be between 1.5 and 3.0 times the capacity of the preceding layer). The application of an update to the update buffer can therefore result in a combination cascade analogous to binary integer addition, where an update is either written into an empty level or combined with a full level to produce an update similar in size to the capacity of the next level.

As described herein, exemplary embodiments can implement the node using storage portion(s). A metadata portion can store metadata for implementing the node. The metadata can include child metadata concerning child nodes and buffer metadata used to implement the update buffer, including references to any data portion(s) storing any key-value data contained in the update buffer. In some embodiments, the number of child nodes and the capacity of the update buffer can be constrained by the capacity of the metadata portion. For example, a greater number of child nodes (which can improve read efficiency) can result in a greater amount of child metadata, thus requiring less buffer metadata and a smaller update buffer (which can decrease write efficiency). A smaller number of child nodes (which can decrease read efficiency) can result in a smaller amount of child metadata, permitting more buffer metadata and a larger update buffer (which can increase write efficiency).

Storage Structure Expansion

Figure 3B:
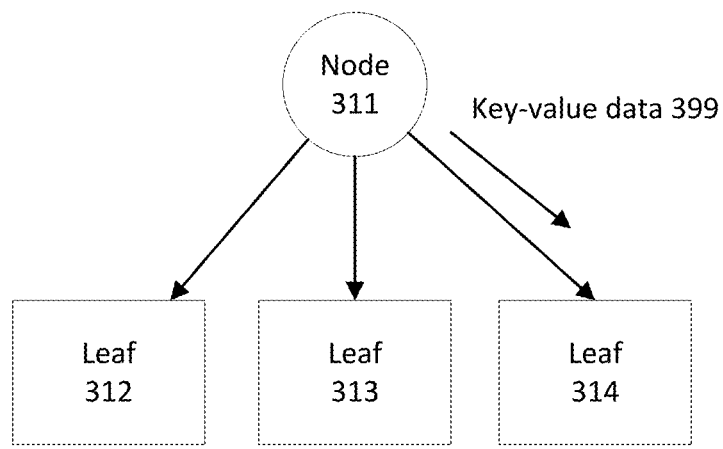
FIGS. 3B to 3E depict the expansion of an exemplary storage structure, consistent with disclosed embodiments.
Figure 3C:
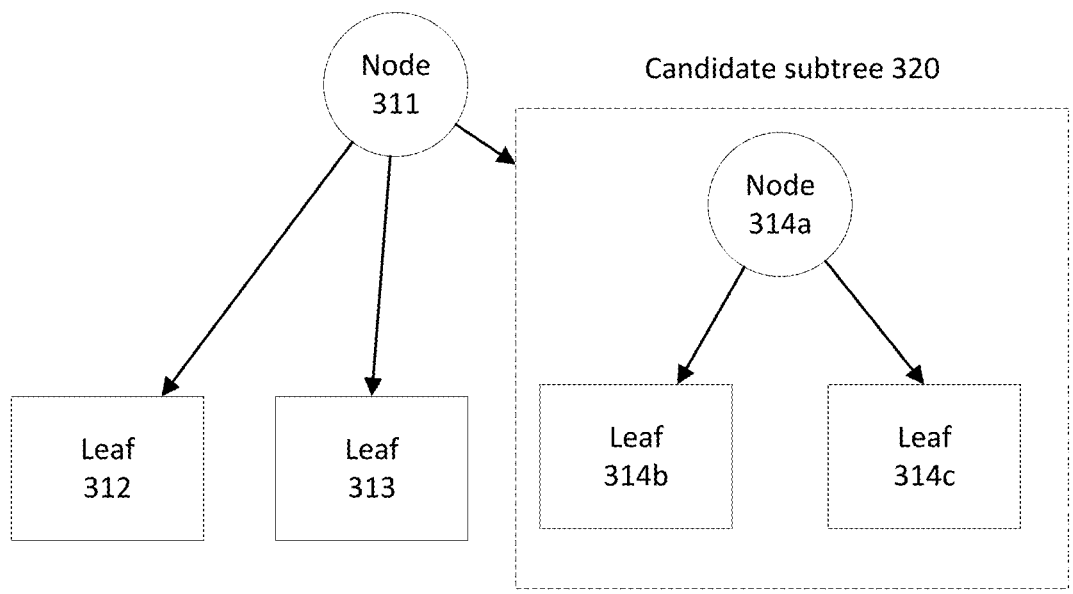

FIGS. 3B to 3E depict the expansion of an exemplary storage structure, consistent with disclosed embodiments. FIG. 3B depicts a storage structure having a height of 1 (e.g., a single root node 311 connected to leaves 312, 313, and 314). As depicted in FIGS. 3B to 3E, the storage structure can grow from the bottom up. As additional data is flushed down the storage structure, leaves can split. In turn, the splitting of leaves can cause the parent nodes of the leaves to split. In turn, the splitting of these parent nodes can cause nodes higher in the storage structure to split, thereby broadening and deepening the storage structure.

In this example, key-value data 399 is written to leaf 314. As described herein, writing data to leaf 314 can include generating a new dataset using key-value data 399 and the data stored in leaf 314. In some instances, the new dataset can satisfy a maximum utilization condition. For example, the new dataset can be too large for storage in a single data portion.

In response to the satisfaction of the maximum utilization condition, two new leaves (e.g., leaf 314b and leaf 314c) can be created to replace leaf 314 (as described herein with regards to versioning, leaf 314 may not be deleted). In some embodiments, the two new leaves can be connected to a new node (e.g., node 314a), forming a candidate sub-structure 320. Candidate sub-structure 320 can satisfy an insertion condition. For example, the height (one) of candidate sub-structure 320 is greater than the height (zero) of the single leaf it replaced.

Figure 3D:
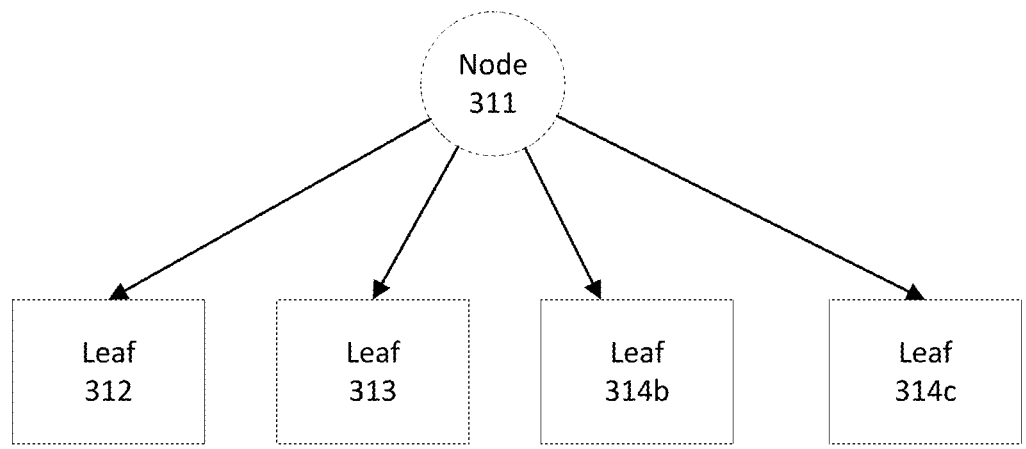
Figure 3E:
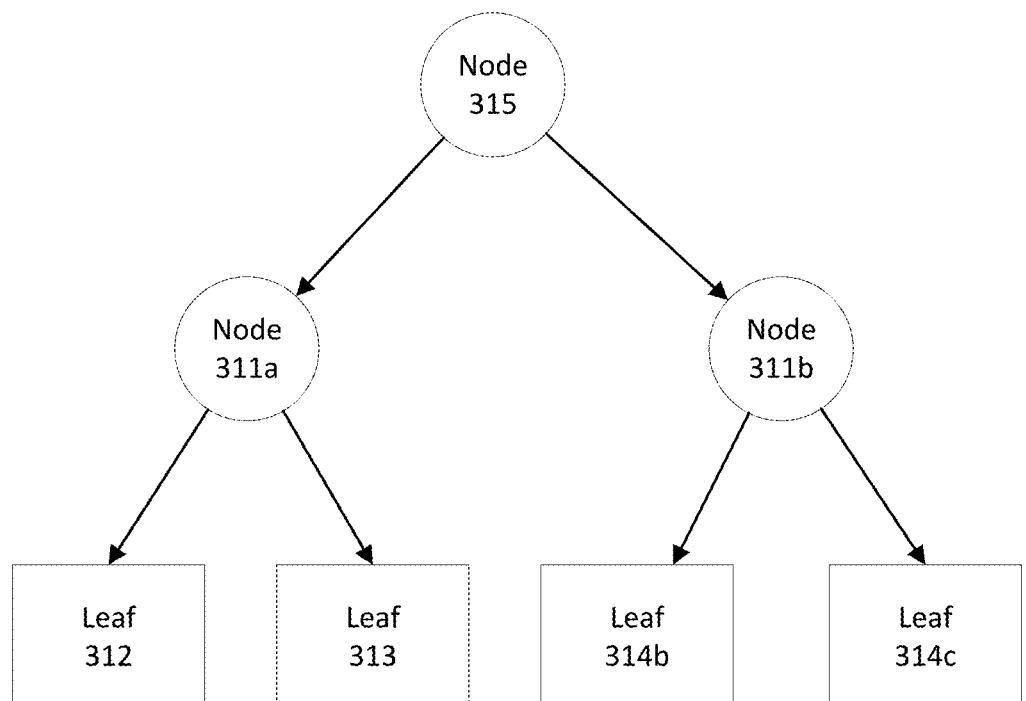

In response to the satisfaction of the insertion condition, candidate sub-structure 320 can be updated to insert the two new leaves 314b and 314c directly to the parent node (e.g., node 311), generating the storage structure depicted in FIG. 3D.

In some instances, node 311 can then fail a maximum utilization condition. The maximum utilization condition for node 311 can depend on the amount (e.g., bytes, items, or the like) of key-value data contained in an update buffer of node 311 and/or the number of child nodes (or leaves) of node 311. In some embodiments, the maximum utilization condition can be failed when the amount of key-value data is greater than a threshold value or the number of child nodes (or leaves) is greater than a threshold number.

In some embodiments, the maximum utilization condition can depend on an amount of metadata contained in node 311. For example, the maximum utilization condition can depend on the size of the serialized node data structure in bytes. In turn, the amount of such metadata can depend on the amount of key-value data contained in an update buffer of node 311b and/or the number of child nodes (or leaves) of node 311b.

For example, the amount of such metadata can depend on the number of child nodes/subtrees, the size (e.g., the total number of bytes) of the bounding keys that partition the key ranges of child subtrees, the number of segments in the update buffer, and the number of segment filter entries present in the update buffer, or the like. In some embodiments, the maximum utilization condition can be failed when an amount of metadata is greater than a threshold value. In some embodiments, the threshold level can be the capacity of a metadata portion or a suitable fraction thereof (e.g., 50%, 75%, 90%, or another suitable fraction).

In response to satisfaction of the maximum utilization condition, two new nodes (e.g., node 311a and node 311b) can be created to replace node 311 (as described herein with regards to versioning, node 311 may not be deleted). In addition, a new node (node 315) may be created as a parent to nodes 311a and 311b.

Storage Structure Reduction

Figure 3F:
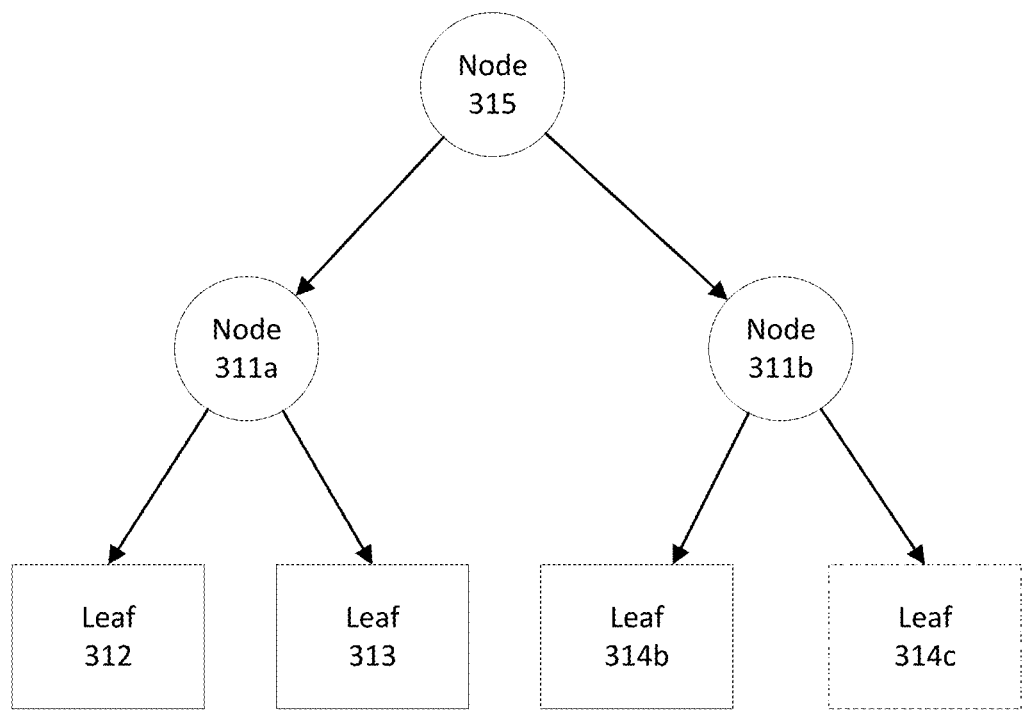
FIGS. 3F to 3I depict the reduction of an exemplary storage structure, consistent with disclosed embodiments.

FIGS. 3F to 3I depict the reduction of an exemplary storage structure, consistent with disclosed embodiments. FIG. 3F depicts a storage structure having a height of 2 (e.g., a root node 315 connected to leaves 312, 313, 314b, and 314c). As depicted in FIGS. 3F to 3I, the storage structure can shrink from the bottom up. As data is removed from leaves, leaves can combine. When leaves combine, the parent node to the combining leaves may in turn combine with a sibling node. In turn, the combination of these sibling nodes can cause nodes higher in the storage structure to combine, thereby narrowing and decreasing the height of the storage structure.

In this example, leaf 314c has failed a minimum utilization condition. In some embodiments, such a minimum utilization condition can depend on the amount of data contained in leaf 314c. For example, deletion of key-value data stored in 314c may have caused the amount of data contained in leaf 314c to fall below a threshold level. In some embodiments, the threshold level can be a fraction of the capacity of a data portion.

In response to the failure of the minimum utilization condition, the contents of leaf 314c can be combined with the contents of one or more of its sibling leaves. In this example, the only sibling leaf is leaf 314b.

In some instances (not shown in FIG. 3G), a leaf combining the contents of leaf 314c and 314b would fail a maximum utilization condition. For example, the minimum utilization condition may require an amount of key-value data stored in a leaf exceed a third the capacity of a data portion. The amount of key-value data stored in a leaf 314c can be 20% of the capacity of a data portion. The amount of key-value data stored in a leaf 314b can be 90% of the capacity of a data portion. The amount of key-value data stored in a leaf combining the contents of leaves 314c and 314b would then exceed the capacity of a data portion. Accordingly, leaf 314c may be re-created. The re-created leaf 314c can contain a portion of the contents of leaf 314b, therefore effectively re-balancing the contents of original leaves 314b and 314c.

Figure 3G:
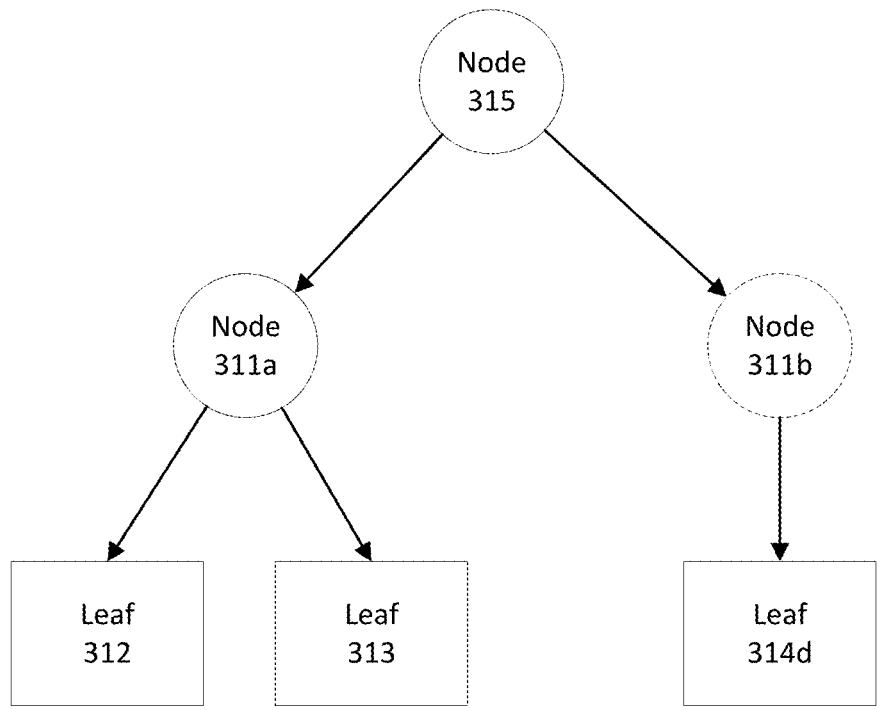
Figure 3H:
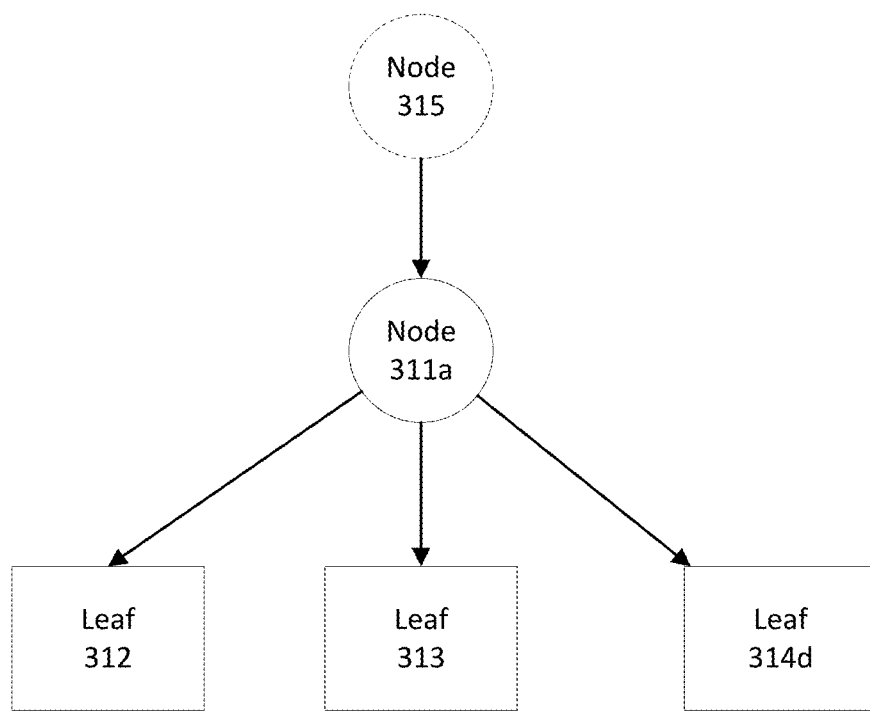
Figure 3I:
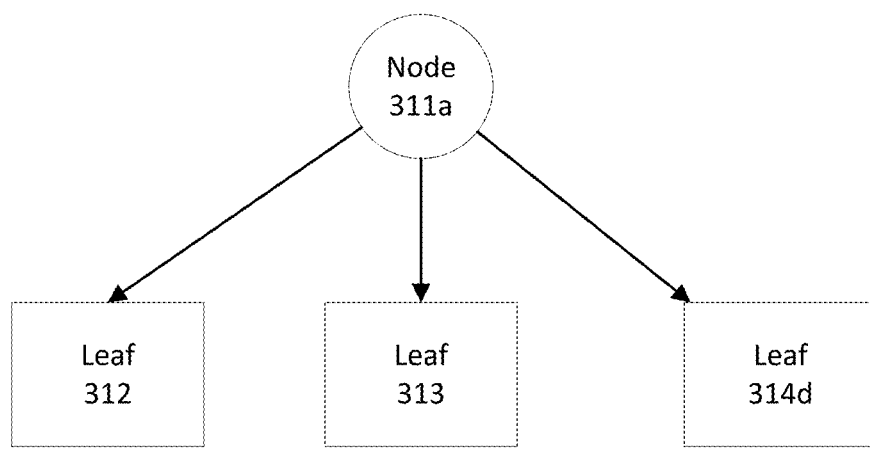

In some instances, as depicted in FIG. 3G, the combination of the contents of leaf 314c and 314b may satisfy the maximum utilization condition. For example, the minimum utilization condition may require an amount of key-value data stored in a leaf exceed a third the capacity of a data portion. The amount of key-value data stored in a leaf 314c can be 20% of the capacity of a data portion. The amount of key-value data stored in a leaf 314b can be 60% of the capacity of a data portion. The amount of key-value data stored in a leaf combining the contents of leaves 314c and 314*b* would then be 80% the capacity of a single data portion. Accordingly, leaf 314*d* can then replace leaves 314*c* and 314*b*. Leaf 314*d* can contain the combined contents of leaves 314*b* and 314*c*.

In such instances, node 311*b* can then fail a minimum utilization condition. In some embodiments, the minimum utilization condition for node 311*b* can depend on the amount (e.g., bytes, items, or the like) of key-value data contained in an update buffer of node 311*b* and/or the number of child nodes (or leaves) of node 311*b*. In some embodiments, the minimum utilization condition can be failed when the amount of key-value data is less than a threshold value, or the number of child nodes (or leaves) is less than a threshold value (e.g., a minimum number between 2 and 1000, or more).

In some embodiments, the minimum utilization condition can depend on an amount of metadata contained in node 311*b*. For example, the minimum utilization condition can depend on the size of the serialized node data structure in bytes. In turn, the amount of such metadata can depend on the amount of key-value data contained in an update buffer of node 311*b* and/or the number of child nodes (or leaves) of node 311*b*. For example, the amount of such metadata can depend on the number of child nodes/subtrees, the size (e.g., the total number of bytes) of the bounding keys that partition the key ranges of child subtrees, the number of segments in the update buffer, and the number of segment filter entries present in the update buffer, or the like. In some embodiments, the minimum utilization condition can be failed when an amount of metadata is less than a threshold value. In some embodiments, the threshold level can be a fraction of the capacity of a metadata portion (e.g., 50%, 75%, 90%, or another suitable fraction).

In response to the failure of the minimum utilization condition, node 311*b* can be removed from the storage structure. In some embodiments, node 311*b* can contain data (e.g., an update buffer, as described herein). Removing node 311*b* can include flushing the data contained in node 311*b* to leaf 314*b*.

In some instances, unlike the situation depicted in FIG. 311, flushing this data to leaf 314*b* can cause leaf 314*b* to satisfy a leaf-creation condition. The creation of the new leaf can then cause the re-creation of node 311*b* (effectively re-balancing the storage structure).

In some instances, as depicted in FIG. 311, the flushing of data from node 311*b* to leaf 314*d* may not cause leaf 314*d* to satisfy a node creation condition. In such instances, node 311*b* can be pruned from the storage structure and leaf 314*d* can be reassigned to node 311*a*.

In some instances, unlike the situation depicted in FIG. 31, reassigning leaf 314*d* to node 311*a* can cause node 311*a* to satisfy a node-splitting condition, causing the re-creation of node 311*b* (effectively re-balancing the storage structure).

In some instances, reassigning leaf 314*d* to node 311*a* may not cause node 311*a* to satisfy the node-splitting condition. In such instances, node 315 may fail a minimum utilization condition. In some embodiments, as the root node, node 315 may not have a minimize size requirement, but may have a minimum number of child nodes requirement (e.g., two or more child nodes). In some embodiments, should the number of child nodes of a root node be less than 2, then the data contained in the root node can be flushed to the sole child node. If the child node remains the sole child node after the data contained in the root node is flushed, the root node can be pruned and the child node can become the new root node. Here, data contained in node 315 (e.g., in an update buffer of node 315) can then be flushed to node 311*a* and node 315 can then be pruned, making node 311*a* the root node of the data structure, as depicted in FIG. 31.

Alternatively, unlike the situation depicted in FIG. 31, data contained in node 311*a* can then be flushed to leaves 312, 313, and 314*d*, node 311*a* can be pruned, and leaves 312, 313, and 314*d* reassigned to node 315. As may be appreciated, such data flushing operations may result in the creation of additional leaves or nodes, leading to an effective re-balancing of the storage structure.

Node Architecture

Figure 4A:
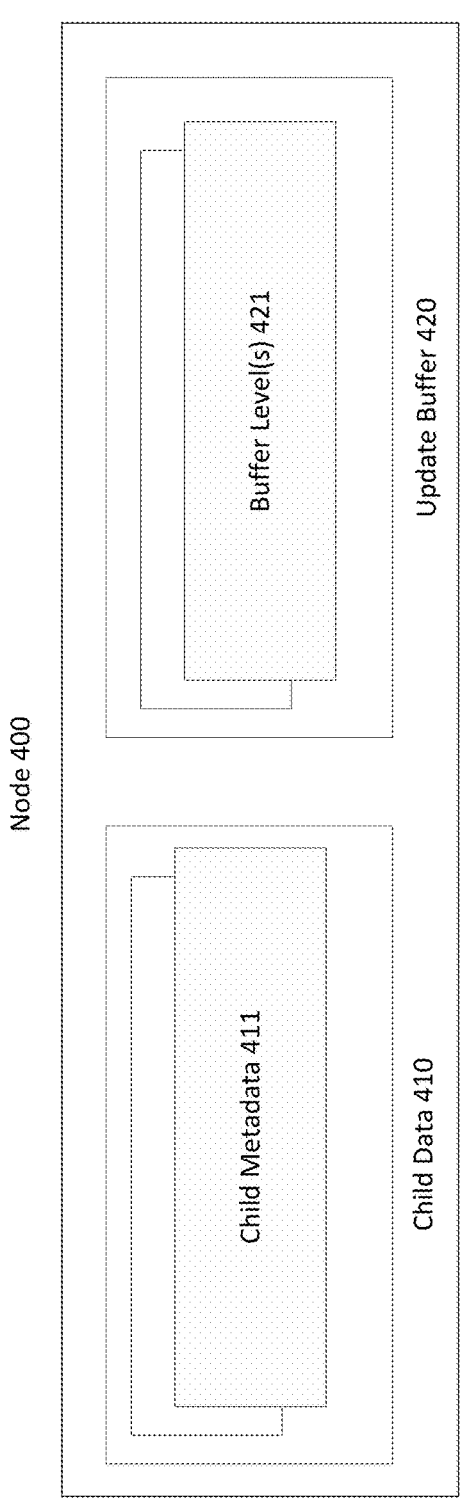
FIG. 4A depicts an exemplary logical architecture of a node in a storage structure, consistent with disclosed embodiments.

FIG. 4A depicts an exemplary logical architecture of node 400 in a storage structure, consistent with disclosed embodiments. Node 400 can contain child data 410 and an update buffer 420.

Child Data

In some embodiments, child data 410 can include child metadata (e.g., child metadata 411) corresponding to each child node of node 400. In some embodiments, the child metadata for a child node can indicate at least one of a reference to the child node, key-values associated with the child node, or an amount of pending key-value data associated with the child node.

In some embodiments, the child metadata for a child node can indicate a key range associated with the child node. The disclosed embodiments are not limited to any particular implementation of such an indication. In some embodiments, the child metadata can indicate the key range using a minimum and maximum key. In some embodiments, the child metadata can indicate the key range using a minimum key. The key range for a child node can be specified by the minimum key for the child node and the next-largest minimum key for the other child nodes. In some embodiments, child data 410 can further include an upper bound key. The key range for the highest-key range child node can be specified by the greatest minimum key and the upper bound key. In some embodiments, the key range for the highest-key range child node can include any key greater than the minimum key for the highest-key range child node. As may be appreciated, the keys need not correspond to particular key-value entries written to the storage structure. Instead, the set of minimum and maximum keys can be selected to generate suitable bounding key ranges for child nodes.

In some embodiments, the child metadata can indicate an amount of pending key-value data contained in the node and associated with the child node. For example, the child metadata can indicate an amount (e.g., number of bytes, entries, or the like) of key-value data contained in the update buffer and having keys within the key range of the child node.

In some embodiments, child data 410 can contain a set of tuples, each tuple containing the child metadata for a child node. Each tuple can include key range information for the child node, a reference to the child node, and an indication of the amount of pending key-value data contained in the node and associated with the child node. In some embodiments, the set of tuples can be arranged or sorted by the key range information.

Buffer

Update Buffer 420 can include key-value data stored in or associated with the node. In some embodiments, the update buffer can include multiple levels (e.g., buffer levels 421). The size and composition of the buffer levels can be selected or adapted to improve the efficiency of reading and writing operations to the storage structure.

In some embodiments, the levels can be arranged as an ordered list. Each level can contain key-value data. In some embodiments, each level can be unique by key, but multiple levels can contain multiple entries for the same key. In some embodiments, earlier levels in the ordered list can contain more-recently received information. Thus, the key-value data contained in an earlier level in the ordered list may supersede the key-value data contained in a later level in the ordered list.

In some embodiments, one or more levels in an update buffer may be temporarily empty. For example, an update buffer may include levels 0, 1, and 2. At some point in time, levels 0 and 1 may contain data, but level 2 may be empty. At a later point in time, levels 0 and 2 may contain data, but level 1 may be empty.

In some embodiments, the buffer size can depend on at least one of the number of children of the node or the size of update batches received by the node. For example, the buffer size can be:

$$S=(n-1)\cdot X$$

where S is the size of the buffer, n is the number of child nodes, and X is the amount (e.g., number of entries, bytes, or another suitable measure) of key-value data pushed to the node in a single batch. For example, when the node has two child nodes, the buffer can include sufficient space for a single batch of data. Each time the buffer receives a batch of key-value data, the buffer can combine the received key-value data with the key-value data already stored in the buffer. Output batch(es) of key-value data can then be written to the child nodes. The output batches may be written to the child nodes prior to writing the combined batch of key-value data back to the buffer, or the combined batch of key-value data can first be written to the buffer and then output batch(es) can be written to the child nodes, resulting in ranges of key-value data in the buffer being marked as inactive.

In some embodiments, the number of levels in the buffer can depend on at least one of the buffer size or the data portion size. For example, the buffer size can be:

$$D=\lfloor \log_2(S/L) \rfloor$$

where S is the buffer size, L is the capacity of a data portion, and D is the number of levels of the update buffer. For example, when the size of the update buffer is 5 megabytes and the capacity of a data portion is 1 megabyte, the ceiling of the base two logarithm of the quotient of S divided by L can be 3. The update buffer can then have three levels. As may be appreciated, the size of an update buffer can change over time, as the node gains or loses child nodes. In some embodiments, when a change in the number of child nodes causes the update buffer to lose a level, any key-value data contained in that level can be flushed to the child nodes (which may cause a child node to split).

Node Implementation

Figure 4B:
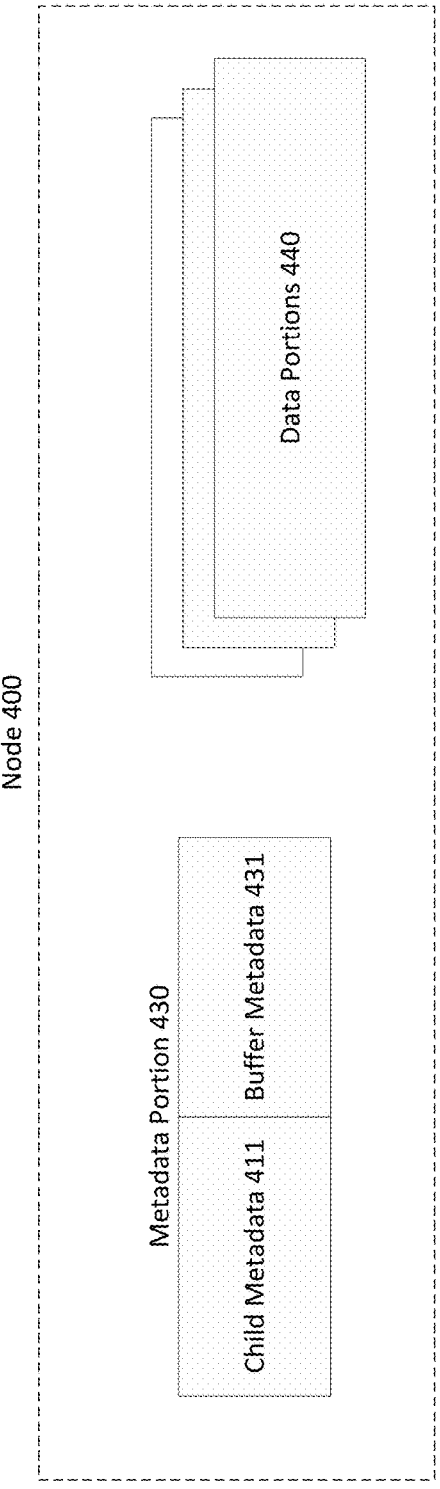
FIG. 4B depicts an exemplary implementation of the node of FIG. 4A, consistent with disclosed embodiments.

FIG. 4B depicts an exemplary implementation of node 400, consistent with disclosed embodiments. While node 400 can contain child data 410 and update buffer 420, these data structures can be implemented using storage portions (e.g., metadata portion 430 and data portions 440).

Consistent with disclosed embodiments, metadata portions (e.g., metadata portion 430) and data portions (e.g., data portions 440) can be logical units of addressing and writing data. In some embodiments, the data storage system (or a component thereof, such as the key-value engine), can be configured to store metadata portions and data portions in different types of physical media. In some embodiments, the physical media storing the metadata portions may have better endurance or wear resistance (e.g., SLC NAND, or another higher-endurance flash memory) than the physical media storing the data portions (e.g., MLC NAND, or another lower-endurance flash memory). In some embodiments, a capacity of a metadata portion can align with a minimum addressable and writable physical unit of the physical media storing the metadata portion (e.g., the metadata portion can be implemented as integer number of sectors of a flash memory). In some embodiments, a capacity of a data portion can align with a minimum erasable physical unit of the physical media storing the data portion (e.g., the data portion can be implemented as an integer number of erasure blocks of a flash memory, each erasure block in turn being some integer number of sectors). In some embodiments, a capacity of a metadata portion can be less than the capacity of a data portion (e.g., 1000 times less, 100 times less, 10 times less, or another suitable multiple). As described herein, metadata portions may be updated more frequently than the data portions. In this manner, the cost of updating metadata portions can be amortized over the substantially larger amount of key-value data stored in the data portions.

As described herein, a metadata portion can contain reference(s) to data portion(s). In some embodiments, such references can be associated with a unique identifier (e.g., a LOW-LEVEL FILE SYSTEM page ID, or another suitable identifier). The system executing the key-value engine can use the unique identifier to determine a physical location of the data portion in the storage system, enabling the key-value engine to obtain the key-value data stored in that data portion. The physical device containing the data portion can be local to the storage system executing the key-value engine, or remote from the storage system. In this manner, the node can indirectly contain the data stored in the node. In some embodiments, as described herein, this level of indirection permits greater parallelization and improved efficiency.

In some embodiments, data portions 440 can store key-value data contained in update buffer 420. Each data portion can store the key value entries contained in a corresponding non-empty segment in a level of update buffer 420.

In some embodiments, metadata portion 430 can store child metadata 411 and/or buffer metadata 431. Buffer metadata 431 can include references to data portions 440 and, as described herein, metadata concerning the contents of the data portions 440, such as filter information, range information, and child information. In some embodiments, such metadata can include an indication for each buffer level (or each buffer segment) that indicates whether the buffer level or segment is inactive (or alternatively, active).

Consistent with disclosed embodiments, metadata portion 430 can implicitly impose a collective capacity constraint on child metadata 411 and buffer metadata 431. For example, the capacity of metadata portion 430 can limit the combined size of child metadata 411 and buffer metadata 431. Metadata portion 430 can store the serialized contents of child metadata 411 and buffer metadata 431. When the serialized contents of child metadata 411 and buffer metadata 431 exceed a threshold value (e.g., the capacity of metadata portion 430) the node can be split. In some embodiments, the key-value engine can be configured to impose additional size limitations on child metadata 411 and buffer metadata 431. For example, a first fraction of metadata portion 430 can be allocated to child metadata 411 and a second fraction (e.g., the remainder of the metadata portion 430, or less) can be allocated to buffer metadata 431. Should the storage requirements of child metadata 411 (or of buffer metadata 431) exceed the storage space allocated to the child metadata 411 (or to buffer metadata 431), the node can be deemed to satisfy a node-splitting condition, as described herein.

As may be appreciated, the capacity required for the child metadata 411 can depend on the number of child nodes, while the capacity required for buffer metadata 431 can depend on the number of update buffer portions (e.g., the capacity of the update buffer). Accordingly, the first fraction and the second fraction can reflect the degree of branching and the amount of key-value data contained in the node.

As may be appreciated, implementing node 400 using metadata portion 430 and data portions 440 can improve storage structure performance. In such embodiments, writing data to update buffer 420 can cause updates to metadata portion 430 and to one or more of data portions 440. However, the remainder of data portions 440 may remain unchanged. The number of I/O operations required to perform the write can therefore be reduced. Furthermore, updates to the data portions 440 and to the metadata portion 430 can be performed in parallel using a single I/O operation.

Buffer Architecture

Levels

Figure 5A:
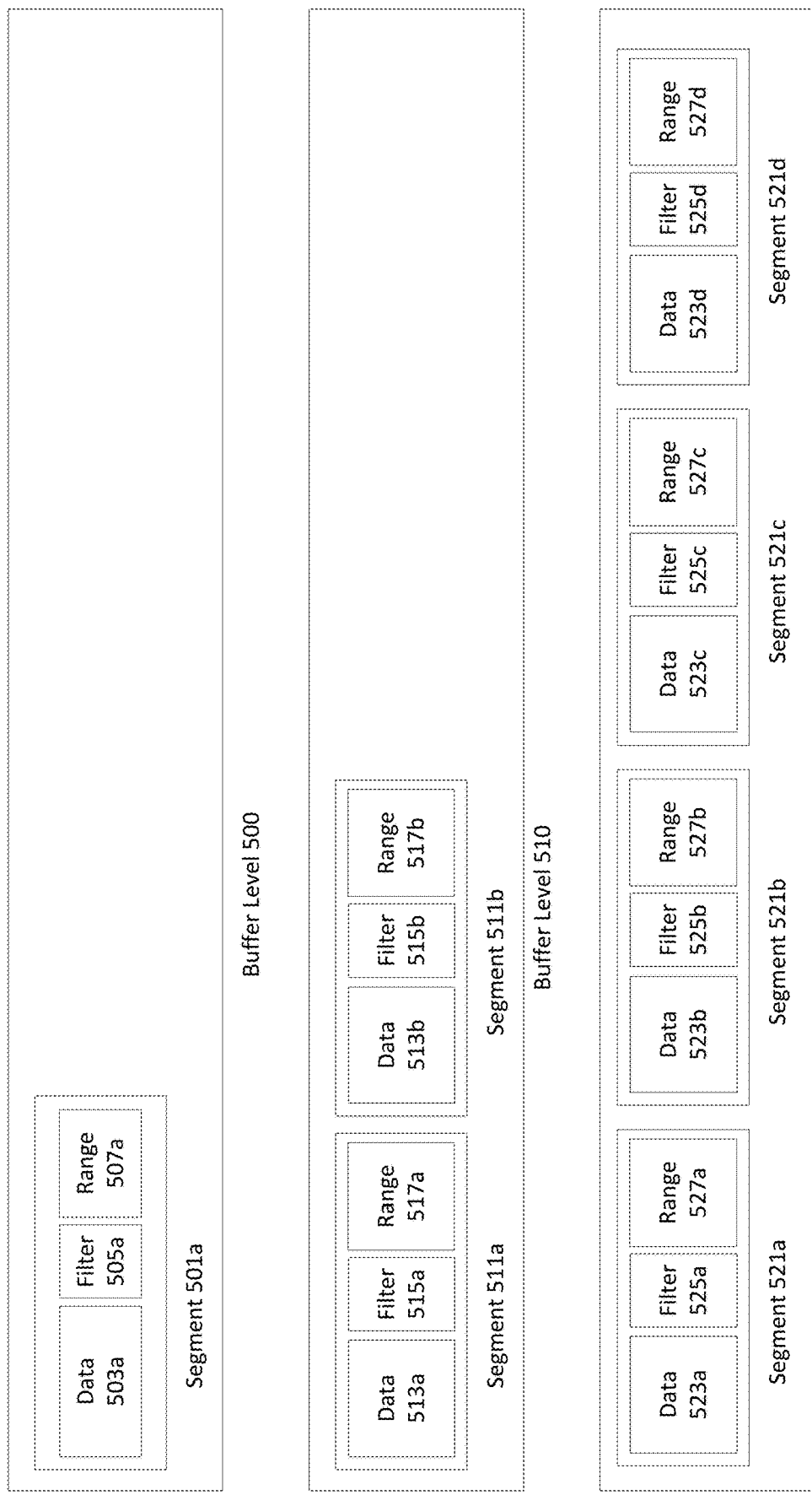
FIG. 5A depicts a logical diagram of exemplary buffer levels in an update buffer of a node, consistent with disclosed embodiments.

FIG. 5A depicts a logical diagram of exemplary buffer levels in an update buffer (e.g., buffer levels 421 in update buffer 420), consistent with disclosed embodiments. As depicted in FIG. 5A, the buffer levels can form a sequence of buffer levels. In this example, buffer level 500 can be the first buffer in the sequence, buffer level 510 can be the second buffer level in the sequence, and buffer level 520 can be the third buffer level in the sequence. While three buffer levels are depicted in FIG. 5A, an update buffer can include fewer levels (e.g., a single level) or more levels (e.g., four, five, or more).

Consistent with disclosed embodiments, each buffer level in a sequence (after the first buffer level) can be configured to have a multiple of the capacity of the prior buffer level. In some embodiments, each buffer level in the sequence can have twice or approximately twice the capacity of the prior buffer level. For example, buffer level 510 can have twice or approximately twice the capacity of buffer level 500.

Segments

As depicted in FIG. 5A, each buffer level can include a number of segments. In some embodiments, each segment in a buffer can have the same capacity. Differences in capacity between buffer levels can therefore reflect differences in the number of segments included in each buffer level. For example, buffer level 500 can include a single segment (e.g., segment 501a). Buffer level 510 can include two segments (e.g., segment 511a and segment 511b) and have twice or approximately twice the capacity of buffer level 500. Buffer level 520 can include four segments (e.g., segments 521a to 521d) and have twice or approximately twice the capacity of buffer level 510.

Consistent with disclosed embodiments, a segment (e.g., segment 511b) can contain a batch of key-value entries (e.g., data 513b). In some embodiments, the batch of key-value entries can be sorted by key. In some embodiments, the batch of key-value entries can be deduplicated.

Figure 5B:
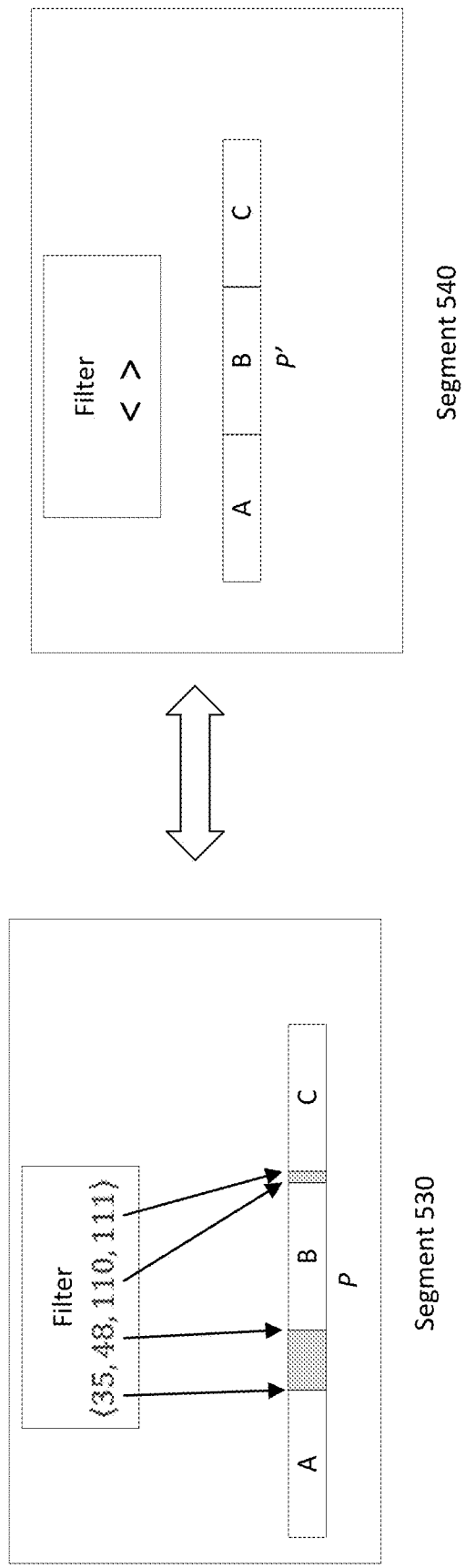
FIG. 5B depicts two equivalent segments, consistent with disclosed embodiments.

Consistent with disclosed embodiments, a segment (e.g., segment 511b) can include a filter (e.g., filter information 515b). The filter for the segment can indicate active and inactive key ranges for the batch. In some embodiments, the filter can include a sorted list of indices. These indices can define a series of alternating active and inactive intervals by giving the boundary indices of such intervals. In some embodiments, the intervals can be specified in terms of key-value entries. For example, as shown in FIG. 5B, a segment 530 containing a batch P and filter ⟨35, 48, 110, 111⟩ can be equivalent to a segment 540 containing a batch P' and empty filter ⟨ ⟩ when P' is P with the key-value entries 35 to 47 and key-value entry 110 removed. Similarly, filter <50> can inactivate the $50^{th}$ record and all subsequent records in a corresponding batch. In some embodiments, the intervals can be specified in terms of key-ranges. For example, a segment containing a batch P and filter ⟨$k_1$, $k_2$, $k_3$, $k_4$⟩ can be equivalent to a segment containing a batch P' and empty filter ⟨ ⟩ when P' is P with the key-value entries having keys in the ranges [$k_1$, $k_2$) and removed. Similarly, filter ⟨$k_1$, $k_2$, $k_3$⟩ can inactivate records having keys in the ranges [$k_1$, $k_2$) and greater than $k_3$.

Consistent with disclosed embodiments, a segment (e.g., segment 521c) can include range information (e.g., range information 527c). The range information can directly or indirectly specify the range of keys contained in the segment. In some embodiments, the range information can directly specify a minimum key for the segment. A maximum key can be associated with the level. The key range for a segment can then be defined by the minimum key of the segment and the minimum key of the next segment (or the maximum key for the last segment in the level). In some embodiments, the range information can directly specify the maximum and minimum keys for the segment.

In some embodiments, the range information can indirectly specify the range of keys included in the segment by referencing other metadata of the node. For example, as described herein, a node in a storage structure can have child nodes (or leaves). The range information for a segment can specify which child nodes (or leaves) have key-ranges overlapping with the key-range of key-value data contained in the segment. The range information for a segment can specify these child nodes in combination with other information in the node. For example, a node can include a sequence of references to child nodes (or leaves). The range information included in the segment can refer in turn to the references included in the node. For example, the node can include a list of pivots, each pivot including key-range information (e.g., a minimum key, a minimum and maximum key, or the like) and including a reference to a child node (or leaf). The list can be sorted by the key-range information included in the pivots. The range information included in the segment can then be a range of pivot indices in the sorted list of pivots (e.g., ⟨$p_{min}$, $p_{max}$⟩) In some embodiments, a node can be configured such that the number of segments in the final level of the update buffer matches the number of child nodes. When this condition is satisfied, there will always exist a segment falling entirely within the key range of a child node. As described herein, this segment can be removed from the node and flushed to the child node. In some instances, when the initial level of the update buffer of the child node is empty, the child node can be updated to reference the data portion containing the segment. In this manner, the key-value data contained in the segment can be transferred from the node to the child node without rewriting the data. Otherwise, the contents of the segment can be combined with the contents of the initial level of the update buffer of the child node. The results of this combination can be stored in the second level of the update buffer of the child node.

In some embodiments, value data can be stored in segments separate from segments storing key data. As may be appreciated, in some instances value data may be substantially larger than key data. For example, in such instances, a value datum for an individual key-value entry may be comparable in size to the size of an entire node or leaf (e.g., multiple kilobytes to multiple megabytes). Writing key data together with value data in such instances may create excessive write amplification. Instead, the value datum can be retained in its own storage portions and a reference to the storage portion can be stored together with the key.

Furthermore, such an approach may reduce worst-case write and space amplification when large keys or values are inserted in random order. As may be appreciated, when keys written close in time are not close in storage location (e.g., when they must be written to different pages) write efficiency may decrease. If data is inserted in key order, however, this is not the case (e.g., a bulk ingest or transfer of all key/value data from one key-value store to another).

Multi-Versioning

Figure 6A:
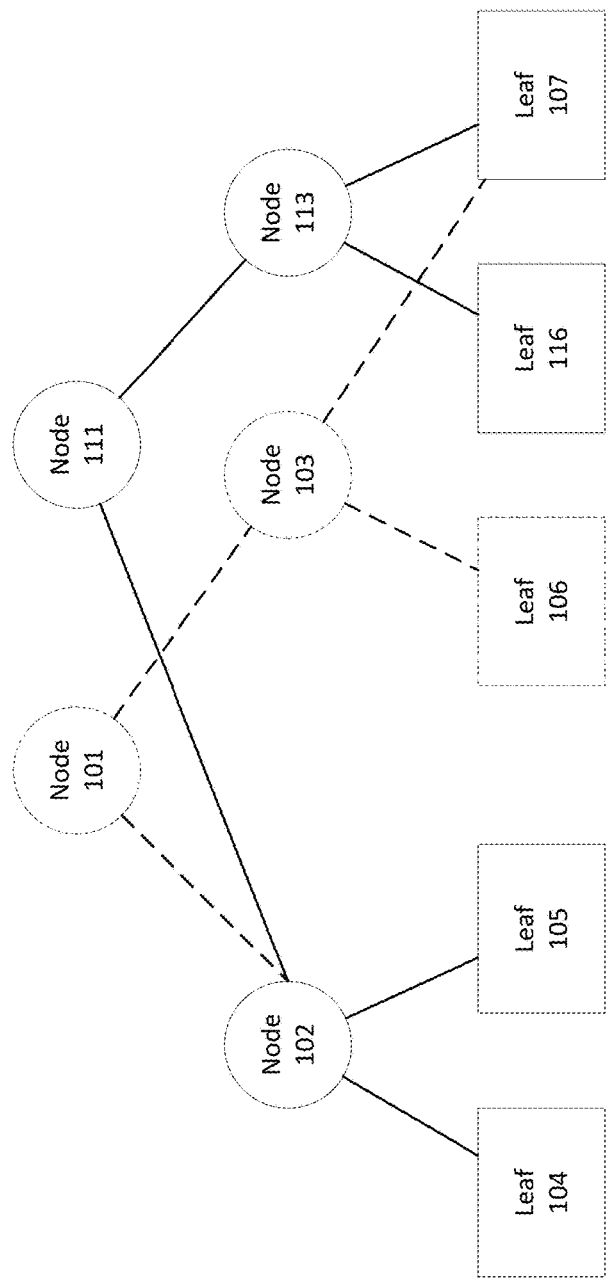
FIGS. 6A and 6B depict exemplary multi-versioning using a storage structure, consistent with disclosed embodiments.
Figure 6B:
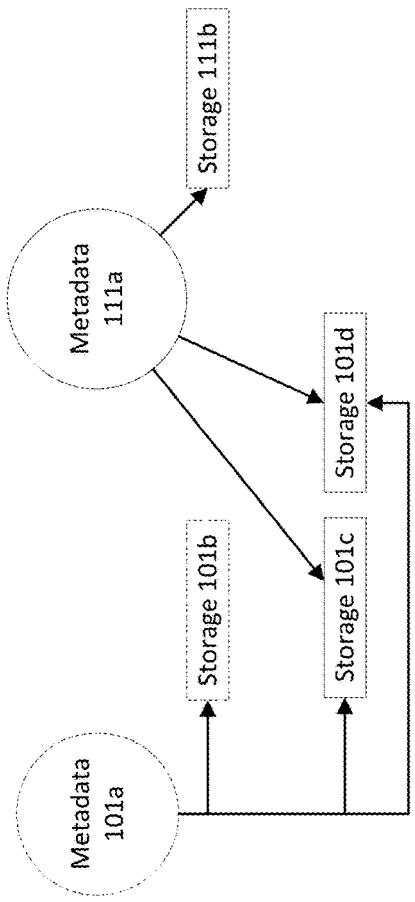

FIGS. 6A and 6B depict exemplary multi-versioning using a storage structure (e.g., storage structure 300) consistent with disclosed embodiments. In some embodiments, the storage structure can be implemented using a write-once model. In such a model, nodes and leaves are not overwritten when the contents of the nodes and leaves are updated. Instead, new nodes or leaves are integrated into the existing storage structure. Prior versions of the storage structure are therefore preserved (and can be restored, if necessary). In this manner, the disclosed embodiments can implement multi-versioning.

FIG. 6A depicts multi-versioning at the level of nodes and leaves, consistent with disclosed embodiments. As described herein, a parent node can include references to child nodes (or leaves). In this example, the storage structure can be logically updated by receiving data at node 101, updating node 101 and flushing data from node 101 to node 103, updating node 103 and flushing data from node 103 to leaf 106, and updating leaf 106.

Consistent with disclosed embodiments, this logical update can be implemented by creating a new version of leaf 106 (e.g., leaf 116), a new version of node 101 (e.g., node 111), and a new version of node 103 (e.g., node 113). New node 111 can include references to node 102 and to new node 113. New node 113 can include references to leaf 107 and to new leaf 116. Thus, only the nodes that were updated are changed, and the prior versions of node 101, node 103, and leaf 106 are retained (and can be accessed again, if necessary).

FIG. 6B depicts an exemplary implementation of multi-versioning, consistent with disclosed embodiments. In this example, node 101 can contain an update buffer having two levels, the first level including one segment and the second level including two segments. Node 101 can be implemented using storage portions (e.g., metadata portion 101a and data portions 101b, 101c, and 101d). Metadata portion 101a can include references to data portions 101b, 101c, and 101d. Data portion 101b can store the data contained in the segment of the first level. Data portions 101c and 101d can respectively store the data contained the first and second segments of the second level.

In this example, the segment of the first level can be updated by creating new versions of data portion 101b (e.g., data portion 111b) and metadata portion 101a (e.g., metadata portion 111a). Metadata portion 111a can include references to data portions 101c, 101d, and 111b.

In response to a scan or update request directed to the current version of the storage structure, the key-value engine can traverse the storage structure using metadata portion 111a. Metadata portion 111a can be loaded and used to identify data portion 111b, which can be scanned for suitable key value entries or used to generate an updated data portion.

Alternatively, in response to a scan or update request directed to the prior version of the storage structure (e.g., reversion request, or the like), the key-value engine can traverse the storage structure using metadata portion 101a. Metadata portion 101a can be loaded and used to identify data portion 101b, which can be scanned for suitable key value entries or used to generate an updated data portion. As may be appreciated, an update request directed to a prior version can create new nodes and leaves, thereby forking the chain of storage structure versions.

As may be appreciated, multi-versioning can require the key-value engine maintain entry points into the prior versions of the storage structure. In some embodiments, such entry points can be maintained through the write-ahead log. As described herein, the write-ahead log can include checkpoints. In such embodiments, a checkpoint can include a reference to a root node of a version of the storage structure (or the metadata portion of such a root node). Each checkpoint stored in the write-ahead log can then correspond to, and serve as an entry point for, a version of the storage structure. In some embodiments, the key-value engine can be configured with an additional database that stores references to prior checkpoints. The disclosed embodiments are not limited to a particular type or implementation of such a database. In some embodiments, the additional database can be a storage structure as described herein.

In some embodiments, the key-value engine can be configured to store snapshots. The key-value engine can be configured to store the snapshot when a condition is satisfied (e.g., according to a schedule, in response to an event, or the like). Storing a snapshot can include storing, in the additional database, a reference to the current checkpoint (which serves as an entry point into the prior version of the storage structure) and any writes present in the write-ahead log. As may be appreciated, the state of the key-value engine at the time of the snapshot can be recreated from the reference to the current checkpoint and the writes present in the write-ahead log.

In some embodiments, the key-value engine can be configured to automatically generate a new entry in the additional database with each write to the write-ahead log. While such an implementation could give applications automatic and unlimited "undo" or time-travel through the edit history of the database, it could increase space requirements proportional to $$U \log_2\left(\frac{U}{L}\right),$$

where U is the total number of writes and L is the size of the data portions.

Dynamic Tuning

In some embodiments, a storage structure can be characterized in terms of two parameters, a space amplification parameter ($\delta$) and a height-independent scaling parameter ($\gamma$). The space amplification parameter can control space amplification by varying the size of batches that are flushed down the storage structure according to the height (e.g., distance from leaves). In some embodiments, space amplification parameter can be greater than or equal to zero. In some embodiments, the lower the value of the space amplification parameter, the less the batch size decreases with decreasing height in the storage structure. The height-independent scaling parameter can act as a scaling factor across all heights of the tree. In some embodiments, the lower the value of the height-independent scaling parameter, the smaller the size of the batch updates at all levels of the storage structure.

In some embodiments, the size of the batch flushed from at a node in the storage structure can be:

$$X_h = \frac{\gamma L}{2^{\delta h}}$$

In some embodiments, the size of the flushed batch can be limited to be at least one key-value entry and at most one full leaf. As may be appreciated, setting the space amplification parameter to zero can cause the batch size to remain the same for all heights in the storage structure. In general, setting the space amplification parameter to lower values can improve write performance (e.g., reduce write amplification) at the cost of greater read- and space-amplification. Conversely, increasing the space amplification parameter can reduce read- and space-amplification at the cost of higher write amplification.

In some embodiments, non-zero values of space amplification parameter can cause the maximum space amplification per key to become constant. In some implementations, higher space amplification parameter values can cause lower constant maximum space amplification per key. This result arises from the convergence of the geometric sum of the space required to store a key value entry at each level of the storage structure:

$$\sum_{h=0}^{\log_B N} \frac{1}{2^{\delta h}} = 1/2 + 1/2^\delta + 1/2^{2\delta}$$

Consistent with disclosed embodiments, the envisioned storage structure can achieve this constant upper bound on space amplification at the expense of an additional log-term in write amplification.

In some embodiments, increasing the value of the height-independent scaling parameter can increase the write performance at the expense of increasing read- and space-amplification (e.g., higher values of the scaling parameter can improve write performance, while lower values can improve read and space performance). In some embodiments, the scaling parameter can be adjusted to tune between read- and write-optimization. Increasing the scaling parameter can increase space amplification as a function of tree height, while maintaining the original log-function cost of writes.

As may be appreciated, the height-independent scaling parameter and the space amplification parameter can be adjusted in combination to configure the key-value storage engine with an application-specific trade-off between read, write, and space performance.

In some embodiments, the height-independent scaling parameter and the space amplification parameter can be specified prior to deployment of a key-value engine. For example, the height-independent scaling parameter and the space amplification parameter for a key-value engine consistent with disclosed embodiments can have default values, values specified in configuration files or declarative specifications, values received from a user or another system, or the like.

In some embodiments, the height-independent scaling parameter and the space amplification parameter can be specified after deployment of a key-value engine. For example, based on workload characteristics (e.g., scan request rates, write request rates, or the like) the height-independent scaling parameter and the space amplification parameter can be adjusted or updated. Such adjustments can be performed manually or automatically. For example, a user can interact with the data storage system to change the height-independent scaling parameter and the space amplification parameter. As an additional example, the data storage system can update the height-independent scaling parameter and the space amplification parameter according to some control logic. For example, the control logic can specify that if a scan request rate exceeds a threshold value, then the height-independent scaling parameter value should be decreased (and/or the space amplification parameter increased).

In response to a change in tuning parameters, at least one of the size of batches collected from the write-ahead log or the size of batches flushed down the storage structure can change. Such change(s) may take many batches (and checkpoints) to propagate down the storage structure. In some cases, a change in tuning parameters may result in a temporarily higher rate of node splits and/or merges as update buffers are filled or drained to reach a new equilibrium state in accordance with the updated tuning parameters.

In some embodiments, the space amplification parameter can be negative. In such embodiments, the size of the update buffer can grow the higher the node is located in the storage structure. Accordingly, the size of the buffer may increase the higher the level of the node in the storage structure. For example, when $\delta=-1$, a node in the first level of the storage structure above the leaves (h=1) may have a batch size:
a buffer size of:
and a number of levels:

$$X_1 = \frac{\gamma L}{2^{-1}} = 2\gamma L$$
$$S_1 = 2\gamma L(n-1)$$
$$D_1 = \lceil \log_2(2\gamma(n-1)) \rceil$$

A node in the second level of the storage structure above the leaves (h=2) may have a batch size twice as great (e.g., $4\gamma L$), a buffer size twice as great (e.g., $4\gamma L(n-1)$) and potentially a greater number of levels (e.g., $\lfloor \log_2(4\gamma(n-1)) \rfloor$).

As discussed herein, the capacity of a metadata portion can constrain the number of child nodes and the buffer size. For example, each child node can be associated with child metadata (e.g., child metadata 411) and buffer metadata (e.g., buffer metadata 431). In some embodiments, an increase in the number of child nodes can increase both the amount of child metadata and the amount of buffer metadata. Thus, increasing the number of child nodes can cause the parent node to split. In some embodiments, changing tuning parameters can increase the batch size for a node, which can increase the buffer size and thus size of the buffer metadata. Thus, changing tuning parameters can cause a node to split. Furthermore, the amount of buffer metadata can depend (through the space amplification parameter) on the height of the node in the storage structure. For example, when the space amplification parameter is positive, nodes higher in the storage structure can have smaller update buffers and potentially less buffer metadata than nodes lower in the storage structure. Accordingly, nodes higher in the storage structure may be able to support more child nodes (e.g., have a potentially greater branching factor) than nodes lower in the storage structure, while nodes lower in the storage structure may have larger update buffers. Conversely, when the space amplification parameter is negative, nodes higher in the storage structure may be able to support fewer child nodes than nodes lower in the storage structure, but may have larger update buffers.

Figure 7A:
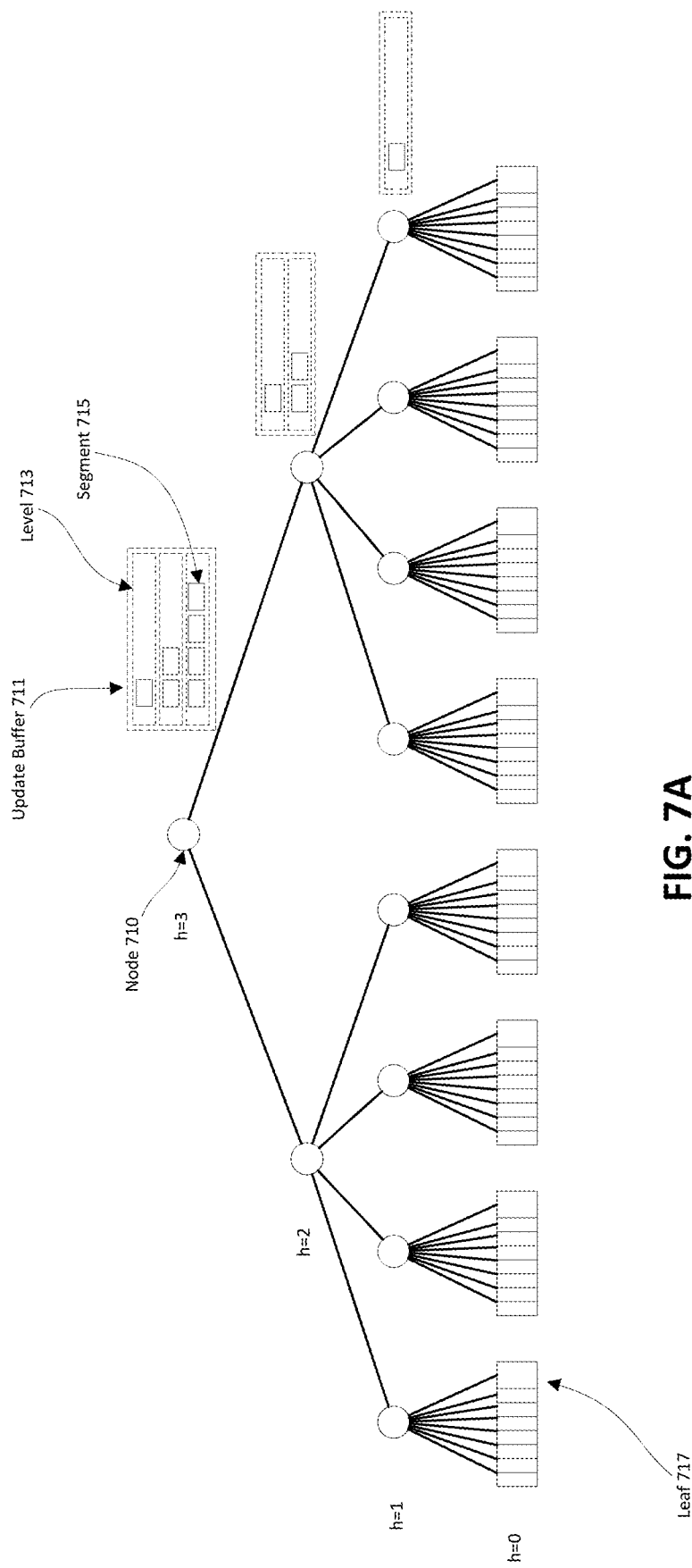
FIGS. 7A to 7C depict storage structures having different configurations of tuning parameters, consistent with disclosed embodiments.
Figure 7B:
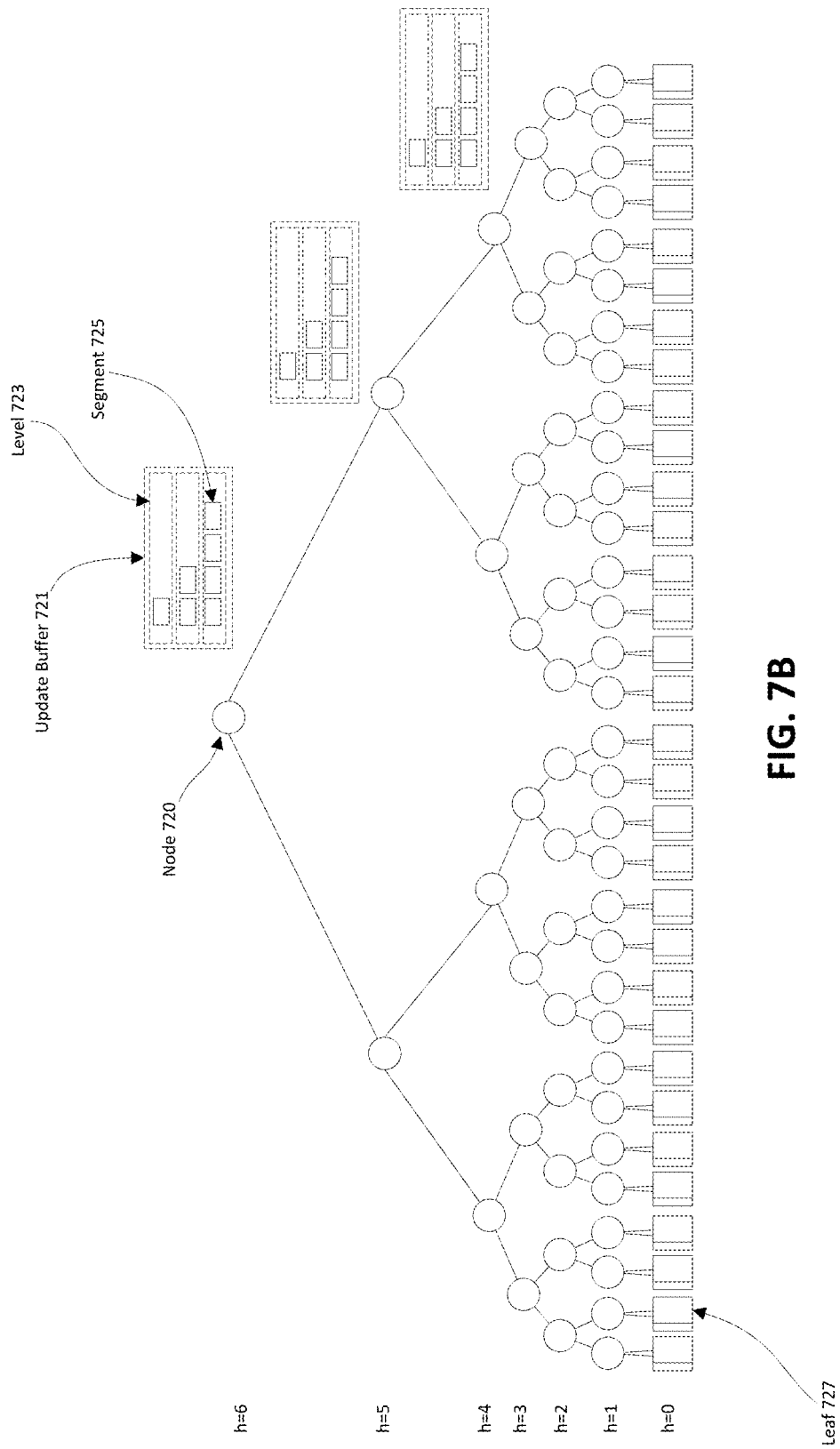
Figure 7C:
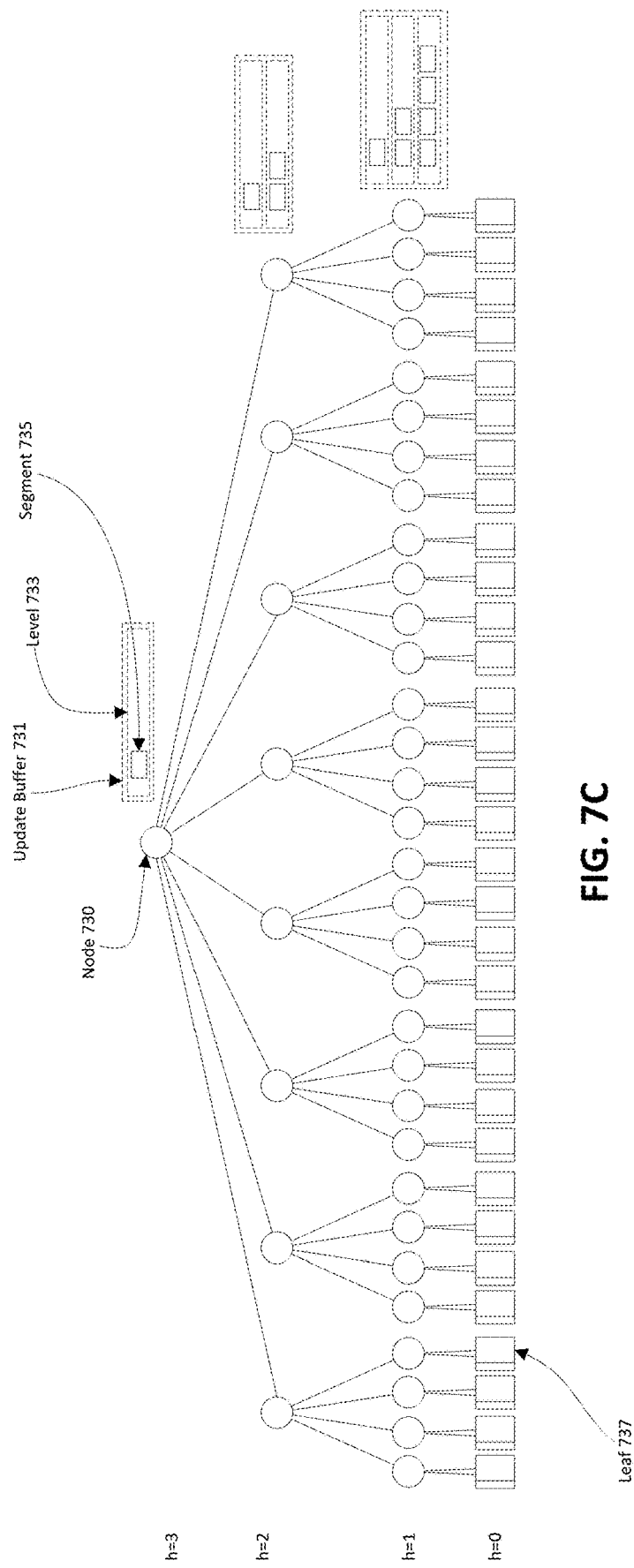
Figure 7H:
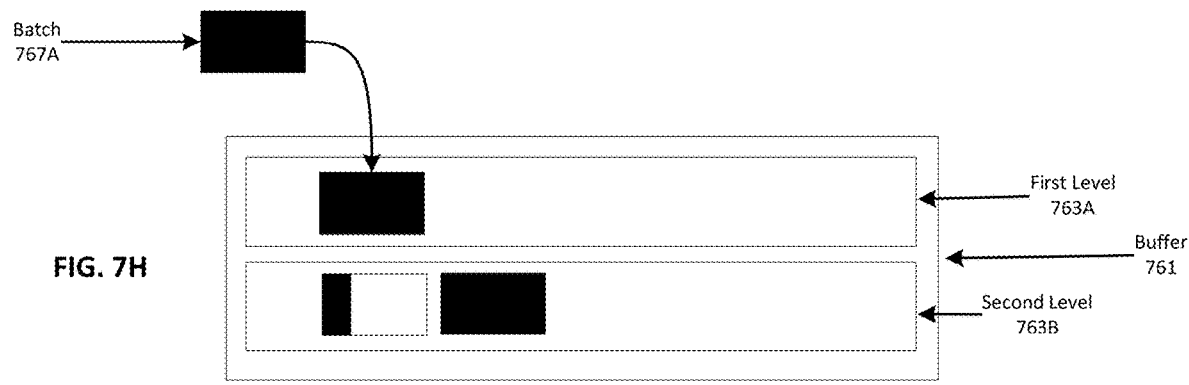
FIGS. 7D to 7Y depict the exemplary flushing of key-value data to an update buffer of a node, the movement of key-value data within the update buffer, and the flushing of key-value data from the update buffer, consistent with disclosed embodiments.

FIGS. 7A to 7C depict storage structures having different configurations of tuning parameters, consistent with disclosed embodiments. Each of the storage structures depicted can have the same number of leaves. However, the height of the storage structures, the branching of the storage structures, and the size and configuration of the update buffers can differ, affecting the read, write, and space amplification of these storage structures.

Consistent with disclosed embodiments, the tuning parameters, configuration of the update buffer, and branching factor of the node can be related through the space constraint imposed by the metadata portion. As described herein, the tuning parameters $\delta$ and $\gamma$ can determine the amount of data received by a node and flushed by the node. The update buffer can be sized based on the amount of data received and flushed. The size of the update buffer can determine the amount of the metadata portion required by buffer metadata, which can in turn determine the amount of the metadata portion available for child metadata. The amount of the buffer available for child metadata can in turn affect the maximum number of child nodes for the node.

As may be appreciated, the examples depicted in FIGS. 7A to 7C are intended to be exemplary. In practice, the number of child nodes would likely vary between nodes at each level of the structure, as child nodes were added and removed. Furthermore, the values of the tuning parameters have been selected to exaggerate the variation in branching factor and update buffer size.

FIG. 7A depicts a storage structure configured for improved space amplification, at the cost of read amplification and write amplification. The storage structure comprises nodes (e.g., node 710) and leaves (e.g., node 717). The nodes contain update buffers (e.g., update buffer 711). The update buffers contain one or more levels (e.g., level 713) and the levels contain one or more segments (e.g., segment 715). This storage structure is configured with a negative space amplification parameter (e.g., $\delta=-2.86$) and height-independent scaling parameter (e.g., $\gamma=0.02$) that causes the buffer size to increase by one level with each increase in node height in the storage structure. The potential number of child nodes correspondingly decreases at higher node in the storage structure.

FIG. 7B depicts a storage structure configured for a balance between read and write amplification, at the cost of increased space usage. As can be appreciated, increased size of the update buffer can reduce the branching factor of the storage structure, increasing the number of nodes required to support the same number of leaves. The increased number of nodes can in turn imply an increased number of update buffer levels and therefore an increase in space amplification. The storage structure comprises nodes (e.g., node 720) and leaves (e.g., node 727). The nodes logically contain update buffers (e.g., update buffer 721). The update buffers logically contain one or more levels (e.g., level 721*a*) and the levels contain one or more segments (e.g., segment 721*b*). This storage structure is configured with a space amplification parameter equal to zero (e.g., $\delta=0$) and height-independent scaling parameter (e.g., $\gamma=8$) that causes the buffer size to remain constant as node height increases in the storage structure (although in practice the number of child nodes would likely be substantially larger and the height-independent scaling parameter would likely be less than 1).

FIG. 7C depicts a storage structure configured to reduce space amplification, at the cost of increased write amplification. The storage structure comprises nodes (e.g., node 730) and leaves (e.g., node 737). The nodes logically contain update buffers (e.g., update buffer 731). The update buffers logically contain one or more levels (e.g., level 731*a*) and the levels contain one or more segments (e.g., segment 731*b*). This storage structure is configured with a positive space amplification parameter equal (e.g., $\delta=2.5$) and height-independent scaling parameter (e.g., $\gamma=40$) that causes the buffer size to decrease as node height increases in the storage structure (although in practice the number of child nodes would likely be substantially larger at the lower levels and the height-independent scaling parameter would likely be less than 1).

Figure 7I:
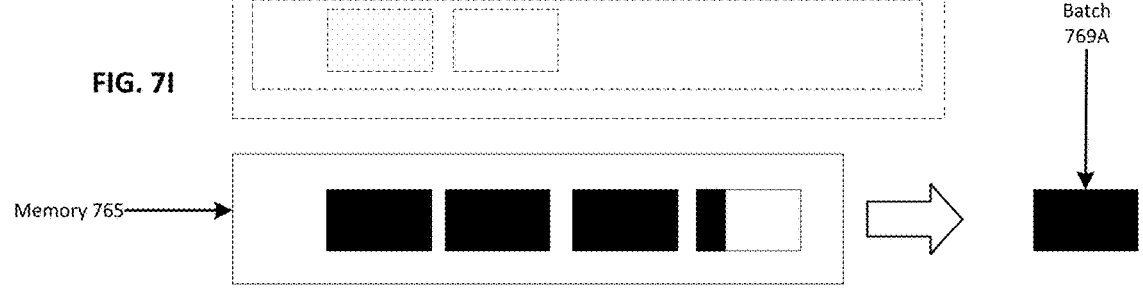
Figure 7J:
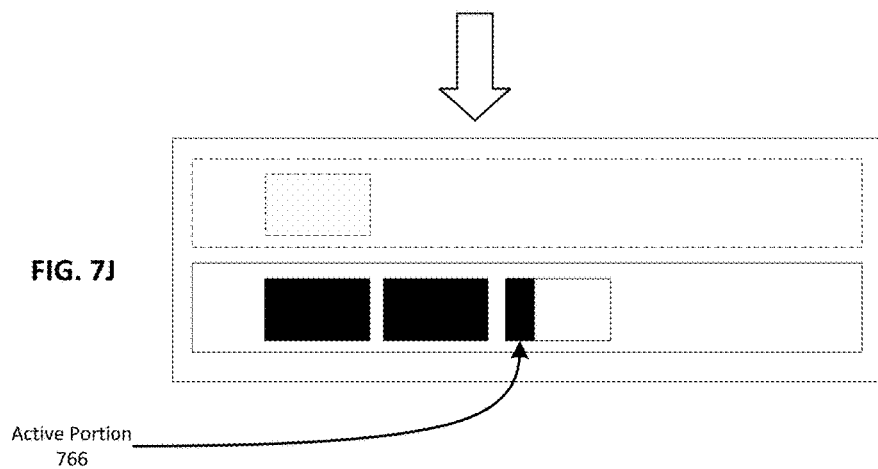
Figure 7V:
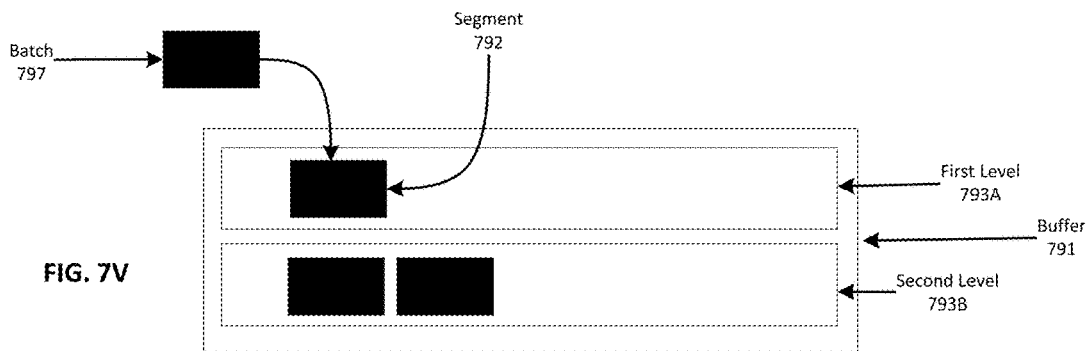
Figure 7W:
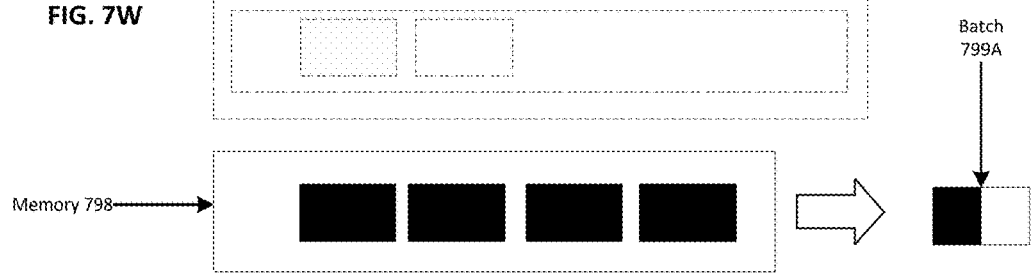
Figure 7X:
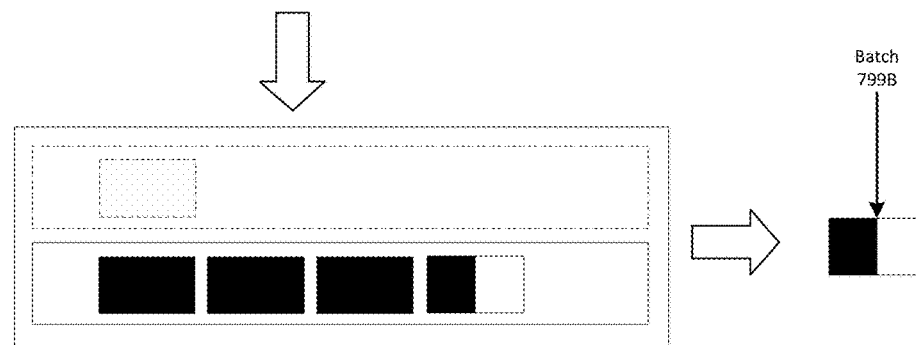
Figure 7Y:
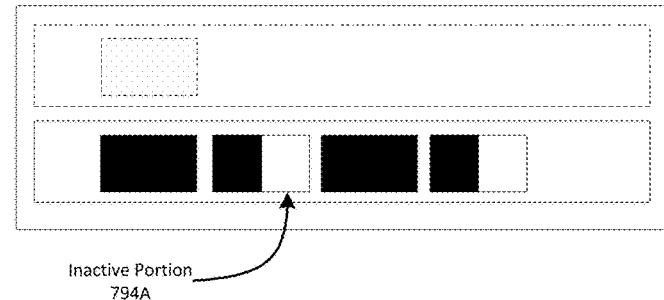

FIGS. 7D to 7Y depict the exemplary flushing of key-value data to an update buffer of a node, the movement of key-value data within the update buffer, and the flushing of key-value data from the update buffer, consistent with disclosed embodiments. For ease of description, these operations are described as being performed by a key-value engine. However, these operations can be performed, in whole or in part, by any suitable computing system component or arrangement of components. The input batches described in these examples can be received from another node, or from a write-ahead-log, or the like, depending on the location of the node containing the depicted buffer.

In some embodiments, an input batch can be stored in cache or memory (e.g., random access memory, or the like), while the depicted buffer can be implemented using data portions stored in a storage medium (e.g., a solid-state drive, magnetic drive, or the like). In such embodiments, the key-value engine can write the batch (or a portion of the batch) to a data portion and write an updated metadata portion including a reference to the data portion, consistent with multi-versioning as described herein.

Similarly, in some embodiments an output batch can be stored in cache or memory, while the depicted buffer can be implemented using data portions stored in a storage medium. In such embodiments, the key-value engine can write the batch (or a portion of the batch) to a data portion and associate the data portion with an update buffer of a child node of the depicted node, consistent with multi-versioning as described herein.

In some embodiments, an input batch can be stored in a storage medium. For example, a batch can be a data portion in an update buffer of the parent to the node containing the depicted buffer. In such embodiments, the key-value engine can write an updated metadata portion including a reference to the data portion implementing the input batch, without re-writing the contents of the input batch, consistent with multi-versioning as described herein.

Similarly, in some embodiments an output batch can be stored in a storage medium. In such embodiments, the key-value engine can write an updated metadata portion for a child node of the depicted node, the updated metadata portion including a reference to the data portion implementing the output batch, consistent with multi-versioning as described herein.

Similarly, in some embodiments, updates to segments of an update buffer can be implemented by writing an updated metadata portion including references to the new data portions that implement the updated segments, consistent with multi-versioning as described herein.

In FIGS. 7D to 7Y, batches (or segments) including an amount of key-value data (or active key-value data) equal to the capacity of a data portion are described as full and depicted as filled rectangles. Otherwise, the batches (or segments) are described as partially full and depicted as partially filled rectangles. In some embodiments, the active status of key-value data contained in segments can be implemented using filters, as described herein. Segments, update buffer levels, or update buffers that do not contain data (or contain only inactive date) are indicated with broken lines, while segments, update buffer levels, update buffers that do contain data are indicated with solid lines.

In FIGS. 7D to 7Y, sequences of key-value data contained in batches and/or segments are combined to generate new sequences of key-value data. In some embodiments, such combining can be performed using parallelized key-value sequence merging, as described herein.

FIGS. 7D and 7E depict the storage of input batch 747 in first level 743A of update buffer 741, consistent with disclosed embodiments. As depicted in FIG. 7D, batch 747 contains an amount of key-value data equal to the capacity of a data portion and buffer 741 is empty. As depicted in FIG. 7E, the key-value engine can store the contents of batch 747 in segment 745 of first level 743A.

FIGS. 7F and 7G depict the storage of batch 757 in update buffer 751, consistent with disclosed embodiments. As depicted in FIG. 7F, update buffer 751 contains first level 753A and second level 753B. First level 753A contains segment 755. Segment 755 contains active key range data 756. The remainder of the key-value data contained in segment 755 can be inactive.

In some embodiments, the key-value engine can merge batch 757 and the contents of segment 755. As depicted in FIG. 7G, the combination of batch 757 and segment 755 can be carried to second level 753B of update buffer 751. The result of the merger can be written into data portions implementing segment 758 and segment 759 of second level 753. As may be appreciated, the contents of active key range 760 may include key-value entries drawn from both batch 757 and active key range data 756.

FIGS. 7H to 7M depict the storage and flushing of multiple batches, consistent with disclosed embodiments. As depicted in FIG. 7F, update buffer 761 can contain a first level 763A and second level 763B. First level 763A can contain a full segment, while second level 763B can contain a partially full segment and a full segment. The key-value engine can flush full batch 767A to buffer 761.

In some embodiments, the key value engine can combine batch 767A into buffer 761 in a manner similar to binary addition, consistent with disclosed embodiments. The key value engine can combine the contents of first level 763A and batch 767A (e.g., after determining that first level 763A is non-empty, or the like). The key value engine can then combine the result of this combination with the contents of second level 763B.

As depicted in FIG. 7I, the combination of batch 767A, the contents of first level 763A, and the contents of second level 763B can be contained in memory 765 (e.g., cache, random access memory, or another suitable location). For clarity, the result is depicted as being divided into segments. But this depiction is not intended to be limiting. The result can be logically stored in memory 765 as a continuous sequence of key-value data, or multiple such sequences, without limitation.

In some embodiments, the key value engine can determine that the contents of memory 765 satisfy a flush buffer condition. As described herein, in some embodiments the flush buffer condition can be satisfied when an amount of key-value data within a key range of a child node is greater than (or equal to) an output batch size. The output batch size can be determined by one or more of the tuning parameters (e.g., the space amplification parameter and the height-independent scaling parameter), the height of the depicted node in the storage structure, and a size of the data portions implementing the update buffer of the depicted node.

In some embodiments, the key-value engine can generate output batch 769A in response to determining that the contents of memory 765 satisfy the flush buffer condition. The key-value data contained in batch 769A can be removed from memory 765. As depicted in FIG. 7J, the key-value engine can then write the remainder of memory 765 back to the final level of update buffer 761 (e.g., by writing the remainder of memory 765 to data portions and writing an updated metadata portion referencing these data portions).

Alternatively, the key value engine can write memory 765 back to the final level of update buffer 761, then determine that the contents of buffer 761 satisfy the flush buffer condition. The key-value engine can then generate output batch 769A and update buffer 761 to mark the key-value data contained in output batch 769A as inactive.

As depicted in FIG. 7K, the key value engine can store another batch 767B in the empty first level of update buffer 761. As depicted in FIG. 7L, the key value engine can determine that buffer 761 satisfies the flush condition. The key value engine can generate batch 769B. As described herein, batch 769B may include key-value entries drawn from multiple levels of buffer 761. FIG. 7M depicts the status of buffer 761 following the generation of batch 769B. Buffer 761 now includes inactive portions 765A, 765B, and 765C. As described herein, the key-value engine can update a metadata portion of the depicted node to implement the inactivation of the key-value entries in inactive portions 765A, 765B, and 765C.

FIGS. 7N to 7U depict the storage and flushing of multiple batches when the input batch is smaller than the output batch, consistent with disclosed embodiments. As may be appreciated, in some embodiments an input batch can be smaller than an output batch when the space amplification parameter is positive (e.g., $\delta=1$ as depicted). In some such embodiments, the key-value engine can accumulate input batches in the first level of the update buffer until a target capacity (e.g., one full data portion) of the first level of the update buffer is reached.

FIG. 7N depicts an update buffer 771 containing a first level 773A and a second level 773B. First level 773A contains a single partially full segment. Second level 773B contains two full segments. The size of input batch 777A is half the capacity of a data portion and therefore input batch 777A is depicted as partially filled. In some embodiments, the key value engine can combine input batch 777A and the contents of first level 773A. The key-value engine can update first level 773A to contain the result of the combination.

FIG. 7O depicts update buffer 771 after key-value engine updates first level 773A. First level 773A contains a single full segment. Second level 773B contains two full segments. The size of input batch 777B is half the capacity of a data portion. In some embodiments, the key value engine can combine input batch 777B and the contents of first level 773A. The key-value engine can determine that an amount of key-value data in the result of the combination is greater than the target capacity of first level 773A. Accordingly, the key-value engine can determine that second level 773B is non-empty and combine the result of combining input batch 777B and the contents of first level 773A with the contents of second level 773B.

As depicted in FIG. 7P, the key value engine can store the result of this combination in memory 778. For clarity, the result is depicted as being broken up into segments. But this depiction is not intended to be limiting. The result can be logically stored in memory 778 as a continuous sequence of key-value data, or multiple such sequences, without limitation. The key value engine can then store the contents of memory 778 in second level 773B.

As depicted in FIG. 7Q, the key value engine can determine that the contents of update buffer 771 satisfy a flush buffer condition. The key value engine can then generate batch 779A. The segments of second level 773B can be updated to identify inactive portions 780A and 780B that contain the key-value entries in batch 779A.

In some embodiments, the key-value engine can determine that the contents of memory 778 satisfy the buffer condition. The key value engine can then generate batch 779A prior to storing the contents of memory 778 in second level 773B. In some such embodiments, key-value entries included in batch 779A can be removed from memory 778 prior to the contents of memory 778 being stored in second level 773B.

As depicted in FIG. 7R, the key value engine can store another batch 777C in the empty first level 773A of update buffer 771. As depicted in FIG. 7S, the key value engine can accumulate another batch 777D in the now partially full first level of update buffer 771.

As depicted in FIG. 7T, the key value engine can determine that the contents of update buffer 771 satisfy a flush buffer condition. The key value engine can then generate batch 779B. In this example, the contents of batch 779B are included among the contents of first level 773A and the first segment of second level 773B (e.g., pruned segment 785). Because the contents of pruned segment 785 would be entirely inactive, the key value engine can prune this segment from buffer 771 (e.g., by writing an updated metadata portion for the depicted node that does not include this segment).

FIG. 7U depicts the status of buffer 771 following generation of batch 779. Pruned segment 785 has been removed, and only a portion of key value data contained in first level 773 is active.

FIGS. 7V to 7Y depict the storage and flushing of multiple batches when the input batch is larger than the output batch, consistent with disclosed embodiments. As may be appreciated, in some embodiments an input batch can be larger than an output batch when the space amplification parameter is negative (e.g., δ=−1 as depicted). By flushing multiple output batches, the key value engine can ensure that the size of the output buffer remains bounded.

FIG. 7V depicts an update buffer 791 containing a first level 793A and a second level 793B. First level 793A contains a single full segment 792. Second level 793B contains two full segments. Input batch 797 is a full batch. In some embodiments, the key-value engine can combine batch 797 and the contents of first level 793A (e.g., the contents of segment 792). The key-value engine can then determine that second level 793B is non-empty and combine the result of combining input batch 797 and the contents of first level 793A with the contents of second level 793B.

FIG. 7W depicts the combined contents of batch 797, first level 793A, and second level 793B stored in memory 798 (e.g., cache, random access memory, or another suitable location). For clarity, the result is depicted as being divided into segments. But this depiction is not intended to be limiting. The result can be logically stored in memory 798 as a continuous sequence of key-value data, or multiple such sequences, without limitation.

In some embodiments, the key value engine can determine that the contents of memory 798 satisfy a flush buffer condition. As described herein, in some embodiments the flush buffer condition can be satisfied when an amount of key-value data within a key range of a child node is greater than (or equal to) an output batch size. In some embodiments, the key-value engine can generate output batch 799A in response to determining that the contents of memory 798 satisfy the flush buffer condition. In this example, output batch 799A is partially full. The key-value data contained in batch 799A can be removed from memory 798.

In some embodiments, the key-value engine can first write the contents of memory 798 to segments associated with the second level of buffer 791, then generate output batch 799A. In such embodiments, key-value entries contained in the segments associated with the second level of buffer 791 can be rendered inactive when they are included in output batch 799A.

As depicted in FIG. 7X, the key value engine can determine that the contents of update buffer 791 satisfy a flush buffer condition. The key value engine can then generate batch 799B. The segments of second level 793B can be updated to identify inactive portion 794A that contains the key-value entries in batch 799B, as depicted in FIG. 7Y.

Key-Value Engine Operations

Consistent with disclosed embodiments, the key-value engine can support read and write operations. The read and write operations can accept data or references to such data and can return data or references to such data. For example, such operations can accept as input key-value data, or a reference to a location from which the key-value data can be obtained. Furthermore, the disclosed embodiments are not limited to any particular syntax, format, or specification for the arguments (e.g., key, key range, key-value entry, batch of key-value entries, or the like) or the outputs of these operations.

As described herein, the key-value engine can include a write-ahead log, a cache structure, and a storage structure. In some embodiments, the key-value engine can use a batch generator and a checkpoint generator to update the storage structure. The key-value engine can be configured to use these components and processes to respond to scan and write requests received from other components of a data storage and management system (e.g., an application layer, data systems layer, or the like).

In some embodiments, a key-value engine can be configured to respond to a write request by writing key-value data to the write-ahead log (e.g., write 212, 213, 214b as depicted in FIG. 2). A batch generator can monitor the write-ahead log. When a batch generation condition is satisfied, the batch generator can create a batch for updating the storage structure. In some embodiments, the batch can be a sorted, deduplicated set of key-value data.

In some embodiments, a checkpoint generator can be configured to perform a storage-structure level update operation on the storage structure using the batch, as described herein. The storage-structure level update operation can generate an updated version of the storage structure. In some embodiments, the checkpoint generator can identify a current version of the storage structure (e.g., using a snapshot object, a reference stored in the write-ahead log, or another suitable method). The storage-structure level update operation can be applied to the identified, current version of the storage structure.

In some embodiments, a key-value engine can be configured to respond to a scan request by retrieving key-value data from the cache structure and/or the storage structure. In some embodiments, the scan request can specify a key, set of keys, or range of keys. The key-value engine can search the cache structure for matching entries. In some embodiments, when the key-value engine retrieves from the cache structure an entry that contains an absolute value, the key-value engine may return the absolute value. In such an instance, the key-value engine may not search the storage structure. In some embodiments, when the key-value engine retrieves an entry for a key that contains a relative value, or does not return any matching entry, the key-value engine can search the storage structure for entries matching the key.

In some embodiments, the key-value engine can be configured to retrieve a set of entries matching the key from the storage structure (e.g., using a storage structure level search or scan, as described herein). Such entries may be obtained from a leaf and/or node(s). In some embodiments, the key-value engine can be configured to retrieve a combined entry using the storage structure. The combined entry can be a combination of a set of entries retrieved from the storage structure and matching the key.

In some embodiments, the key-value engine can be configured to maintain read point-in-time consistency. The key-value engine can be configured to maintain read point-in-time consistency using snapshot objects. In some embodiments, a snapshot objects can contain an offset value, a reference to the then-current storage structure, and a read-lock on at least a portion of the cached structure. In some embodiments, the offset value can be an offset from the oldest checkpoint in the write-ahead log (e.g., checkpoint 211 in FIG. 2, or the like). In some embodiments, the offset value can be an offset from the most recently written checkpoint (e.g., checkpoint 215, or the like). The value of the offset can be the number of logical bytes from a checkpoint (e.g., oldest, most recent, or the like) to the current end of the write-ahead log. In some embodiments, the snapshot object can also contain a lock on the checkpoint and/or the portion of the write-ahead-log between the checkpoint and the current end of the write-ahead log, preventing these components of the write-ahead log from being trimmed. The key-value engine can use the snapshot to scan the storage structure and/or the cache structure for requested key values. In some embodiments, once the key-values have been retrieved, the key-value engine can delete the snapshot object, releasing the locks.

In some embodiments, a snapshot can be persisted. As described herein, the storage structure can automatically support multi-versioning. An additional database can be configured to support snapshots by storing data portions containing key-value data present in the write-ahead log at a certain time. In some embodiments, the key-value data may be preserved in original append order, enabling reconstruction of the edits that were relevant at the time of the creation of the snapshot object. In some embodiments, a first data portion can store the contents of the write-ahead log from a checkpoint to the time of a first snapshot, while a second data portion can store the contents of the write-ahead log from the first snapshot to a second snapshot, etc. In some embodiments, the additional database can also store references to versions of the storage structure corresponding to checkpoints. Using the stored data portions and the stored references, the snapshot can be recreated.

Storage Structure Operations

Consistent with disclosed embodiments, a storage structure can support search and update operations. For ease of description, these operations are described as being performed by a key-value engine. However, these operations can be performed, in whole or in part, by any suitable computing system component or arrangement of components. Consistent with disclosed embodiments, such operations can accept data or references to such data and can return data or references to such data. For example, such operations can accept as input key-value data, or a reference to a location from which the key-value data can be obtained. Furthermore, the disclosed embodiments are not limited to any particular syntax, format, or specification for the arguments (e.g., the leaf, key, storage portion, or the like) or the outputs of these operations.

In some embodiments, the search operation can accept the storage structure and a key and return a value corresponding to the key. In some embodiments, the storage structure can support an update operation. The update operation can accept the storage structure and key-value data and return an updated storage structure. In some embodiments, the key-value data accepted as input by the update operation can be contained in a data portion. In some embodiments, such key-value data need not be stored in any individual data portion.

In some embodiments, the update operation can generate one or more new leaves and one or more new nodes. The updated storage structure can include references to the new node(s) and leave(s) but not references to node(s) and leave(s) rendered stale by the update operation. In some embodiments, the stale nodes and leaves can be preserved, thus implementing versioning, as described herein.

As described herein, nodes can be implemented using a metadata portion and data portion(s). In updating the storage structure to include references to the new node(s) and leave(s), the key-value engine can be configured to write new metadata portions and data portions. For example, the key-value engine can implement an updated node by writing a new metadata portion and new data portion(s). The new metadata portion can include a reference to each new data portion (and to any unchanged data portions). When the updated node is a child of a parent node, the key-value engine can write a new metadata portion for the parent node. The new metadata portion for the parent node can include a reference to the new metadata portion of the updated node (and to any changed or unchanged data portions of the parent node). In some embodiments, the key-value engine can be configured to recursively update the metadata portions of each node between the updated node and the root of the storage structure.

In some embodiments, a storage structure can support a scan operation. The scan operation can accept the storage structure and a range of keys. In some embodiments, the scan operation can return values for keys within range of keys (e.g., the scan operation can return key-value entries containing keys within the range of keys and corresponding values).

For convenience of explanation, the search, update, and scan operations are described herein in terms of the performance of these operations at the level of leaves and nodes. Performance of these operations on nodes is described with regards to searching an updating the update buffer of a node, and then with regards to searching and updating the node.

Leaf Operations

In some embodiments, the key-value engine can implement storage structure-level search, update, and scan operations using leaf-level search, update, and scan operations. For ease of description, these operations are described as being performed by a key-value engine. However, these operations can be performed, in whole or in part, by any suitable computing system component or arrangement of components. Consistent with disclosed embodiments, such operations can accept data or references to such data and can return data or references to such data. For example, such operations can accept as input key-value data or a reference to a location from which the key-value data can be obtained. Furthermore, the disclosed embodiments are not limited to any particular syntax, format, or specification for the arguments (e.g., the leaf, key, storage portion, or the like) or the outputs of these operations.

A leaf-level search operation can obtain a leaf and a key as input arguments and return a key-value as an output. The disclosed embodiments are not limited to any particular method of searching the leaf for a key-value entry. As described herein, the leaf can contain key-value entries sorted by key. In some embodiments, the leaf can be searched using a binary search (or another suitable search method) on the sorted key-value entries.

A leaf-level update operation can obtain a batch of key-value data (e.g., from a batch collector, generated in a node update operation, or the like) and a leaf as input arguments and return one or more new leaves as outputs. In some embodiments, the new data portions can be generated by combining the received batch with the contents of the leaf. In some embodiments, such combining can be performed using a recursive parallel merge operation, as described herein. In some embodiments, priority can be given to the contents of the batch. For example, when the batch includes an absolute value for a key, the absolute value can replace the value stored in the leaf for the key. When the batch includes a relative value for the key, the combining operation can generate a value for the key based on the value in the batch and the value in the leaf.

When the resulting sequence of key-value entries fits within a single data portion, a new leaf can be created to store the key-value entries. As described herein, the storage structure can be updated to refer to the new leaf. In some embodiments, the stale, prior leaf (and the parent node referencing it) can be retained for versioning. In some embodiments, when the resulting sequence of key-value entries is too large to fit in a single data portion, the key-value entries can be divided into two data portions. New leaves can be generated for each data portion and a new parent node can be created. This parent node can include references to the two new leaves. The new parent node can be integrated into the existing storage structure as described above with regards to FIGS. 3B to 3E.

A leaf-level scan operation can obtain a leaf and a key-range as input arguments and return a set of key-values as an output. In some embodiments, scans can be performed by searching the leaf for the start of a query key range, then enumerating key-value entries from that point in the leaf.

Buffer Operations

In some embodiments, the key-value storage engine can implement storage structure-level search, update, and scan operations using update buffer-level search, update, and flush operations. For ease of description, these operations are described as being performed by a key-value engine. However, these operations can be performed, in whole or in part, by any suitable computing system component or arrangement of components. Consistent with disclosed embodiments, such operations can accept data or references to such data and can return data or references to such data. For example, such operations can accept as input key-value entries or a reference to a location from which the key-value entries can be obtained. Furthermore, the disclosed embodiments are not limited to any particular syntax, format, or specification for the arguments (e.g., the leaf, key, segment, level or the like) or the outputs of these operations.

As described herein, the key-value engine can be configured to compact key-value entries received by a node or contained in the update buffer of the node. Such compaction can include logically overwriting or updating older stored key-value entries with newer key-value entries (as described herein, such overwriting can be implemented by writing new data portions). In some embodiments, the key-value engine can be configured to perform such compaction by merging an update batch of key-value entries into key-value entries contained in a level of the update buffer.

In some embodiments, the configuration of the update buffer can establish an intrinsic upper bound on the amount of compaction work required for an update. For example, in some embodiments a node can be implemented using a metadata portion having a bounded capacity. In such embodiments, the metadata for the update buffer may necessarily fit within the metadata portion (or an allocated fraction thereof). Such a limit can bound the number of data portions contained in the update buffer, and therefore the capacity of the update buffer and the amount of compaction work required for an update. The bound on the amount of compaction work can ensure that key-value engine remains responsive while performing such compaction (e.g., as opposed to conventional LSM-based key-value systems, which may either perform inefficient incremental compaction or risk stalling during compaction). Accordingly, a buffer architecture consistent with disclosed embodiments can provide efficiency and throughput improvements, as compared to conventional LSM-based approaches.

As the amount of work per "compaction increment" can vary, high key volume ingest workloads may exhibit greater average case workload than lower key volume workloads involving larger keys or values.

Figure 8A:
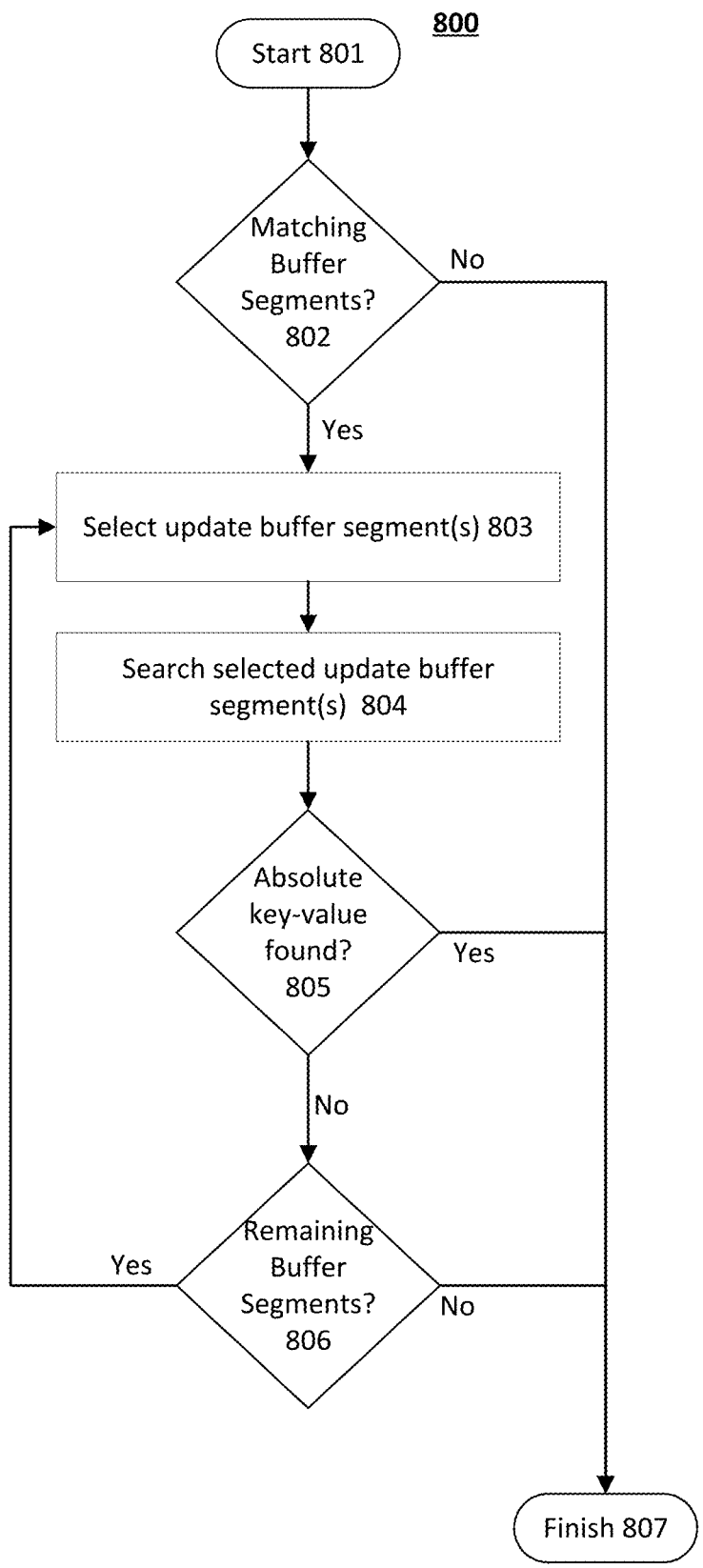
FIG. 8A depicts an exemplary flowchart of a buffer-level search operation, consistent with disclosed embodiments.

FIG. 8A depicts an exemplary flowchart of a buffer-level search operation 800 consistent with disclosed embodiments. Operation 800 can be performed as part of a storage structure-level operation (e.g., a search or scan operation as described herein) or as part of another operation.

In step 801, operation 800 can start. In some embodiments, input arguments to operation 800 can include a set of segments, a key, and range information. In some embodiments, the input arguments can include a node and/or an update buffer containing the segments and the range information. Consistent with disclosed embodiments, the range information can directly specify (e.g., using key ranges or minimum keys for each segment, or the like) or indirectly specify (e.g., using references to child metadata, such as indices into a sorted list of keys associated with child nodes) the key ranges associated with the segments.

In step 803, the key-value engine can identify segments contained in the update buffer that match the key, consistent with disclosed embodiments. In some embodiments, the key-value engine can identify the segments using the range information. For example, the key-value engine can identify the segments having a key range that includes the key. As an additional example, the key-value engine can identify segments that in turn identify pivots containing key-ranges that include the key. For example, as described herein, a segment in the update buffer of a node can include a reference to a pivot in a list of pivots maintained by the node. The pivot can include a reference to a child node and specify a key range for the child node. The key-value engine can select, from among the identified segments, the segment contained in the lowest level of the update buffer. As may be appreciated, if no segments matching the key are identified, operation 800 can proceed to step 807.

In step 803, the key-value engine can select identified buffer segment(s) for search, consistent with disclosed embodiments. In some embodiments, the key-value engine can select for searching the lowest unsearched buffer level segment. As may be appreciated, the lower levels of the update buffer can contain the most recently received key-value data. In some embodiments, the key-value engine can search multiple segments in parallel. For example, as described herein, a metadata portion of a node can include the range information. Thus, the key-value engine can retrieve the metadata portion, identify the segments of the update buffer matching the key, and retrieve these segments in parallel, increasing the performance of the read operation.

In step 804, the key-value engine can search the selected update buffer segment, consistent with disclosed embodiments. The key-value engine can search the selected update buffer segment using a leaf-level search operation, as described herein. In some embodiments, in extracting key-value data from segments, the key-value engine can filter the data based on the filters associated with the segments.

In step 805, the key-value engine can determine whether the leaf-level search operation returned an absolute value. As described herein, an absolute value for a key does not depend upon another value for the key. When the leaf-level search operation returns an absolute value for a key, operation 800 can proceed to step 807, as no further searching of the buffer may be required. Otherwise (e.g., when the leaf-level search operation returns a relative key or no key), operation 800 can proceed to step 806.

In step 806, the key-value engine can determine whether any of the identified segments remain unsearched. The disclosed embodiments are not limited to any particular method of tracking which segments remain unsearched. In some embodiments, the key-value engine can maintain a list of unsearched segments (e.g., ordered by buffer level) and remove segments from the list as they are searched. When identified segment(s) remain unsearched, operation 800 can return to step 803. Another segment can then be selected for search (e.g., the remaining segment contained in the lowest buffer level). Otherwise, operation 800 can proceed to step 807.

In step 807, operation 800 can terminate. As may be appreciated, the identified segments may contain multiple key-value entries for the obtained key. Some of these key-value entries can include relative values. The value of such key-value entries may not be resolved until an entry containing an absolute value is identified. Accordingly, the key-value engine can be configured to track relative values returned in multiple iterations of step 804. The disclosed embodiments are not limited to any particular method of tracking relative values. In some embodiments, the key-value engine can collect a set of relative values and determine the returned value when and if an absolute value is returned in step 804. In some embodiments, the key-value engine can combine values as they are returned. For example, if the relative value "increment by 2" is returned in a first iteration, and the relative value "decrement by 3" is returned in the next iteration, the key-value engine can combine these relative values into the tracked value "decrement by 1." If the next iteration returned the absolute value "10," this absolute value can be combined with the tracked value to yield the value "9." The value "9" can then be returned in step 807.

In some embodiments, operation 800 can scan for a key range. In such embodiments, segments overlapping the key range can be identified using the range information. In step 804, operation 800 can use the leaf-level scan operation to return key-value entries matching the key range. In some embodiments, in extracting key-value data from segments, the key-value engine can filter the data based on the filters associated with the segments. The key-value engine can track the returned values over multiple iterations of step 804, updating the tracked values as relative or absolute values are returned. In some embodiments, once an absolute value is returned for a key, no further updates of that key are performed.

In some embodiments, rather than returning a set of key-value entries matching a key range, operation 800 can return an amount (e.g., number of bytes, items, or another suitable measure) of key-value data matching the key range. For example, the key-value engine can obtain a key range (e.g., the key range associated with a child node or leaf) and determine the number of bytes of key-value data included in the update buffer that matches the key range.

Figure 8B:
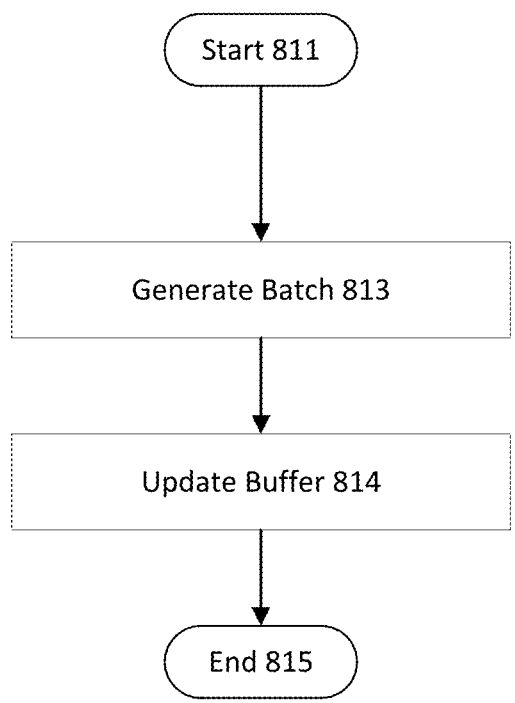
FIG. 8B depicts an exemplary flowchart of a buffer-level flush operation, consistent with disclosed embodiments.

FIG. 8B depicts an exemplary flowchart of a buffer-level flush operation 810 consistent with disclosed embodiments. Operation 810 can be performed as part of a storage structure-level operation (e.g., an update operation as described herein) or as part of another operation. In some embodiments, performance of the buffer-level flush operation can prevent the update buffer from growing without bound as additional key-value data is flushed to the node. As described herein, ensuring that the contents of the node are bounded can support efficient data compaction and improve the throughput of the key-value engine.

In some embodiments, operation 810 can include flushing key-value data within a key range to a child of the node. The key range can be associated with the child of the node. In some embodiments, the key-value engine can select the key range based on child data contained in the node. As described herein, the node can have child nodes (or leaves). The child data contained in the node can indicate amounts of key-value data contained in the update buffer and associated with the child nodes (or leaves). As described herein, the child nodes (or leaves) can be associated with key-value ranges. The child data contained in the node can indicate amounts of key-value data contained in the update buffer and associated with the key-value ranges. The disclosed embodiments are not limited to any particular manner of indicating such amounts. In various embodiments, the amounts can be indicated as bytes, items, or any other suitable unit of measurement.

In some embodiments, the key-value engine can determine whether an amount of key-value data contained in the update buffer and associated with a child node (or leaf) exceeds a threshold value. When the threshold value is exceeded for any child node (or leaf), the key-value engine can perform operation 810.

In some embodiments, operation 810 can include flushing a specified amount of key-value data to a child node (or leaf). In some embodiments, the specified amount can depend on at least one of data portion capacity, a height of the node containing the set of segments in the storage structure, or tuning parameters (e.g., as described herein with respect to the dynamic tuning parameters). The choice of tuning parameters can reflect an intended tradeoff between read, write, and space amplification.

As described herein, the key-value engine can be configured to accumulate batches of size less than the capacity of a full data portion in the first level of the update buffer, or to combine received batches with the existing contents of the first level of the update buffer and push the combination down to the second level of the update buffer. However, as may be appreciated, in some instances the combination of tuning parameters may result in awkward batch sizes. For example, when δ=0.5, h=1, and γ=1, the calculated batch size can be approximately 0.707 L. Such a batch size may be too large to accumulate multiple batches in the initial level of a buffer. However, such a batch size may be too small to efficiently combine and push down to lower levels in the update buffer.

The key-value engine can address such awkward batch sizes by flushing batches of varying standardized sizes to achieve a specified average batch size. The standardized size can be multiples or quotients of small integer numbers (e.g., 2 L, L, L/2, L/3, L/4, etc.). The key-value engine can track an offset to determine the size of the next batch to flush. For example, the key-value engine can be configured to achieve a specified average batch size of 0.707 L for a child node. The key-value engine can flush 0.5 L to the child node and track an offset of −0.207 L, then flush 1 L and track an offset of 0.086 L, then flush 0.5 L and track an offset of −0.121 L, then flush 1 L and track an offset of 0.171 L, then flush 0.5 L and track an offset of −0.035 L, then flush 1 L and track an offset of 0.257 L, then flush 0.5 L and track an offset of 0.050 L, and then flush 0.5 L. Overall, the node can flush 5.5 L in eight batches, for an approximate batch size of 0.685 L. As may be appreciated, the more batches flushed, the more the approximate batch size may approach the specified average batch size (e.g., the batch size calculated based on height and tuning parameters).

In step 811, operation 810 can start. In some embodiments, input arguments to operation 810 can include a set of segments, a key range, and range information for the segments. In some embodiments, the input arguments can include a node and/or an update buffer containing the segments and the range information. Consistent with disclosed embodiments, the range information can directly specify (e.g., using key ranges or minimum keys for each segment, or the like) or indirectly specify (e.g., using references to child metadata, such as indices into a sorted list of keys associated with child nodes) the key ranges associated with the segments.

In step 813 of operation 810, the key-value engine can be configured to extract a batch of key-value entries from the set of segments, consistent with disclosed embodiments. In some embodiments, the key-value engine can identify segments matching the key range using the range information. The range information can directly or indirectly specify the key ranges associated with the segments, as described herein. In some embodiments, in extracting key-value entries from segments, the key-value engine can filter the key value data contained in the segments based on the filters associated with the segments.

In some embodiments, the key-value engine can generate a sequence by compacting the identified segments to generate a sequence and retrieving a subset of the sequence, the subset including keys matching the key range. As described herein, compacting the identified segments can include combining any duplicate keys (e.g., combining relative values, or relative value(s) stored in lower buffer level(s) with an absolute value stored in a higher buffer level). The retrieved subset can be smaller than an upper size bound. In some embodiments, the upper size bound can be predetermined. For example, the upper size boundary can be the capacity of a predetermined number of data portions (e.g., a single data portion, or more). The subset therefore can be selected to fit within the predetermined number of data portions.

In some embodiments, the key-value engine can be configured to remove older data from higher in the update buffer first. In such embodiments, the key-value engine can generate the batch by iteratively processing the levels of the update buffer, from highest to lowest, until the specified amount of key-value data can be extracted from the processed levels. The batch can include the extracted, specified amount of key-value data.

In an initial iteration, the key-value engine can attempt to extract a specified amount of key-value data from the identified segments contained in the highest level of the update buffer. If the key-value engine can obtain the specified amount of key-value data from the identified segments contained in the highest level of the update buffer, operation 810 can proceed to step 815.

Otherwise, in a second iteration, the key-value engine can generate a sequence by compacting the identified segments contained in the highest and second highest levels of the update buffer. The key-value engine can then attempt to extract the specified amount of key-value data from the sequence. If the key-value engine can obtain the specified amount of key-value data from the sequence, operation 810 can proceed to step 815.

Otherwise, in any subsequent iterations, the key-value engine can update the sequence by compacting the identified segments contained in progressively lower levels of the update buffer into the sequence. The key-value engine can continue compacting segments into the sequence until all segments have been compacted, or until the specified amount of key-value data is extracted from the sequence.

In some embodiments, as described herein, the key-value engine can select one or more segments of the highest level of the update buffer and flush the one or more segments to a corresponding child node. For example, as described herein, when the number of child nodes equals the number of segments, at least one segment (or union of segments) contains a segment's worth of key-value data falling within the key-value range associated with a child node (or leaf). The key-value engine can identify such a segment and flush the segment to the corresponding child node (or leaf). The key-value engine can then update metadata for the node and/or buffer, as described herein.

In step 814 of operation 810, the key-value engine can be configured to update the buffer, consistent with disclosed embodiments. In some embodiments, the key-value engine can inactivate the key-value entries used to generate the batch by updating the filters associated with the segments of the buffer that contained the data used to generate the batch. For example, when the first and third levels of the update buffer contain segments that include entries for a key, and the key-value engine flushes an entry for that key to a child node, the key-value engine can update the filters for the segments to inactivate the entries for the key. The manner in which the filters are updated can depend on the implementation of the filters. For example, one or more of a pair of record numbers can be added or modified in a filter to include an entry for the key in a range of inactive keys for the segment corresponding to the filter. When an entire segment has been extracted, the segment can be marked inactive (either in addition to or as an alternative to using the filter to indicate that the entire segment contains stale key-value data). As described herein, the filters can be updated (or segments marked inactive) in a new metadata portion generated for the node. The old metadata portion can be retained for versioning purposes.

In some embodiments, after flushing the one or more segments to a corresponding child node, the key-value engine can be configured to update metadata for the node. Updating metadata for the node can include updating the amount of key-value data contained in the update buffer and associated with the child nodes (or leaves). For example, the key-value engine can update this amount to reflect the amount flushed (e.g., by subtracting the amount of data flushed to a child node from the amount of data contained in the buffer for that child node). As described herein, the amounts of key-value data can be updated in a new metadata portion generated for the node. The old metadata portion can be retained for versioning purposes.

In step 815, operation 810 can terminate. In some embodiments, the generated batch can be returned. In some embodiments, the generated batch can be written to a data portion and a reference to the data portion can be returned.

In some embodiments, operation 810 can be performed on a sequence of key-value data stored in a memory (e.g., as depicted in FIG. 7I). The memory can be associated with a node. In such instances, the input to the operation can be the memory, rather than the set of segments. The memory can be associated with an update buffer of a node. The metadata of the node (e.g., pending bytes, filters, and the like) can be updated based on the key-value data removed from the memory. As may be appreciated, the contents of the memory can then be written back to the update buffer of the node.

Figure 8C:
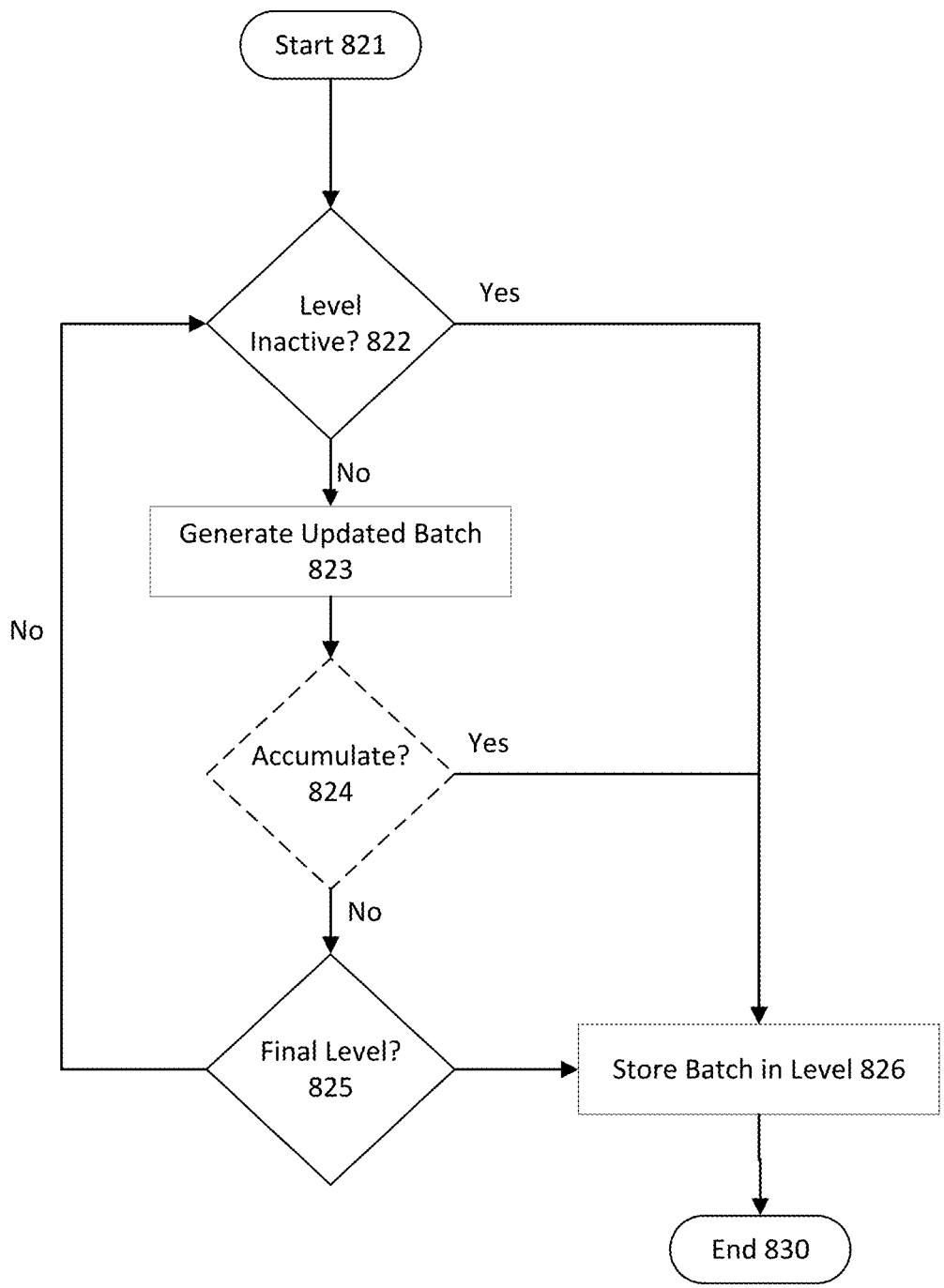
FIG. 8C depicts an exemplary flowchart of a buffer-level update operation, consistent with disclosed embodiments.

FIG. 8C depicts an exemplary flowchart of a buffer-level update operation 820 consistent with disclosed embodiments. Operation 820 can be performed as part of a storage structure-level operation (e.g., an update operation as described herein) or as part of another operation. In some embodiments, the buffer-level update operation can compact data received by the node into the update buffer. The configuration of the update buffer can improve the efficiency of compacting the data.

In step 821, operation 820 can start. In some embodiments, input arguments to operation 820 can include a set of segments and a key-value batch. In some embodiments, the input arguments can include a node or update buffer containing the segments and/or a data portion containing the key-value batch. In some embodiments, the key-value batch may have been flushed from a parent of the node containing the update buffer.

In step 822 of operation 820, the key-value engine can determine whether the current level of the update buffer is inactive. As described herein, a level of the update buffer can be inactive when it contains no key-value data (or all the key-value data it contains is stale). In some embodiments, the node can contain indications of inactive (or active) levels. For example, filter(s) associated with the segment(s) contained in the level can indicate that all the segment(s) contained in the level are inactive (and thus the level is inactive). For example, in an initial iteration of step 822, the key-value engine can determine that the initial level of the update buffer is inactive. As an additional example, in a second iteration of step 822, the key-value engine can determine that the second level of the update buffer is inactive. When the current level of the update buffer is inactive, operation 820 can proceed to step 826.

When the next level of the update buffer is active, operation 820 can proceed to step 823. In step 823 of operation 820, the key-value engine can generate an updated key-value batch, consistent with disclosed embodiments.

For example, in an initial iteration of step 822, the key-value engine can combine the received key-value batch with the key-value entries contained in the initial level of the update buffer. As an additional example, in a second iteration of step 822, the key-value engine can combine the combination of a received key-value batch and the contents of the initial level of the update buffer with the contents of the second level of the update buffer. In some embodiments, inactive key-value data contained in the update buffer (e.g., as indicated by filter(s) associated with segment(s) of the update buffer) may not contribute to the combined batch.

In optional step 824 of operation 820, the key-value engine can determine whether an accumulation condition is satisfied. When the accumulation condition is satisfied, operation 820 can proceed to step 826. Otherwise, operation 820 can proceed to step 825. In some embodiments, operation 820 may proceed directly to step 825, without determining whether an accumulation condition is satisfied.

In some embodiments, an accumulation condition is satisfied when the size of the updated key value batch is less than a target capacity of the current level. In some embodiments, the target capacity of the second and each subsequent level in the update buffer can be twice or approximately twice the target capacity the prior level. The key-value engine can therefore be configured to combine similarly sized amounts of data in subsequent iterations of step 822. In some implementations, merging similarly sized amounts of data can be more efficient than merging dissimilar amounts of data. In some embodiments, the key-value engine may only accumulate batches in the initial level.

As may be appreciated, accumulating batches in a level may prevent inefficient partial utilization of subsequent levels. In some embodiments, the size of the received key-value batch can be substantially less (e.g., 50%, 25%, or less) than the upper bound on the size of the initial level of the update buffer. In such instances, key-value batches can be repeatedly flushed to the node without the combined batch exceeding the size of the initial level of the update buffer. The size of the received key-value batch can depend on the choice of tuning parameters for the storage structure, and may reflect an intended tradeoff between read, write, and space amplification.

In step 826 of operation 820, the key value engine can store the batch (e.g., the received batch, updated batch, or the like) in the current level of the update buffer. As may be appreciated, such storing can be implemented by writing the key-value data to data portions and creating an updated metadata portion for the node that references these data portions.

In step 830, operation 820 can end. In some embodiments, step 830 can include determining the amount of key-value data in the update buffer for each child node. In some embodiments, the amount of key-value data can be estimated based on the key value data flushed to the node. In some embodiments, the key-value engine can be configured to perform operation 810 for each key range to determine an amount of pending bytes for each key range. In some embodiments, when the amount of pending bytes exceeds a threshold, the key-value engine can flush a suitable amount of the key-value data to the child node. Otherwise, the amount of pending bytes can be updated.

In some embodiments, the key value engine can perform operation 810 when the key value engine determines (in step 825) that the current level is the final level of the update buffer. In such instances, operation 810 can be performed on the sorted sequential key-value data stored in memory, prior to the key-value data being written back to the final level of the update buffer.

As may be appreciated, the termination of an instance of operation 820 can trigger performance of another instance of operation 820. For example, in another instance of operation 820, the update buffer of a child node can be updated using key-value data flushed to that child node.

As a non-liming example of operation 820, consider a storage structure in which a data portion associated with an update buffer segment has size 1 megabyte. The update buffer of a node includes six levels, having the current status:

Level 0: (1 mb of segments)
Level 1: (2 mb of segments)
Level 2: (empty)
Level 3: (8 mb of segments)
Level 4: (empty)
Level 5: (32 mb of segments)

This update buffer status can be represented in terms of a binary number, where each digit indicates whether a corresponding level of the update buffer is empty (0) or non-empty (1):

As described herein, operation 820 can include inserting a batch of new key-value entries into the buffer. Insertion of the new key-value entries can be analogized to incrementing the binary number representing the status of the update buffer. For example:

1. Combine the batch of new key-value entries with the single segment in level 0, producing a new series of sorted runs of keys.
2. Combine with the segments at level 1, producing a new series of sorted runs of keys.
3. Since level 2 is empty, the level can be filled with the sorted runs from step 2.
4. Because level 2 now includes all the updates in levels 0 and 1, these two levels are set to empty (analogous to setting the trailing zeros). The corresponding binary number can be:

In this manner, in some embodiments, the update buffer of a node can maintain a growing key-unique sequence of updates (the "carry") as it moves up the levels, combining one level at a time and stopping when it finds an empty level (or when the combination of a batch and the next level still fits within the next level).

Node Operations

In some embodiments, the key-value engine can implement storage structure-level search, update, and scan operations using node-level search, split, combine, and update operations. For ease of description, these operations are described as being performed by a key-value engine. However, these operations can be performed, in whole or in part, by any suitable computing system component or arrangement of components. Consistent with disclosed embodiments, such operations can accept data or references to such data and can return data or references to such data. For example, such operations can accept as input key-value data or a reference to a location from which the key-value data can be obtained. Furthermore, the disclosed embodiments are not limited to any particular syntax, format, or specification for the arguments (e.g., the leaf, key, segment, level or the like) or the outputs of these operations.

Figure 9A:
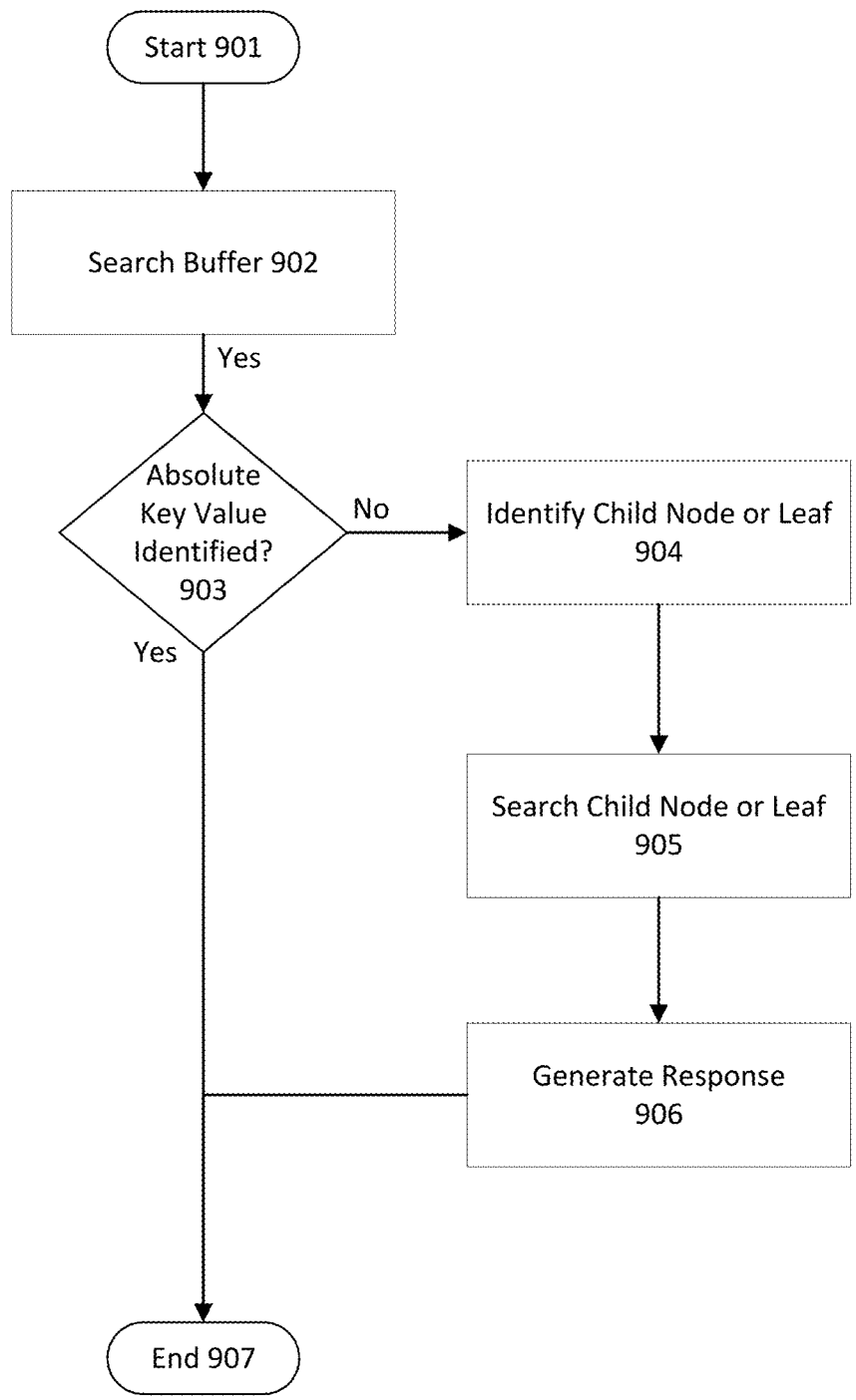
FIG. 9A depicts an exemplary flowchart of a node-level search operation, consistent with disclosed embodiments.

FIG. 9A depicts an exemplary flowchart of a node-level search operation 900 consistent with disclosed embodiments. Operation 900 can be performed as part of a storage structure-level operation (e.g., a search operation as described herein) or as part of another operation. In some embodiments, operation 900 can be performed recursively. For example, operation 900 can be performed on a top-level node of the storage structure. Performance of operation 900 on the top-level node of the storage structure can involve performing operation 900 on one or more child nodes of the top-level node. The output of the performance of operation 900 on the top-level node can depend on the output of the performance of operation 900 on the one or more child nodes of the top-level node.

In step 901, operation 900 can start. In some embodiments, input arguments to operation 900 can include a node and a key. In some embodiments, the input arguments can include a storage structure containing the node.

In step 902 of operation 900, the key-value engine can search the update buffer of the node, consistent with disclosed embodiments (e.g., as described above with regards to FIG. 8A). As may be appreciated, the key-value engine may obtain value(s) or an indication that the buffer did not contain a value for the input key. Obtained value(s) may or may not contain an absolute value. The key-value engine may or may not combine obtained value(s) into a single relative or absolute value.

In step 903 of operation 900, the key-value engine can determine whether the output of the buffer search performed in step 902 contained an absolute value (e.g., as opposed to a relative value or an indication that the buffer did not contain a value for the input key). When the buffer search returned an absolute value, operation 900 can proceed to step 907. Otherwise, operation 900 can proceed to step 904.

In step 904 of operation 900, the key-value engine can identify a child node or leaf for additional searching, consistent with disclosed embodiments. As described herein, a node can include child data. The child data can specify key ranges corresponding to child nodes (or leaves). The key-value engine can search the child data (e.g., using a binary search over key range information stored contained in the child data, or another suitable method) to identify a key range containing the input key and a corresponding child node or leaf.

As may be appreciated, the key-value engine can search multiple child nodes in parallel. For example, as described herein, a metadata portion of a node can include the child data. Thus, the key-value engine can retrieve the metadata portion, identify the child nodes using the child data, and retrieve the metadata portions of these child nodes in parallel, increasing the performance of the search operation.

In step 905 of operation 900, the key-value engine can search the child node or leaf (or multiple child nodes or leaves), consistent with disclosed embodiments. In some embodiments, searching a child leaf can be performed as described herein with regards to leaf-level operations. A child node can be searched using another instance of operation 900. The input arguments to this additional instance of operation 900 can include the key and the child node (or a sub-storage structure having the child node as the root, or a reference to the child node, or the like). In this manner, in such embodiments, operation 900 can proceed recursively.

In some embodiments, the output of the search of a child node or leaf can include value(s) or an indication that the child node (and any children of the child node) did not contain a value for the input key. In some embodiments, the value(s) can include at least one absolute value. The key-value engine may or may not combine the value(s) into a single absolute value.

In step 906, the key-value engine can generate a response based on the results of the search performed in step 902 and the search(es) performed in step 905. In some instances, the key-value engine may not obtain any key-value data in step 902 or in step 905. In such instances, the response can indicate that the node (and any children of the node) did not contain a value for the input key. In some instances, the key-value engine can obtain zero or more relative values in step 902 and a set of value(s) in step 905. The set of values can include zero or more relative values and an absolute value. The key-value engine can then generate an updated set of values including any relative values obtained in step 902 and the set of value(s) obtained in step 905. In some embodiments, the response can be the updated set of values. In some embodiments, the key-value engine can combine two or more of the updated set of values. For example, the key-value engine can combine the updated set of values into an updated absolute value. The response can be the result of such a combination.

In step 907, operation 900 can return the absolute value identified in step 903 or the response generated in step 906. Operation 900 can then terminate.

Figure 9B:
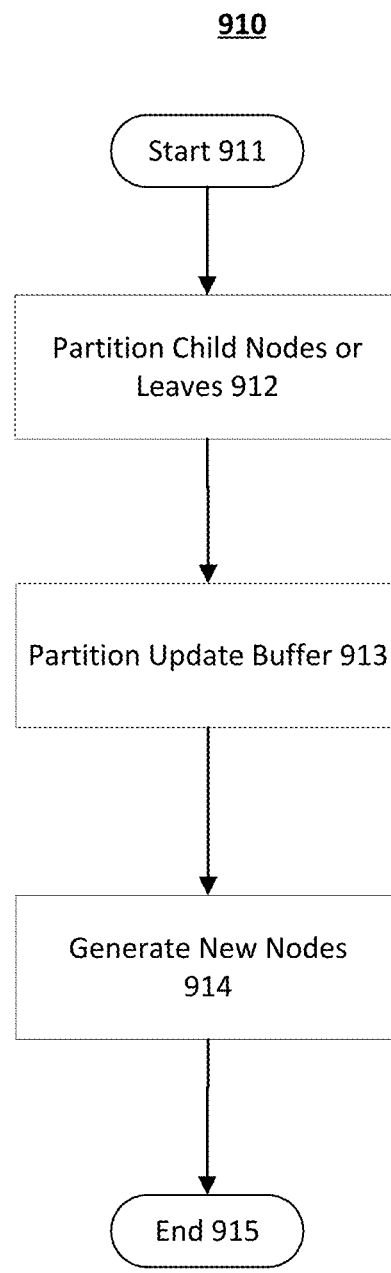
FIG. 9B depicts an exemplary flowchart of a node-level node-splitting operation, consistent with disclosed embodiments.

FIG. 9B depicts an exemplary flowchart of a node-level node-splitting operation 910 consistent with disclosed embodiments. Operation 910 can be performed as part of a storage structure-level operation (e.g., an update operation as described herein) or as part of another operation.

In step 911, operation 910 can start. In some embodiments, the key-value engine can perform operation 910 when a node satisfies a node-splitting condition. As described herein, a node can satisfy a node-splitting condition when the node contains too much data. For example, the metadata for the node may be too large for storage in a single metadata portion. The input arguments to operation 910 can include a node or a storage structure containing the node.

In step 912 of operation 910, the key-value engine can partition the child nodes (or leaves) of the node. In some embodiments, the key-value engine can partition the child nodes (or leaves) into two or more groups. In some embodiments, each group can include approximately the same number of child nodes or leaves (e.g., when there are seven child nodes, a first group may include three nodes and a second group may include four nodes). In some embodiments, each group can include the same or a similar estimated amount of key-value data. In some embodiments, the child nodes (or leaves) in each group can be associated with sequential key ranges, such that each group is associated with a continuous, group key range. In some embodiments, the key-value engine can identify a minimum key for each group, a minimum key for only the group containing the high key ranges, or another suitable range identification scheme.

In step 913 of operation 910, the key-value engine can partition the update buffer of the child nodes. In some embodiments, partitioning the update buffer can include identifying segments in the update buffer as being associated with one or another group of child nodes, or as being shared between two (or more) groups of child nodes.

In some embodiments, the key-value engine can identify the segments based on the group key ranges of the groups and the range information of the segments. For example, when the key-value engine partitions the child nodes (or leaves) into two groups, the key-value engine can determine a partition key. The partition key can be the minimum key for the group having the higher group key range. The key-value engine can then identify segments in the update buffer associated with the first group, the second group, or both groups based on the partition key.

For example, as described herein, segments in a level of the update buffer can each be associated with a minimum and maximum key. The key-value engine can associate segments having maximum keys less than the partition key with the first group of child nodes. The key-value engine can associate segments having minimum keys greater than or equal to the partition key with the second group of child nodes. The key-value engine can determine that segments having minimum keys less than the partition key and maximum keys greater than or equal to the partition key are shared between the groups.

In step 914 of operation 910, the key-value engine can generate new nodes for each of the groups in the partition. Each new node can contain the child nodes (or leaves) in the corresponding group. Each new node can further contain the segments of the update buffer associated with that group, and the portions of the shared segments of the update buffer associated with that group. The parent of each new node can be the parent of the original, split node. As may be appreciated, the child data of the parent of the original, split node can be updated to reflect the creation of the new nodes.

As may be appreciated, node implementations consistent with disclosed embodiments can enable efficient splitting of nodes. A node can be implemented using a metadata portion (e.g., metadata portion 430) and data portions (e.g., data portions 440). When a node is split, the data portions of the original, split node may not be changed or re-written. Instead, new nodes can be implemented using new metadata portions. Each new metadata portion can include buffer metadata (e.g., buffer metadata 431). In some embodiments, the buffer metadata can include filter information and references to at least some of the update buffer portions of the original, split node. In some embodiments, the filter information and/or the references can implement the update buffers of the new nodes.

Furthermore, the key-value engine can generate new nodes in parallel when splitting nodes. The key-value engine can retrieve the metadata portion of the original node, identify the segments for each group, associate the segments with groups, and then generate the new nodes by writing new metadata portions in parallel, increasing the performance of the partition operation. Generation of new nodes can be performed in parallel because the disclosed embodiments enable two parallel node generation processes access shared data in a read-only fashion.

Figure 9C:
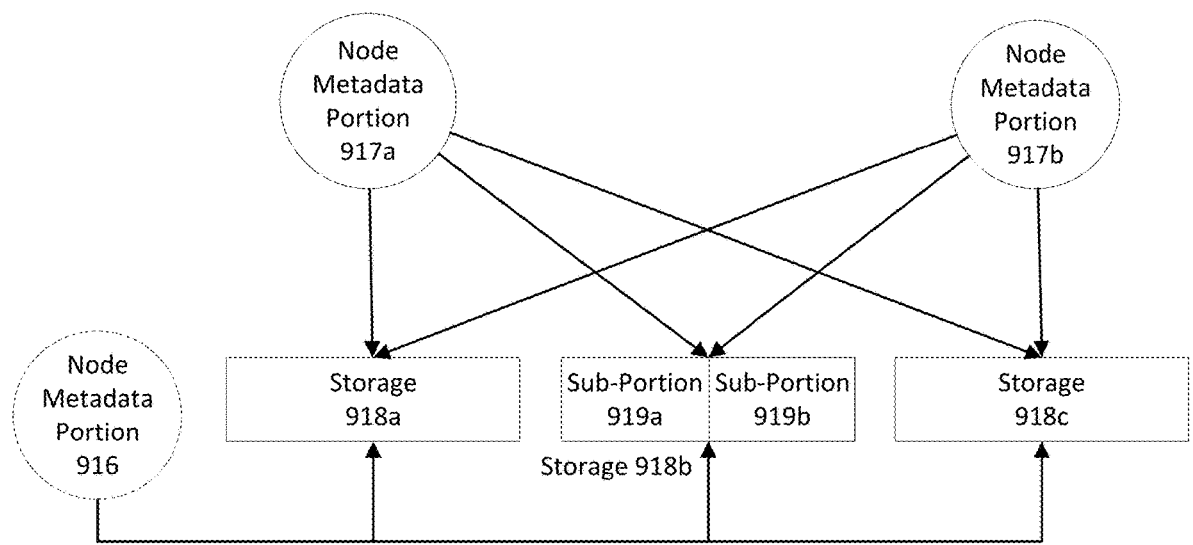
FIG. 9C depicts an exemplary implementation of the splitting of an original node into two new nodes, consistent with disclosed embodiments.

FIG. 9C depicts an exemplary implementation of the splitting of an original node into two new nodes, consistent with disclosed embodiments. The original node can be implemented using, in relevant part, node metadata portion 916 and data portions 918a, 918b, and 918c. Node metadata portion 916 can include buffer metadata. This buffer metadata can include references to data portions 918a, 918b, and 918c and filter information for these data portions.

The two new nodes can be implemented using node metadata portions 917a and 917b. As depicted in FIG. 9C, node metadata portions 917a and 917b both still reference data portions 918a, 918b, and 918c. The logical division of the contents of the update buffer of the original node can be accomplished using the filter information contained in metadata portions 917a and 917b. Filter information contained in node metadata portion 917a can filter out sub-portion 919b of data portion 918b and the entirety of data portion 918c (alternatively, data portion 918c may not be referenced, or may be indicated as being empty, or the like). Filter information contained in node metadata portion 917b can filter out sub-portion 919a of data portion 918b and the entirety of data portion 918a (alternatively, data portion 918a may not be referenced, or may be indicated as being empty, or the like). In this manner, both new nodes can be implemented without having to re-write the contents of the update buffer of the original node. As new key-value entries are written to the two new nodes, new node metadata portions and new data portions can be written as needed to accommodate the new key-value entries. As described herein, this approach improves the efficiency of the key-value engine and can build-in versioning of updates.

Figure 9D:
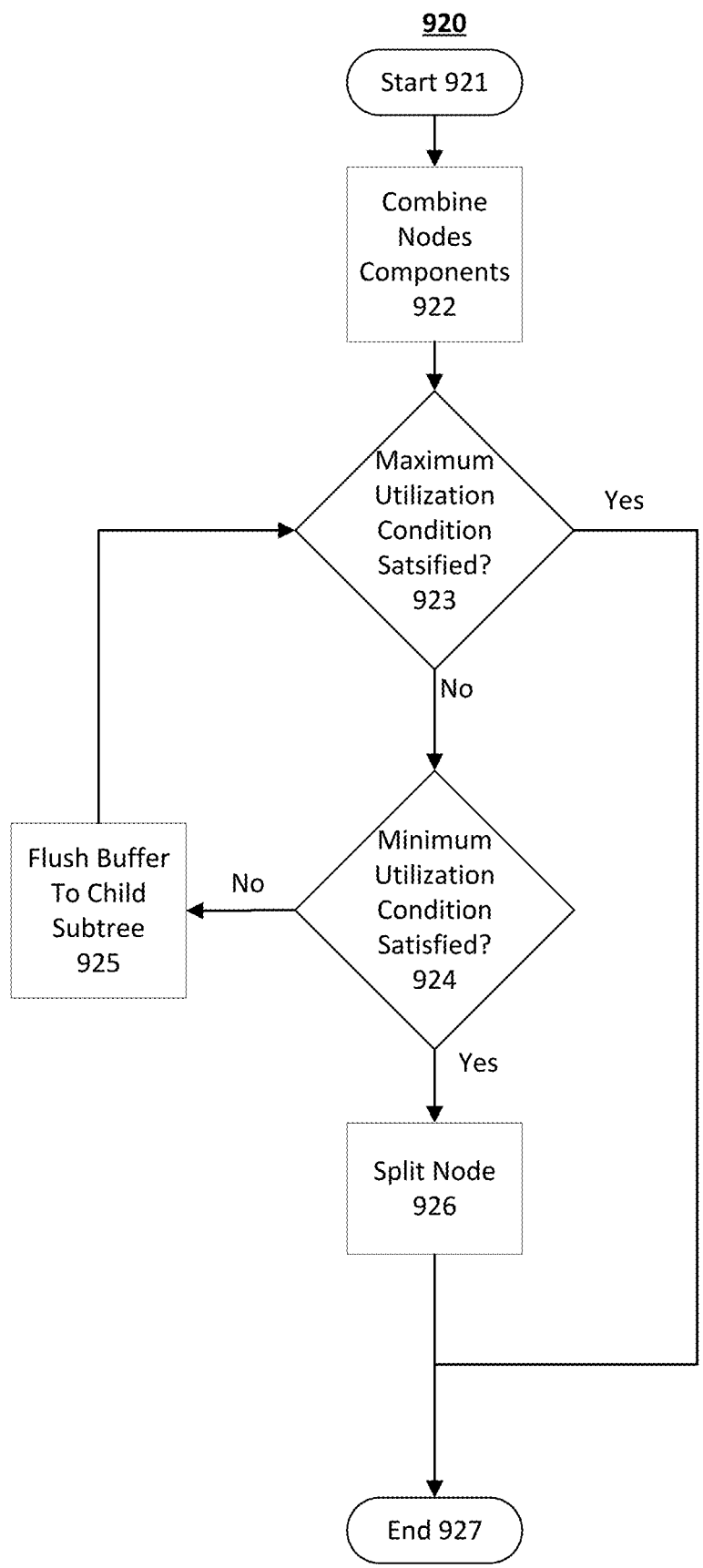
FIG. 9D depicts an exemplary flowchart of a node-level node-merging operation, consistent with disclosed embodiments.

FIG. 9D depicts an exemplary flowchart of a node-level node-merging operation 920 consistent with disclosed embodiments. Operation 920 can be performed as part of a storage structure-level operation (e.g., an update operation as described herein) or as part of another operation.

In some embodiments, the key-value engine can perform operation 920 in response to a determination that a node (or multiple nodes) fails to satisfy a minimum utilization condition. As described herein, the minimum utilization condition can depend on an amount of key-value data contained in the node, a number of child nodes (or leaves) of the node, an amount of metadata contained in the node, or another suitable condition.

In step 921, operation 920 can start. The input arguments to operation 920 can include two or more nodes, or a storage structure containing two or more nodes.

In step 922 of operation 920, the key-value engine can generate a combined node by combining components of the two or more nodes, consistent with disclosed embodiments. The components can include the sets of child nodes (or leaves) and the update buffer. In some embodiments, combining the sets of child nodes (or leaves) can include concatenating metadata concerning the child nodes (or leaves). For example, as described herein, metadata specifying child nodes (or leaves) can be implemented using an ordered list of tuples. Combining the sets of child nodes (or leaves) can include concatenating the ordered lists of tuples to form a combined, ordered list of tuples. Similarly, combining the update buffers can include concatenating, by level, the segments contained in the update buffer.

In step 923 of operation 920, the key-value engine can determine whether a maximum utilization condition has been satisfied, consistent with disclosed embodiments. As described herein, the maximum utilization condition can depend on an amount of key-value data contained in the node, a number of child nodes (or leaves) of the node, an amount of metadata contained in the node, or another suitable condition. If the maximum utilization condition is satisfied (e.g., the amount of metadata contained in the node can be stored in a single metadata portion or the like), then operation 920 can proceed to step 927. Otherwise, operation 920 can proceed to step 924.

In step 924 of operation 920, the key-value engine can determine the node generated in step 922 can be split, with the two resulting nodes satisfying the minimum utilization condition, consistent with disclosed embodiments. If so, operation 920 can proceed to step 926. Otherwise, operation 920 can proceed to step 925.

In step 926 of operation 920, the key-value engine can split the node generated in step 922, consistent with disclosed embodiments. The key-value engine can split the node using operation 910, described herein with regards to FIG. 9B, or another suitable method.

In step 925 of operation 920, the key-value engine can flush the update buffer of the node created in step 922, consistent with disclosed embodiments. The key-value engine can flush the update buffer of the node using operation 810, described herein with regards to FIG. 8B, or another suitable method. In some embodiments, the key-value engine can select the child node (or leaf) having the greatest amount of pending key-value data. The flushed batch of key-value data can be generated using the key range of the selected child node (or leaf). The flushed batch can be flushed to the selected child node (or leaf). The key-value engine can repeatedly flush batches of key-value data to selected child nodes (or leaves) until the node satisfies the maximum utilization criterion. Operation 920 can then return to step 923 to recheck the maximum and minimum utilization conditions, as changes to the child nodes resulting from the flushing of key-value data to these child nodes can affect the satisfaction of these conditions.

In step 926, operation 920 can terminate. As may be appreciated, steps of operation 920 can be combined without departing from disclosed embodiments. For example, the key-value engine can determine that a combination of two nodes would fail to satisfy the maximum utilization condition prior to combining the node nodes. The key-value engine can then combine the nodes and split them in a single step (e.g., without updating the storage structure to reflect the combined node, then updating the storage structure with the two new nodes).

Figure 9E:
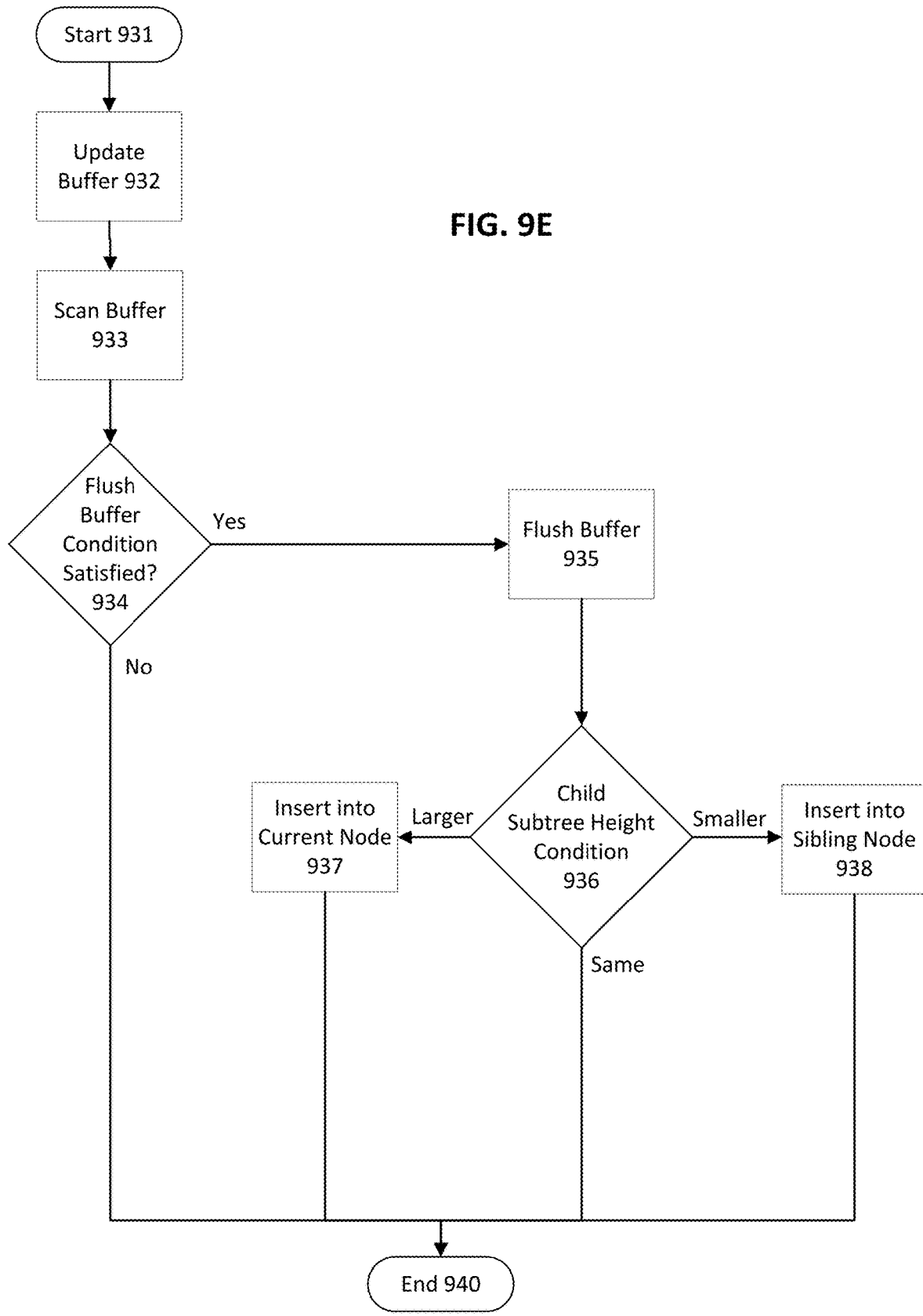
FIG. 9E depicts an exemplary flowchart of a node-level update operation, consistent with disclosed embodiments.

FIG. 9E depicts an exemplary flowchart of a node-level update operation 930 consistent with disclosed embodiments. Operation 930 can be performed as part of a storage structure-level operation (e.g., an update operation as described herein) or as part of another operation. In some embodiments, operation 930 can be performed recursively. For example, operation 930 can be performed on a top-level node of the storage structure. Performance of operation 930 on the top-level node of the storage structure can involve performing operation 930 on one or more child nodes of the top-level node. The output of the performance of operation 930 on the top-level node can depend on the output of the performance of operation 930 on the one or more child nodes of the top-level node.

In step 931, operation 930 can start. In some embodiments, the key-value engine can perform operation 930 in response to receipt by a node of an update batch (e.g., from a batch collector, another node, or the like). The input arguments to operation 930 can include a batch (or a data portion containing the batch) and a node (or a storage structure containing the node).

In step 932 of operation 930, the key-value engine can update the update buffer of the node using the received batch of key-value entries, consistent with disclosed embodiments. The update buffer can be updated using operation 820 or a similar operation. In some embodiments, as described herein, the key-value engine may not flush the update buffer as part of operation 820.

In step 933 of operation 930, the key-value engine can scan the update buffer of the node, consistent with disclosed embodiments. As described herein, the node can have child nodes (or leaves). In some embodiments, each child node or leaf can be associated with a key range and an amount of pending key-value data in the update buffer. The key-value engine can determine an updated amount (e.g., number of bytes, items, or the like) of key-value data in the update buffer for each such key range. In some embodiments, for each such key range, the key-value engine can identify, in each level of the update buffer, key-value entries matching the key range. The key-value engine can then combine the identified key-value entries across levels. In some embodiments, the updated amount of key-value data can be the amount of key-value data generated by combining the identified key-value entries across levels.

In some embodiments, steps 932 and 933 can be combined into a single step. For example, in updating the buffer, the key-value engine can determine the updated amount of key-value data in the update buffer for each key range.

In step 934 of operation 930, the key-value engine can determine whether a flush buffer condition has been satisfied for a child node (or leaf), consistent with disclosed embodiments. In some embodiments, the flush buffer condition can be satisfied when the amount of key-value data for a child node (or leaf) exceeds a threshold value. In some embodiments, the threshold value can depend on the capacity of a data portion. For example, when the amount of key-value data for a child node exceeds the capacity of a data portion, the flush buffer condition can be satisfied for the child node. In some embodiments, the threshold value can depend on tuning parameter values (and optionally on the height of the node in the storage structure). For example, when $\gamma$ is 0.5 and $\delta$ is 0, the threshold can be 0.5 times the capacity of a data portion. As an additional example, when $\gamma$ is 1, $\delta$ is 0.5, and the height of the node is 4, the threshold can be 0.25 times the capacity of a data portion (e.g., 0.25 L).

In some embodiments, the threshold amount can be specific to each key range and can vary to ensure that an average flushed amount tracks an intended value, as described herein. For example, when the intended value is 0.75 times the capacity of a data portion (e.g., 0.75 L), the threshold amount for a key-value range can alternate between the capacity of a data portion (e.g., L) and half the capacity of the data portion (e.g., 0.5 L).

In some embodiments, steps 932 to 934 can be combined into a single step. For example, in updating the buffer, the key-value engine can both determine the updated amount of key-value data in the update buffer for each key range and determine whether that amount of data exceeds the threshold (e.g., the current threshold for that key-range).

Consistent with disclosed embodiments, when the flush buffer condition has been satisfied for a child node (or leaf), operation 930 can proceed to step 935. Otherwise, operation 930 can proceed to step 940.

In step 935 of operation 930, the key-value engine can flush the update buffer of the node, consistent with disclosed embodiments. The key-value engine can flush the update buffer of key-value entries matching the key range associated with the child node (or leaf) that satisfied the flush buffer condition. The key-value engine can flush the update buffer using operation 820 or another suitable operation.

In some embodiments, when multiple child nodes satisfy the flush buffer condition, the key-value engine can flush the update buffer of key-value entries matching a key range associated with one of such child nodes (or leaves). The key-value engine can select the key range based on the amounts of key-value data stored in the update buffer for each of the multiple child nodes (or leaves) that satisfy the flush buffer condition. The disclosed embodiments are not limited to any particular criterion for selecting among multiple child nodes (or leaves) that satisfy the flush buffer condition. For example, the key-value engine can select the key range associated with the one of the multiple child nodes (or leaves) that has the greatest amount of key-value data stored in the update buffer.

In some embodiments, when multiple child nodes satisfy the flush buffer condition, the key-value engine can flush the update buffer of key-value entries matching the key ranges associated with each of such child nodes (or leaves). For example, the key-value engine can generate and flush a batch of key-value entries to each of such child nodes (or leaves).

In step 936 of operation 930, the key-value engine can determine whether any sub-tree of the node satisfies a sub-structure height condition, consistent with disclosed embodiments.

As may be appreciated, a sub-tree can be updated in response to a batch of key-value entries being flushed to the sub-tree in step 935. The key-value engine can perform step 936 after the sub-tree has been updated. The sub-tree, in turn, may be updated only after its own sub-trees are updated. Accordingly, operation 930 may proceed recursively, with the storage structure being progressively adjusted from the bottom up, as described herein.

In some embodiments, the sub-structure height condition can depend on the original, pre-update height of the sub-structure and the post-update height of the sub-structure. When the post-update height of the sub-structure is greater than the pre-update height of the sub-structure, operation 930 can proceed to step 937. When the post-update height of the sub-structure is less than the pre-update height of the sub-structure, operation 930 can proceed to step 938. When the post-update height of the sub-structure is equal to the pre-update height of the sub-structure, operation 930 can proceed to step 940.

In step 937 of operation 930, the key-value engine can insert the children of the root node of the sub-structure into the current node, consistent with disclosed embodiments. This modification can split the updated sub-structure into multiple sub-structures, each having the same height as the original, pre-update sub-structure. Such a modification is described herein with regards to FIGS. 3C and 3D.

In some embodiments, the contents of the update buffer of the root node of the sub-structure can be flushed to the children (or leaves) of the root node prior to inserting the children of the root node into the current node. As may be appreciated, flushing the contents of the root node update buffer to the children of the root node may cause modifications to the children (e.g., splitting the children or the like).

In some instances, insertion of the children of the root node of the sub-structure into the current node may cause the current node to fail a maximum utilization criterion, as described herein. The key-value engine may then split the current node, using operation 910, or another suitable operation. Such a modification is described herein with regards to FIGS. 3D and 3E. The key-value engine may create another parent node for the nodes generated by partitioning the current node. As may be appreciated, splitting the current node and adding a new parent node can increase the height of the storage structure.

In step 938 of operation 930, the key-value engine can insert the root node of the sub-structure into a sibling node, consistent with disclosed embodiments. As described herein, the children of the current node can be associated with key ranges. The union of these key ranges can form the key range associated with the current node. The root node of the original, pre-update sub-structure can therefore have a sibling node associated with an adjacent key range (e.g., a sibling node associated with a lower key range and/or a sibling node associated with a higher key range).

In some embodiments, the key-value engine can select a sibling node of the original, pre-update sub-structure and insert the root node of the updated sub-structure into the sibling node. Inserting the root node into the sibling node can include adding the sub-structure root node as a child node of the sibling node (e.g., by updating the child data for the current node to include child metadata of the sub-structure root node).

In some embodiments, the key-value engine can update the range information for the sibling node in the current node. The range information for the sibling node can become the union of the key range originally associated with the sibling node and the key range associated with the sub-structure root node.

In some instances, the original sub-structure and the updated sub-structure may be the same height, however the root node of the updated sub-structure may not satisfy a minimum utilization condition. In such embodiments, the root node of the updated sub-structure can be combined with a sibling node (e.g., a child node of the current node associated with a key range adjacent to the key range of the root node of the updated sub-structure, or the like), as described herein with regards to FIGS. 3G and 3H. The key-value engine can combine the nodes using operation 920, or another suitable operation.

When multiple child nodes (or leaves) satisfy the flush buffer condition, steps 935 and 936 can be performed for each of the nodes (or leaves). For each child node or leaf satisfying the flush buffer condition, steps 937 or 938 can be performed, as necessary.

In step 940, operation 930 can end. As described herein, operation 930 can be performed on a node within a storage structure. While the current node can be the root node of a sub-structure, the current node is not necessarily the root node of the overall storage structure. Accordingly, operation 930 can be performed as part of an overall, storage structure-level updating process. The overall updating process can be recursive: this instance of operation 930 (e.g., updating the current node) can be called by a prior instance of 930 (e.g., updating the parent of the current node) and performance of this instance of operation 930 can affect the performance of the calling instance of operation 930. For example, performance of operation 930 on the current node can split the current node and thereby change the height of the sub-structure originally having as its root the current node. The performance of operation 930 on the parent of the current node can be affected, as described herein, by this change in the height of the sub-structure originally having as its root the current node.

Scaling

The disclosed embodiments can be configured to improve utilization of processing resources and input/output bandwidth by parallelizing key-value engine activities. In various embodiments, the key-value engine can be configured to parallelize at least one of writing of data to physical media, reading data from physical media, and merging key-value sequences.

Parallelized Data Writing

In some embodiments, the key-value engine can be configured to parallelize the flushing of data to the write-ahead log and the storage structure (e.g., using LLFS, or a similar filesystem).

In some embodiments, LLFS can provide implementations of LogDevice and PageDevice that utilize the Linux kernel's io_uring API to do zero-copy, asynchronous writes to durable storage. The LogDevice implementation can create a runtime-configurable number of FlushOp tasks, which run in parallel to flush dirty data from portions of an in-memory ring buffer to disk. Each FlushOp can be responsible for a fixed-size slice in the log. When this slice has been fully flushed, the FlushOp moves ahead by (size-of-FlushOp-slice) times (number-of FlushOps). In this way, the FlushOps tasks can cycle through the logical log offset space in a round-robin fashion. The more FlushOps tasks a LogDevice object is configured to use, the greater the number of possible concurrent device writes. In some embodiments, the write-ahead log can be implemented using a LogDevice object. The write-ahead log can be implemented using the in-memory ring buffer, and the flushing of data to disk can implement the writing of updates to the storage structure. Accordingly, larger number of FlushOps task can support a greater number of concurrent writes to the write-ahead buffer.

The PageDevice implementation can support asynchronous reads and writes via a callback-based API. Groups of pages can be written concurrently via an LLFS transaction (PageCacheJob). These transactional jobs can also be linked together as dependencies of each other to form parallel pipelines. In some embodiments, by linking transactions jobs to explicitly capture dependencies, generation of the next version of the storage structure can begin while the previous version of the storage structure is still being written to storage. Such interleaving of the generation of storage structures can improve the parallel I/O capabilities of the disclosed embodiments. LLFS can be configured to automatically maximize the amount of concurrent I/O while guaranteeing that all durable data remains consistent in the event of a crash between any two atomic 512-byte block writes.

Parallelized Data Reading

Consistent with disclosed embodiments, storage portion reads can be parallelized using a prefetch hint mechanism (e.g., the LLFS prefetch hint mechanism, or the like). In some embodiments, the key-value engine can be configured to load a subset of storage portions referenced by a node when the key-value engine reads a node. For example, as described herein, a node can be implemented using a metadata portion. The metadata portion can include references to child nodes (e.g., metadata portions of child nodes) and references to update buffer segments (e.g., data portions implementing such segments). When the key-value engine reads the metadata portion, at least some metadata portions and/or data portions can be loaded in the background. In some embodiments, the particular child nodes and/or buffer segments loaded can depend on the operation (e.g., scan, update, or the like) that caused the key-value engine to read the node. When the contents of a prefetched storage portion is subsequently required by the key-value engine, a blocking call can be made to resolve the prefetched storage portion. While the key-value engine can load storage portions according to a blocking i/o model, the key-value engine can implement asynchronous operations (e.g., driven by ASIO or IO_URING) using fast user-space context swapping (e.g., through FCONTEXT).

As may be appreciated, the use of indirection (e.g., a metadata portion including references to child metadata portions and update buffer metadata portions) in implementing the storage structure can improve the I/O cost complexity of the disclosed embodiments. Such indirection can allow a single round trip per node height, making the storage structure asymptotically equivalent in parallel I/O cost to the theoretically optimal B-Tree ($O(\log_B N)$).

Parallelized Key-Value Sequence Merging

Figure 10A:
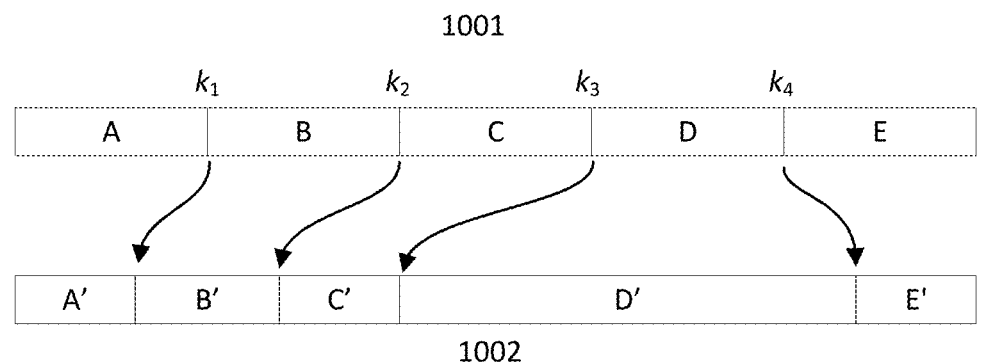
FIGS. 10A and 10B depict a parallel merger process suitable for use with disclosed embodiments.
Figure 10B:
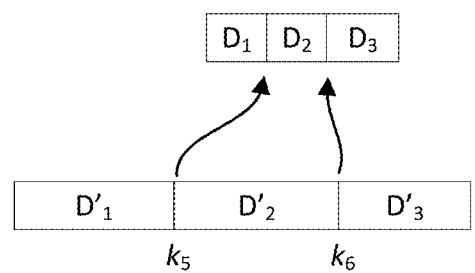

FIGS. 10A and 10B depict a parallel merger process suitable for use with disclosed embodiments. As described herein, activities performed by the key-value engine can involve combining sorted sets of key-value data. For example, the batch generator, as described herein, can be configured to combine batches written to the write-ahead log. As an additional example, a scan operation can include retrieving and combining multiple sets of key-value data (e.g., from a leaf and from multiple levels of multiple update buffers, or the like). As a further example, a buffer-level update operation can include combining one level of an update buffer into the next level of the update buffer. Such combining activities can include merging (and optionally deduplicating) entry values by key. As described herein, de-duplicating entry values can include generating a value for the entry based on an absolute value (e.g., the most recently received absolute value) and optionally based on relative values. The parallel merger process can reduce the time required to perform such combining activities, thereby improving the performance of the disclosed key-value engine.

In some embodiments, the parallel merge process can be performed by recursively performing parallel merges. FIG. 10A depicts an iteration of such a parallel merger process, consistent with disclosed embodiments. The iteration can include partitioning a first sorted set 1001 based on amount to determine keys, then partitioning a second sorted set 1002 based on the determined keys. In a second iteration, the partitions of the second sorted set 1002 can be further partitioned based on amount to determine additional keys, then the partitions of the first sorted set 1001 can be partitioned based on the additional keys. In some embodiments, as depicted in FIG. 10B, the second iteration can be limited to subsets of second sorted set 1002 that exceed a size threshold. In experimental benchmark tests, a parallel merge process consistent with disclosed embodiments saturated a solid-state drive (an INTEL OPTANE 905p) during high-ingest workloads (e.g., the parallel merge process fully used the specified I/O throughput of a solid-state drive, such that the drive itself became the key-value engine throughput bottleneck).

The key-value engine can be configured to partition first sorted set 1001 into subsets A to E based on amount, consistent with disclosed embodiments. Subsets A to E can include similar amounts (e.g., number of entries, bytes, or another suitable measure) of key-value data. In some embodiments, the key-value engine can generate the subsets by incrementing by amount across sorted set 1001 and identifying corresponding key-values that partition sorted set 1001. The disclosed embodiments are not limited to any particular method of determining the increments. In some embodiments, the increments can be determined based on available computing resources (e.g., a number of processors or cores available to perform the merger) and the size of first sorted set 1001 (and optionally second sorted set 1002).

For example, the key-value engine can determine that the total amount of entries in sorted set 1001 is 1231 entries. The key-value engine can determine an increment of 250 entries. The key-value engine can identify key $k_1$ as corresponding to entry 251, key $k_2$ as corresponding to entry 501, key $k_3$ as corresponding to entry 751, and key $k_4$ as corresponding to entry 1001. These keys can partition the sorted set 1001 into five similarly sized subsets (four subsets containing 250 entries and the remaining subset containing 231 entries).

The key-value engine can be configured to partition second sorted set 1002 into subsets A' to E' based on identified keys $k_1$ to $k_4$, consistent with disclosed embodiments. For example, the key-value engine can identify a subset A' of sorted set 1002 that includes key-value entries having keys less than $k_1$. Similarly, the key-value engine can identify a subset E' of sorted set 1002 that includes key-value entries having keys greater than $k_4$. The disclosed embodiments are not limited to any particular method of partitioning sorted set 1002 using the keys identified in sorted set 1001. In some embodiments, the key-value engine can use a binary search to identify the location of the keys $k_1$ to $k_4$ (or keys closest in value to each of $k_1$ to $k_4$) in sorted set 1001.

As may be appreciated, while the subsets A to E of sorted set 1001 may be similarly sized, subsets A' to E' of sorted set 1002 may not be similarly sized. For example, as depicted in FIG. 10A, subset D' may be substantially larger than subset D.

Accordingly, in a subsequent iteration of the merge process, the key-value engine can divide subset D' into subsets $D'_1$ to $D'_3$ based on amount to identify keys (e.g., $k_5$ and $k_6$ in this example). The key-value engine can then divide subset D into subsets $D_1$ to $D_3$ based on the identified keys. In some embodiments, in the subsequent iteration of the merge process, the key-value engine can divide subsets A' to E' (thereby including the division of subset D'). In some embodiments, subset D' can be selected for an additional iteration due to the size of subset D' exceeding some size threshold.

In some embodiments, key-value range scans can be implemented using a generalization of the pair-wise parallel merge. Given a set of sorted key-value sequences, the key-value engine can be configured to apply the parallel merge operation pairwise between elements of the set. The merge operations can be performed in parallel. Given a set of 2n sequences, the output of the merge operation will be a set of n sequences. In some embodiments, given a set of 2n+1 sequences, one sequence can be held out from the merge operation. The merge operations can be repeated until there is a single sorted, deduplicated sequence.

Parallelized Scanning

Figure 10C:
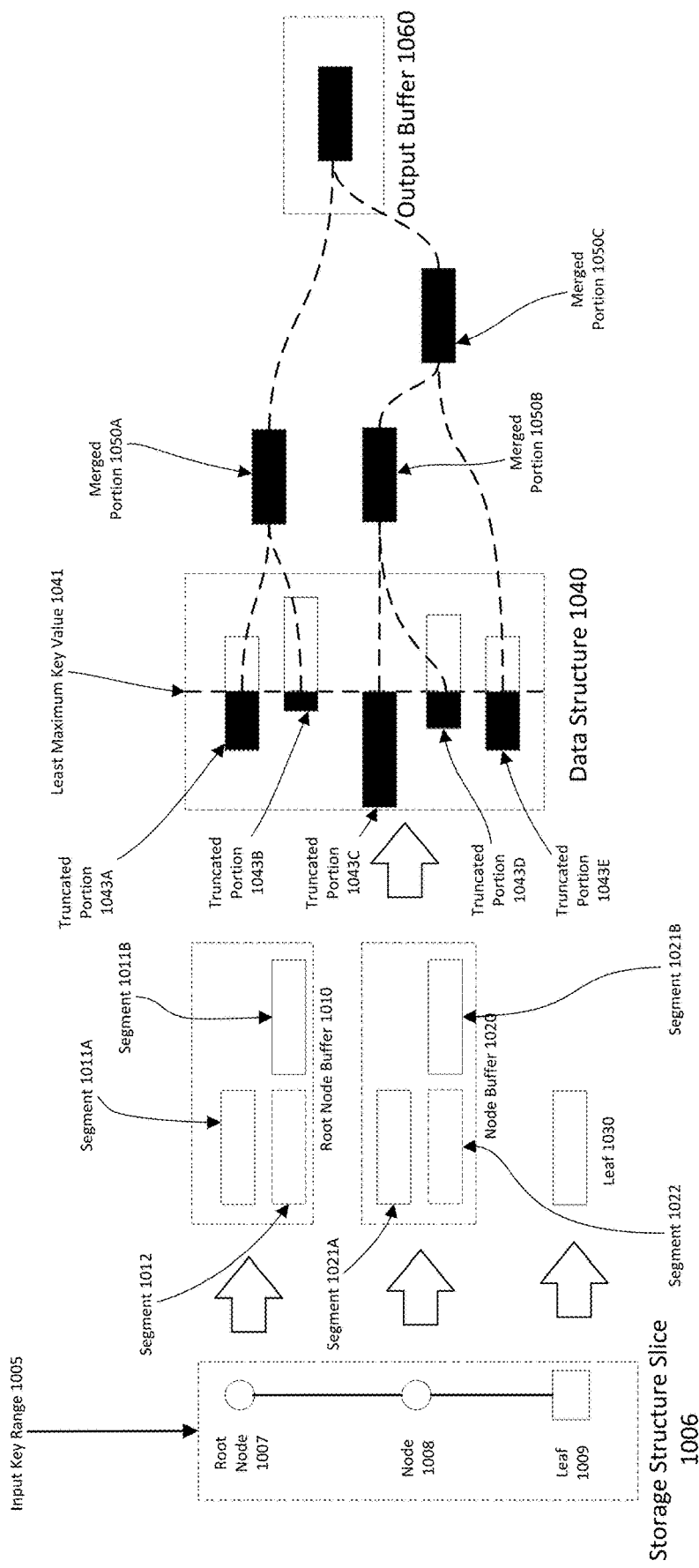
FIG. 10C depicts an exemplary process for parallelized key-range scanning, consistent with disclosed embodiments.

FIG. 10C depicts an exemplary process 1070 for parallelized key-range scanning, consistent with disclosed embodiments. Process 1070 can implement a scan request, as described herein. However, as may be appreciated, the disclosed embodiments are not limited to implementing scan requests using process 1070. Process 1070 can enable generation of an output sequence of key-values from multiple segments in multiple nodes without requiring previous/next pointers in the nodes. As may be appreciated, such pointers could hinder the append-only multi-versioning features implemented in some disclosed embodiments (e.g., by requiring rewriting of the entire storage structure whenever a component of the storage structure is updated).

Process 1070 can be performed using storage structure slice 1006, stack data structure 1040, and output buffer 1060. As depicted in FIG. 10C, slice 1006 can include root node 1007, node 1008, and leaf 1009. The contents of root node 1007 include root node buffer 1010, which contains two segments (e.g., segments 1011A and 1011B) that overlap with key range 1005, and one segment (e.g., segment 1012) that does not overlap with input key range 1005. The contents of node 1008 include node buffer 1020, which contains two segments (segments 1021A and 1021B) that overlap with key range 1005, and one segment (e.g., segment 1022) that does not overlap with input key range 1005. Leaf 1009 can contain leaf data 1030, which can overlap with input key range 1005.

In some embodiments, process 1070 can be performed using multiple routines/coroutines. In some embodiments, the routines/coroutines can be implemented as part of the key-value engine. The routines/coroutines can be configured to implement a producer/consumer architecture. A producer (or set of producers) can identify segments in the storage structure and store them in data structure 1040 (e.g., a stack, or the like). A consumer (or set of consumers) can process segments contained in data structure 1040 into sorted, sequential key-value data stored in output buffer 1060. Other layers of the data storage system, such as applications, or the like, can then draw data from output buffer 1060.

In a first step of process 1070, a producer (or set of producers) can scan the storage structure for segments that overlap with input key range 1005. In some embodiments, the producer can traverse the storage structure from the root node (e.g., of the current version) of the storage structure to the leaves of the storage structure. The producer can determine, using the range information for each segment, whether the segment contains key-value data overlapping with the input range. In some embodiments, the producer need only load a metadata portion for the node to identify any leaves or data portions containing key-value data overlapping with the input range. Identified data portions (e.g., the data portions of segments 1011A, 10111B, 1021A, 1021B, and leaf data 1030) can be loaded into data structure 1040 while the producer traverses the storage structure. As described herein, in some embodiments, data portions or leaves can be preloaded, while the producer processes the metadata portion. Accordingly, the producer can scan the storage structure extremely rapidly.

In a second step of process 1070, a consumer (or set of consumers) can process the segments included in data structure 1040. In some embodiments, the consumer can be configured to process the segments from the lowest key-value range to the highest key-value range. The consumer can identify the least maximum key value among the segments in the buffer (e.g., least maximum key value 1041). In some embodiments, the consumer can maintain a data structure for determining the least maximum key value (e.g., a priority queue, such as a binary min-heap). The consumer can generate truncated portions of the segments in data structure 1040 (e.g., truncated portions 1043A, 1043B, 1043C, 1043D, 1043E). The consumer can iteratively pairwise merge (e.g., using the parallelized key-value merge process described herein, or another suitable merging process) the truncated portions (e.g., generating merged portions 1050A, 1050B, 1050C). The consumer can store the result of the iterative pairwise mergers in output buffer 1060. Other layers of the data storage system, such as applications, or the like, can then draw data from output buffer 1060.

In some embodiments, the producer can also scan a write-ahead log or in-memory cache to identify key-value entries that have not been committed to the storage structure. The key-value engine can combine such key-value entries with the segments drawn from the storage structure. In some embodiments, such key-value entries can be added to data structure 1040 and combined using an iterative pairwise merge, as described herein. In some embodiments, such key-value entries can be combined with data drawn from output buffer 1060.

Just-in-Time Computation

A key-value engine consistent with disclosed embodiments can be used for just-in-time parallel computation. The key-value engine can exploit the throughput achieved by disclosed systems and methods to effectively store a record of computation in the key-value engine. This record of computation can be evaluated only when the current value of a particular key is required. Such an approach can improve the performance of a system consistent with disclosed embodiments.

In some embodiments, a system can write batches of key values to the key-value engine. As may be appreciated, the system need not obtain the current value of these keys. The time required to update the values can therefore be reduced. Instead, the system can write key-value entries including relative keys or absolute keys. As described herein, a relative key can expressly or inherently specify an operator. Depending on the operator, the relative key can expressly or inherently specify a value for use with the operator. As may be appreciated, when an absolute key is written to the key value engine, previously written relative or absolute keys can become stale. The disclosed systems and methods can therefore avoid the computation required to determine values for keys that become stale without being read.

In some embodiments, in response to a request for the current value of a key (or a range of keys), the system can use the key-value engine to identify and combine any relative keys up to the most-recently written absolute key. The system can use the key-value engine (and components and operations thereof) to store and retrieve the relative and absolute keys. For example, the system can use at least one of the parallelized data writing, parallelized data reading, parallelized key-value sequence merging, and parallelized data scanning operations described herein. Such parallelism can enable high throughput, improving the performance of just-in-time computation.

Cost-Complexity Analysis

The cost-complexity of the disclosed embodiments can be analyzed using a cost model appropriate for high-bandwidth storage hardware. Asymptotic cost bounds are presented, with a correctness argument, for a simplified version of the storage structure disclosed herein. Final cost bounds for a particular implementation are then obtained.

Cost Model

The costs model counts the number of storage portion-level I/O operations (IOPs) needed to perform an operation, with the addition of a new metric: minimum serial IOPs (MS-IOPs). This new metric is defined to be the length of the shortest sequence of IOP batches issued in parallel which are needed to complete an algorithm. This differs from IOPs in that, for example, if an operation requires accessing 10 storage portions, but the storage portions can be accessed in parallel (e.g., there are no dependencies imposing an order on the accessing), then even though the IOP cost would be 10, the MS-IOP cost is only 1.

The cost model focuses on MS-IOP cost because latency (e.g., as assessed by MS-IOP cost) now sufficiently dominates computing device performance that other resource costs can be disregarded. In the past, latency was correlated with total IOPs since random-access operations required the movement of a physical arm over a disk surface. However, modern solid-state storage hardware provides increasingly greater bandwidths and queue depths for operations issued in parallel. As depicted in FIG. 11, improvements in parallel I/O performance greatly exceed the improvements in linear I/O performance (as the improvements in linear I/O performance are constrained by certain fundamental physical limits). Latency has become the new bottleneck in computing device performance, justifying a cost model focused on MS-IOP cost.

Cost Complexity

The cost analysis first considers a simplified storage structure equivalent to a storage structure with the space amplification and height-independent parameter values set to $\delta=0$, $\gamma=1$. All batches inserted into the top of the storage structure and flushed down the levels of the tree to the leaves are the size of a full data portion. The asserted cost complexity for this storage structure and tuning parameter value configuration is as shown in Table I.

TABLE I

|  | IOPs | MS-IOPs |
|---|---|---|
| Read | $O\left(\log_2 \frac{N}{L}\right)$ | $O\left(\log_B\left(\frac{N}{L}\right)\right)$ |
| Write | $O\left(\frac{\log_2\left(\frac{N}{L}\right)}{L}\right)$ | $O\left(\frac{\log_B\left(\frac{N}{L}\right)}{L}\right)$ |
| Scan | $O\left(\frac{\log_2\left(\frac{N}{L}\right) + K}{L}\right)$ | $O\left(\frac{\log_B\left(\frac{N}{L}\right) + K}{L}\right)$ |

Search Cost Complexity

The search key could be stored redundantly in every level of the update buffers of all the Nodes from the top to the bottom of the storage structure (e.g., a single path). Therefore, the key-value engine must load at least one data portion from each update buffer level per node (e.g., $O(\log_2(B))$), for each node on a path from root to leaf $$\left(e.g., O\left(\log_B\left(\frac{N}{L}\right)\right)\right):$$

$$O\left(\log_2(B) \cdot \log_B\left(\frac{N}{L}\right)\right) = O\left(\log_2\left(\frac{N}{L}\right)\right)$$

In this example, the number of leaf pages per level is bounded by the buffer flush algorithm described herein. A flush can be triggered when there are at least L items in the key range of one of the sub-structures. The metadata portion of the node contains references indicating which data portions of the update buffer must be loaded for each level of the update buffer (within a small constant factor), which means that at every storage structure level, all possible update buffer data portions can be fetched in parallel, leading to the MS-IOPs cost above.

Insert Cost Complexity

The cost bound of batch insertion can be the total number of times a key-value engine can write a single update record during the lifetime of the update record. All updates are written to the root node's update buffer, where they are combined $\log_2(B)$ times before being flushed to the next level of the storage structure, which has height $$\log_B\left(\frac{N}{L}\right).$$

When any given update reaches a leaf, it has therefore been written the following number times:

$$O\left(\log_2(B) \cdot \log_B\left(\frac{N}{L}\right)\right) = O\left(\log_2\left(\frac{N}{L}\right)\right)$$

Thereafter, it will be combined with a key-matched record from a future batch insert, ending its lifetime.

Each update can be written as part of a batch of size $O(L)$. Thus, multiple key updates are performed for each write, and the total number of writes per key update is $$O\left(\frac{\log_2\left(\frac{N}{L}\right)}{L}\right).$$

The number of data portion reads has the same asymptotic complexity, since (in general) each new data portion rewrites a previous data portion (amortized over time, in the case of update buffers). Each insert operation generates a set of new storage portions that can be written to storage in a single round trip, so MS-IOPs is $O(1)$ for writes. The reads that happen at each level of the tree can all be issued in parallel, giving $$O\left(\log_B\left(\frac{N}{L}\right)\right)$$

read MS-IOPs, for an overall MS-IOPs of $$O\left(\log_B\left(\frac{N}{L}\right)\right).$$

Maximum Pending Bytes Per Pivot

As described herein, a node can include child metadata that reference child nodes, specify key-ranges for the child nodes, and/or indicate an amount of key-value data contained in the update buffer associated with a child node (e.g., matching a specified key-range of the child node, or the like). The maximum pending bytes per child node can be the maximum amount of such key-value data (in this example measured in bytes). Key value data flushed to a pivot can be used to update the child node referenced by the pivot.

In some embodiments, there will be at most $O(\log_2(B))$ segments containing a given key. Define Mi to be the upper bound on the average number of pending bytes per pivot that can be in an update buffer for any subset of i pivots. Then each pivot could have L−1 bytes pending after B−1 batches are inserted into the buffer: exactly one byte below the threshold to trigger a flush (given the particular tuning parameter values specified above). However, for any distribution of pending data amongst the pivots, if there is a total of B−L total bytes pending, it will always be possible to flush at least L bytes to some pivot; otherwise, it must be the case that all pivots have at most have L−1 bytes pending, contradicting the assumption that there are B L total bytes pending. This remains true once the buffer has reached its maximum capacity, regardless of how many additional batches are inserted/flushed. So $M_B = L-1$ $M_{B-1} = L$ Considering the insert/flush process that begins by inserting B batches, each of which have keys distributed equally amongst all pivots. When the $B^{th}$ such batch is inserted, all pivots will have L bytes pending. After L bytes are flushed to a child node, the corresponding pivot will have 0 bytes pending and all the rest will have L bytes pending.

Suppose a distribution for the next batch is adversarially designed to maximize the bytes pending for B−2 on the next iteration. Any batch will result in a flush at this point. If after that flush, the pending bytes addressed to the previously flushed pivot rise above 0, then the resulting distribution will have a maximal B−1 sized subset strictly less than if the batch did not add any to that pivot. The value of $M_{B-2}$ is at least $M_{B-1}$, since a distribution exists where one pivot has 0 and all the rest have L bytes, and a smaller subset of the L-sized pivots can be taken.

To maximize the largest subset of pending bytes for batch B−2, the number of pending bytes addressed to whichever pivot is flushed next must be minimized. Should the 0-byte pivot be flushed next, then the next batch must contain only keys addressed to that pivot (thus establishing the lower bound of L). By distributing the keys in the batch evenly among the remaining pivots, the largest number of pending bytes for batch B−2 on the next iteration can be maximized. Therefore:

$$M_{B-2} = L + \frac{L}{B-1} = L\left(1 + \frac{1}{B-1}\right)$$

Thus, the maximal subset of i pivots distributes pending bytes evenly amongst all members of the subset, leaving behind a complementary subset with a minimal number of pending bytes: the defunct set. The number of pending bytes for a pivot can only be decreased by flushing to that pivot. In this example, the key-value engine only flushes to a pivot when that pivot has the highest pending byte count. But once a pivot has entered the defunct set, the maximal subset always has at least one member with more bytes pending. Thus, the key-value engine will only flush from the maximal set. Carrying this process out:

$$M_{B-3} = L\left(1 + \frac{1}{B-1} + \frac{1}{B-2}\right)$$

$$M_{B-4} = L\left(1 + \frac{1}{B-1} + \frac{1}{B-2} + \frac{1}{B-3}\right)$$

$$M_1 = L\left(1 + \frac{1}{B-1} + \frac{1}{B-2} + \frac{1}{B-3} + \ldots + \frac{1}{3} + \frac{1}{2}\right) < L \cdot \ln B$$

In this example, the upper bound on the number of segments containing pending updates addressed to a given pivot is $O(\log_2 B)$, whether those segments are spread across levels of the Update Buffer or reside in a single level.

Effect of Tuning Parameters on Cost Analysis

Generally, the amortized cost of updates in buffered trees can be derived by taking the height of the tree for a given N and dividing that by the parent-to-child flush batch size. This derivation method can be modified to adjust for varying flush batch sizes by dividing the tree height by the average batch size:

let $\bar{b}$ := average batch size $$\bar{b} = \frac{\sum_{h=0}^{\log_B \frac{N}{B}}(\log_2 B + 1) \cdot \frac{\gamma L}{2^{\delta h}}}{\log_B \frac{N}{B}(\log_2 B + 1)}$$

$$= \frac{(\log_2 B + 1)\sum_{h=0}^{\log_B \frac{N}{B}} \frac{\gamma L}{2^{\delta h}}}{(\log_2 B + 1)\log_B \frac{N}{B}}$$

$$= \frac{\sum_{h=0}^{\log_B \frac{N}{B}} \frac{\gamma L}{2^{\delta h}}}{\log_B \frac{N}{B}}$$

-continued $$= \frac{\gamma L}{\log_B \frac{N}{B}} \sum_{h=0}^{\log_B \frac{N}{B}} 2^{-\delta h}$$

$$= \frac{\gamma L}{\log_B \frac{N}{B}} \cdot \frac{1 - 2^{-\delta \log_B \frac{N}{B}}}{1 - 2^{-\delta}}$$

When $0 < \delta \leq 1$, the right-hand factor is at least 1 and at most 2, therefore:

$$\bar{b} = O\left(\frac{\gamma L}{\log_B \frac{N}{B}}\right)$$

In this example, the cost of a single edit is the number of levels through which that edit must travel, divided by the average batch size b. Therefore:

$$\text{per-key update cost} = O\left(\frac{\log_B \frac{N}{B} \cdot \log_2 \frac{N}{B}}{\gamma L}\right)$$

The effect of varying $\gamma$ is clear, and in the limit non-zero values $\delta$ of add a write amplification factor of $$\frac{1 - 2^{-\delta}}{1 - 2^{-\delta \log_B \frac{N}{B}}}\log_B \frac{N}{B} = O\left(\log_B \frac{N}{B} \cdot\right)$$

In this example, to update the query cost analysis to account for tuning parameters, the average number of segments where a given key might reside can be updated to account for the tuning parameters. For $\delta > 0$, the total amount of buffered data per node decays exponentially as h increases, moving from a leaf to the root of the storage structure. Since each leaf has a unique path to the rout, this means that the keys in the range of the leaf ae duplicated at most by some constant factor (with respect to N), determined by the value of $\delta$.

For example:

let $\hat{L}$ := maximum number of total bytes stored per leaf $$\hat{L} = \gamma L\left(1 + \frac{1}{1 - \frac{1}{2^\delta}}\right)$$

$$\delta = 0, \hat{L} = L\left(1 + \gamma \log_2 \frac{N}{B}\right)$$

$$\delta = 1, N \to \infty, \hat{L} \leq L(1 + 2\gamma)$$

$$\delta = \infty, N \to \infty, \hat{L} \leq L(1 + \gamma)$$

Therefore, in this example, setting $\delta > 0$ causes a constant upper bound proportional to $\gamma$ on the amount of space amplification and total (serial) I/O count. However, the parallel I/O cost is the same (asymptotically) since the branching factor stays within a constant factor of $\log_B N$.

Experimental Results

The disclosed embodiments were tested for several different workloads against another key-value storage engine:

ROCKSDB. To simulate different types and ways of data ingestion, the tests used the combinations of key length, value length, and insertion order listed in Table II.

TABLE II

| Configuration | Key Length | Value Length | Insertion Order |
|---|---|---|---|
| 1 | 6 bytes | 100 bytes | Random |
| 2 | 6 bytes | 100 bytes | In-order |
| 3 | 16 bytes | 32 bytes | Random |
| 4 | 16 bytes | 32 bytes | In-order |
| 5 | 32 bytes | 512 bytes | Random |
| 6 | 32 bytes | 512 bytes | In-order |

Configurations 1 and 2 were designed to simulate the use of the key-value engine as an index to another data store. Accordingly, the keys and values are small (though the size of the values is sufficient for the values to contain suitable amounts of metadata). Configurations 3 and 4 were designed to simulate the use of the key-value engine as a primary store of numerous small records (e.g., a time series database or the like). Configurations 5 and 6 were designed to simulate the use of the key-value engine as a primary store of large data (e.g., an object/block store, file system, or the like).

Benchmarking was performed using a benchmarking program that first loads a data file, then inserts a given number of key-value entries read from that file into a clean database instance. The program waits for 10 seconds to allow any background compaction activity to finish, then runs the point query workload, followed by the full key-range scan, then short scans of exponentially increasing size, from 1 up to 65536 keys.

The benchmarking program was linked against ROCKSDB and an implementation consistent with disclosed embodiments. Both programs were compiled using GCC 9 on UBUNTU 20, with the same optimization settings ("Release,"–O3 no debug). The test hardware was an AMD RYZEN 5950x 16-core/32-thread workstation with 128 GB DDR4 memory, using an INTEL OPTANE 905p 380 GB M.2 PCIe gen 3 solid-state drive rated at 2600 MB/s read bandwidth and 2200 MB/s write. The solid-state drive was formatted with a single partition spanning the entire device, using the XFS filesystem.

Figure 12:
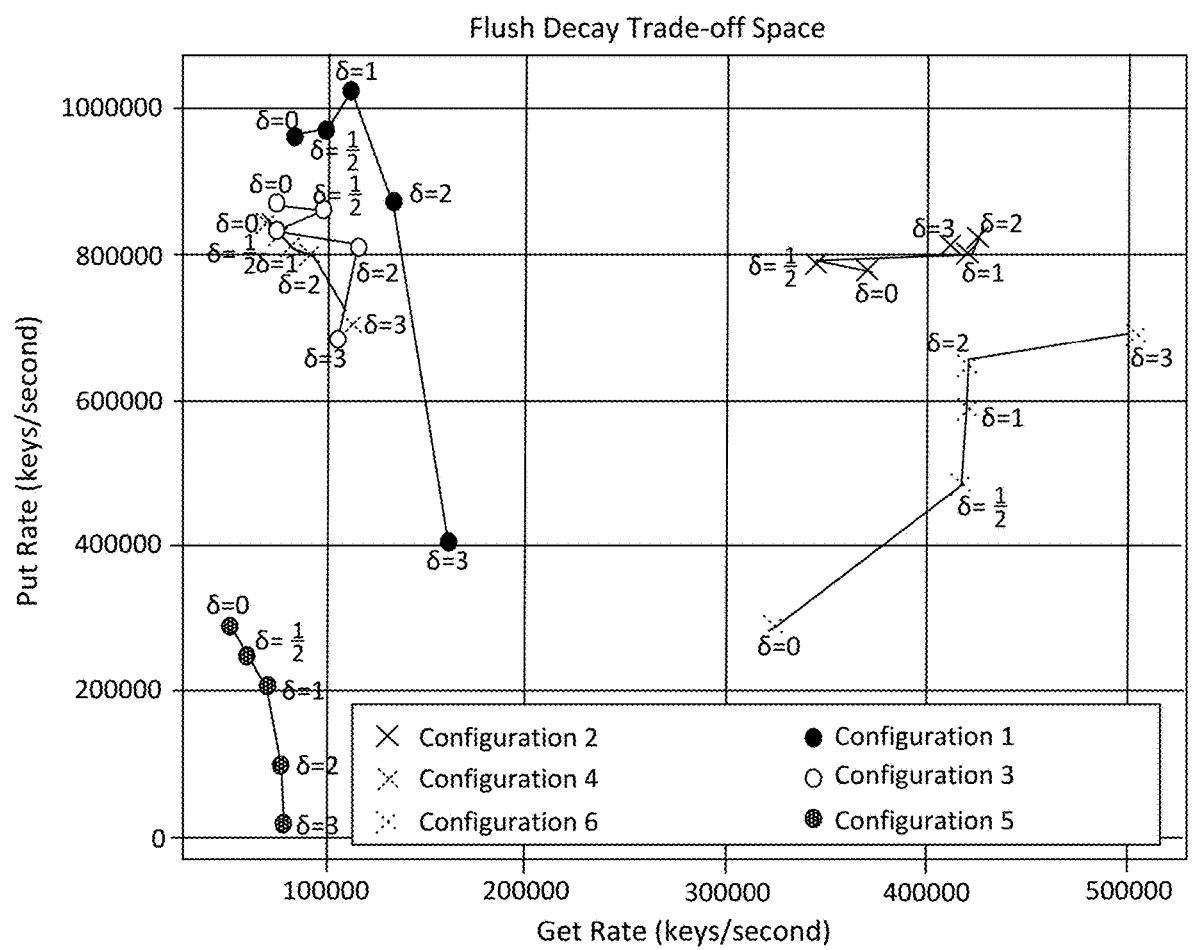
FIG. 12 depicts tradeoff curves for insertion rate against query rate for various workload configurations and space amplification parameters, consistent with disclosed embodiments.

FIG. 12 depicts tradeoff curves for insertion rate against query rate for various workload configurations and space amplification parameter values, consistent with disclosed embodiments. For each workload configuration given in Table II, insertion rates and query rates were determined for $$\delta \in \left\{0, \frac{1}{2}, 1, 2, 3\right\}.$$

In general, increased query rates trade off against decreased insertion rates. These results provide empirical evidence that space amplification parameter is effective in trading off between read and write amplification (though an opposite trend was observed for two configurations including ordered inserts and large value-to-key size ratios: configuration 2 and configuration 6). Based on the results depicted in FIG. 12, a space amplification parameter value was selected for each configuration for use in benchmarking tests, as described herein.

FIGS. 13A to 13L depict time-series plots of the performance on benchmarking tests of a commercially available control system (ROCKSDB) and a key-value engine consistent with disclosed embodiments. Each figure depicts the performance of the key-value engine (test) and the control system (control) for a different performance metric (e.g., ingestion rate, point query rate, etc.) for different ones of the test configurations given in Table II (e.g., Config. 1, Config. 2, etc.). The value of the space amplification parameter for the key-value engine in each test was selected based on the testing results depicted in FIG. 12. Performance is depicted using time-series plots, as the comparative performance of these systems would be difficult to convey with summary or aggregate statistics (e.g., average/median/max throughput). In each figure, higher values indicate superior performance.

Figure 13A:
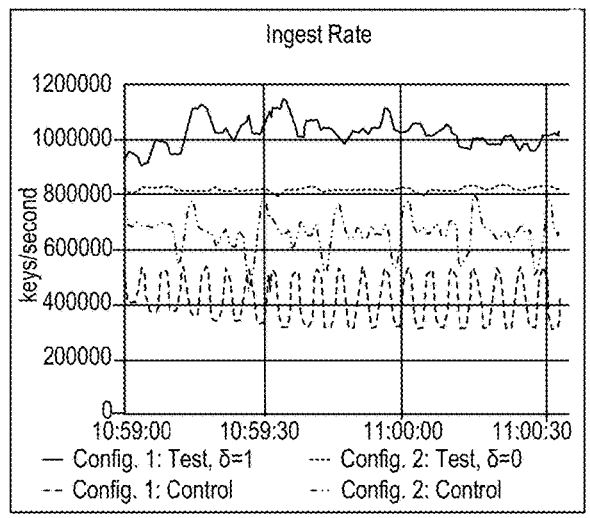
FIGS. 13A to 13L depict the performance on benchmarking tests of a commercially available control system and a key-value engine consistent with disclosed embodiments.
Figure 13B:
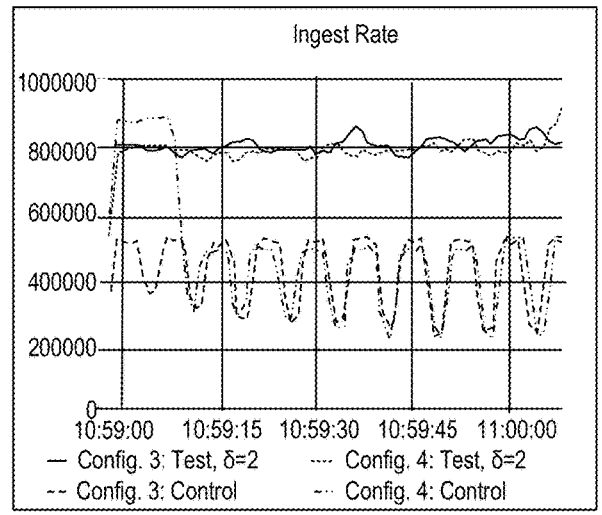
Figure 13C:
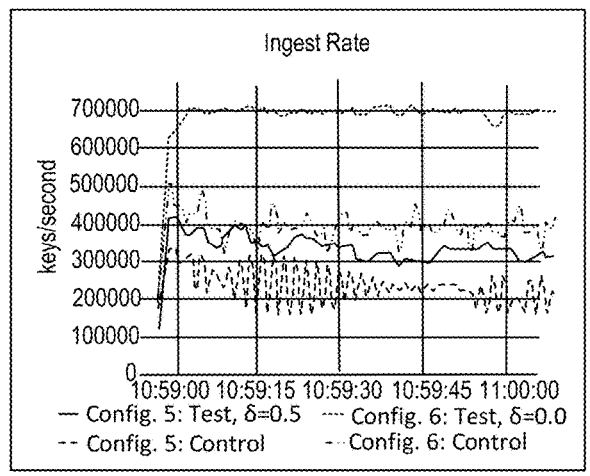
Figure 13D:
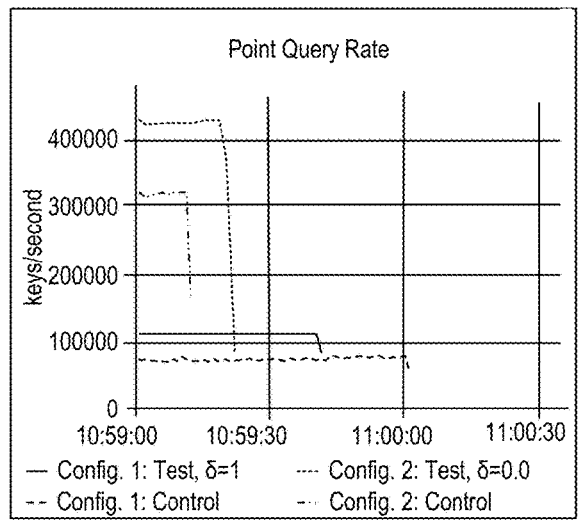
Figure 13E:
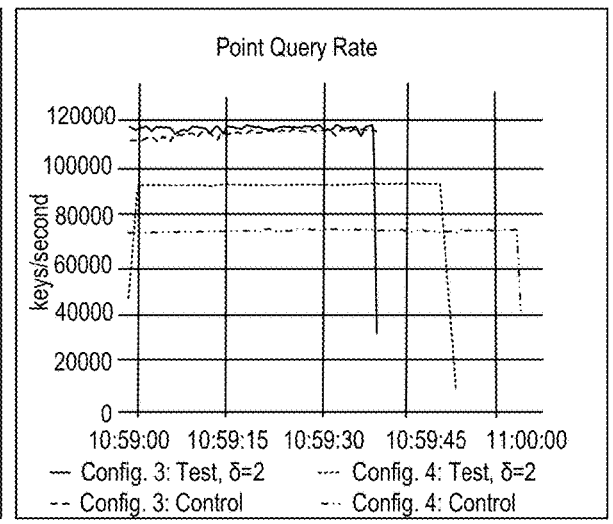
Figure 13F:
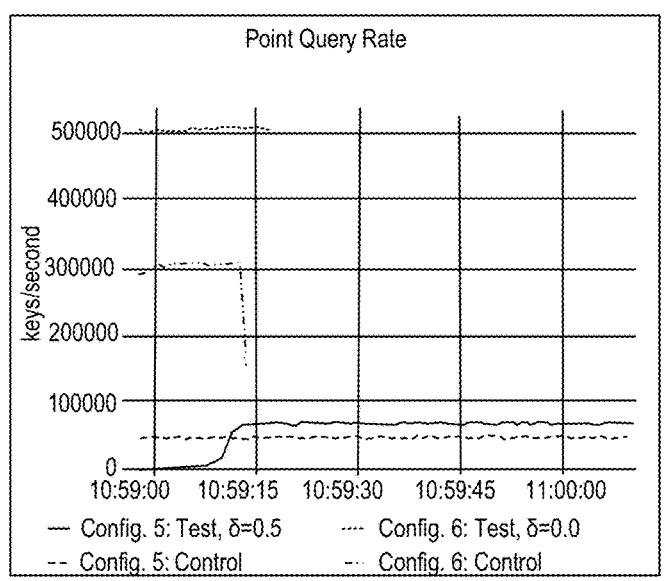
Figure 13G:
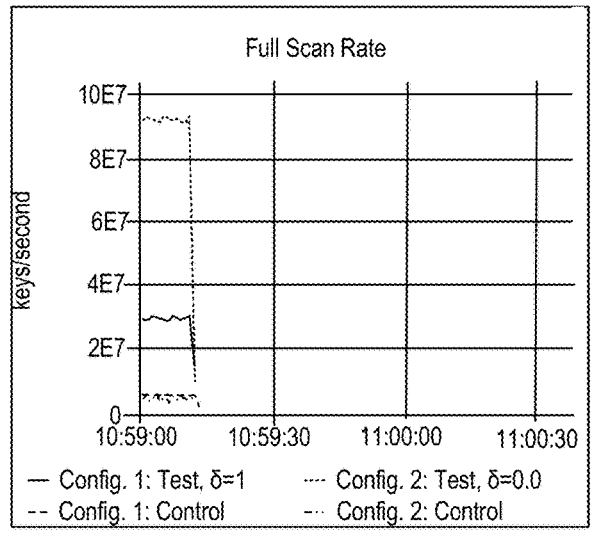
Figure 13H:
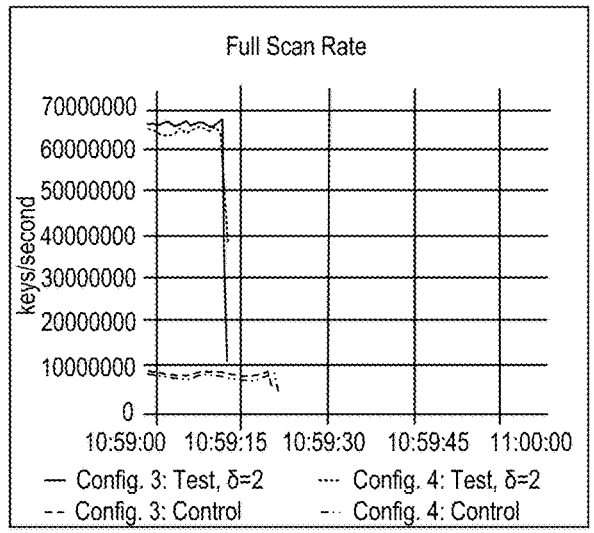
Figure 13I:
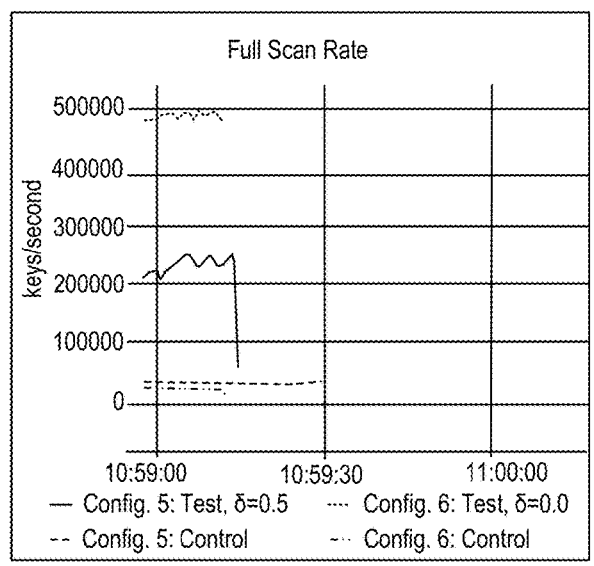
Figure 13J:
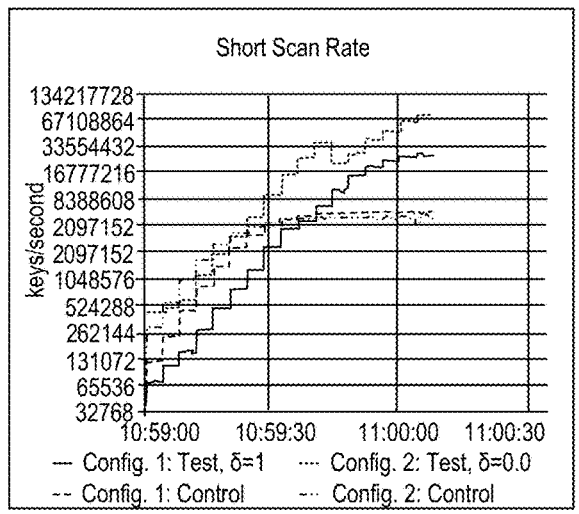
Figure 13K:
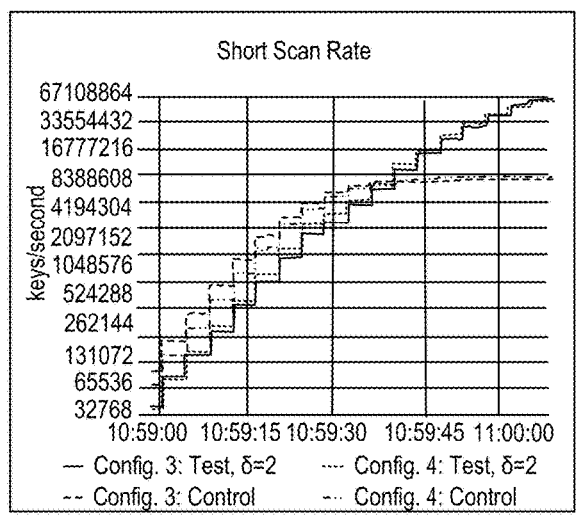
Figure 13L:
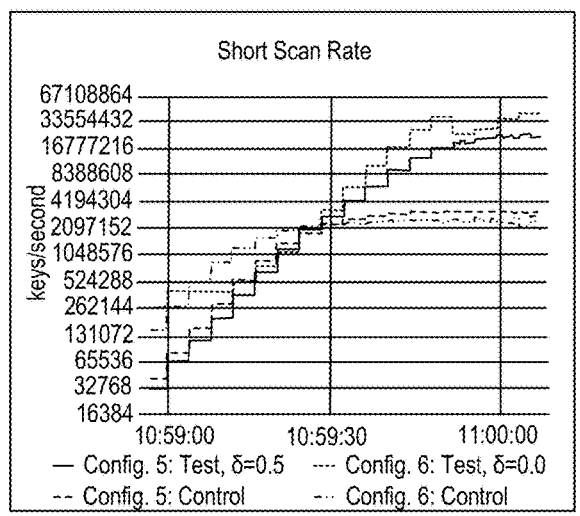

FIGS. 13A to 13C depict ingest rate over time for the control system and the key-value engine. FIGS. 13D to 13F depict single point query rate over time for the control system and the key-value. FIGS. 13G to 13I depict full key-range scan rate over time for the control system and the key-value engine. FIGS. 13J to 13L depict short key-range scan rate over time for the control system and the key-value engine. The short scan rate graphs contain small "steps" as time goes on; these steps happen when the test program switches to a larger short-scan size (in terms of number of keys). The scan size starts at a single record and doubles with each of these steps.

The key-value engine performed favorably when compared to the control system using ROCKSDB. On average across all configurations, key-value engine was 73% faster for ingest, 31% faster for point queries, 976% faster for full scans, and 305% faster for short scans. Speedup tended to be greater for randomized insertion scenarios and for small keys, whereas in-order insertion showed less of an improvement. In the cases where ordered insertion did not result in better performance for the key-value engine (in particular, configuration 4), the high flush space amplification parameter value required to balance performance between ingest and point query rate may have effectively disabled certain "fast-path" code optimizations in place specifically to deal with in-order data.

The discrepancy in range-scan performance between the control system and the key-value engine may arise from the multi-core compaction-enabled scanner implementation used by the key-value engine. In the benchmarking tests, the key-value engine achieved up to 20× faster performance than the control system. As may be appreciated, additional tuning of the key-value engine may improve the balance between a fixed (startup) cost per scan and faster throughput. The untuned key-value engine appears to exhibit a "slow-start" behavior in the short scan data, in which the key-value engine is slower for very small scan sizes, but eventually overtakes the control system as scan size grows.

In this particular test, the key-value engine also demonstrated a slow-start point query rate for configuration 5. Although the key-value engine eventually overtakes and exceeds the control system on this metric, the key-value engine appeared to demonstrate a warm-up period. This warm-up period can be addressed by improved cache eviction heuristics/policies (e.g., giving preference to nodes over leaves, giving priority to data portions based on their height in the tree, or the like).

Figure 14A:
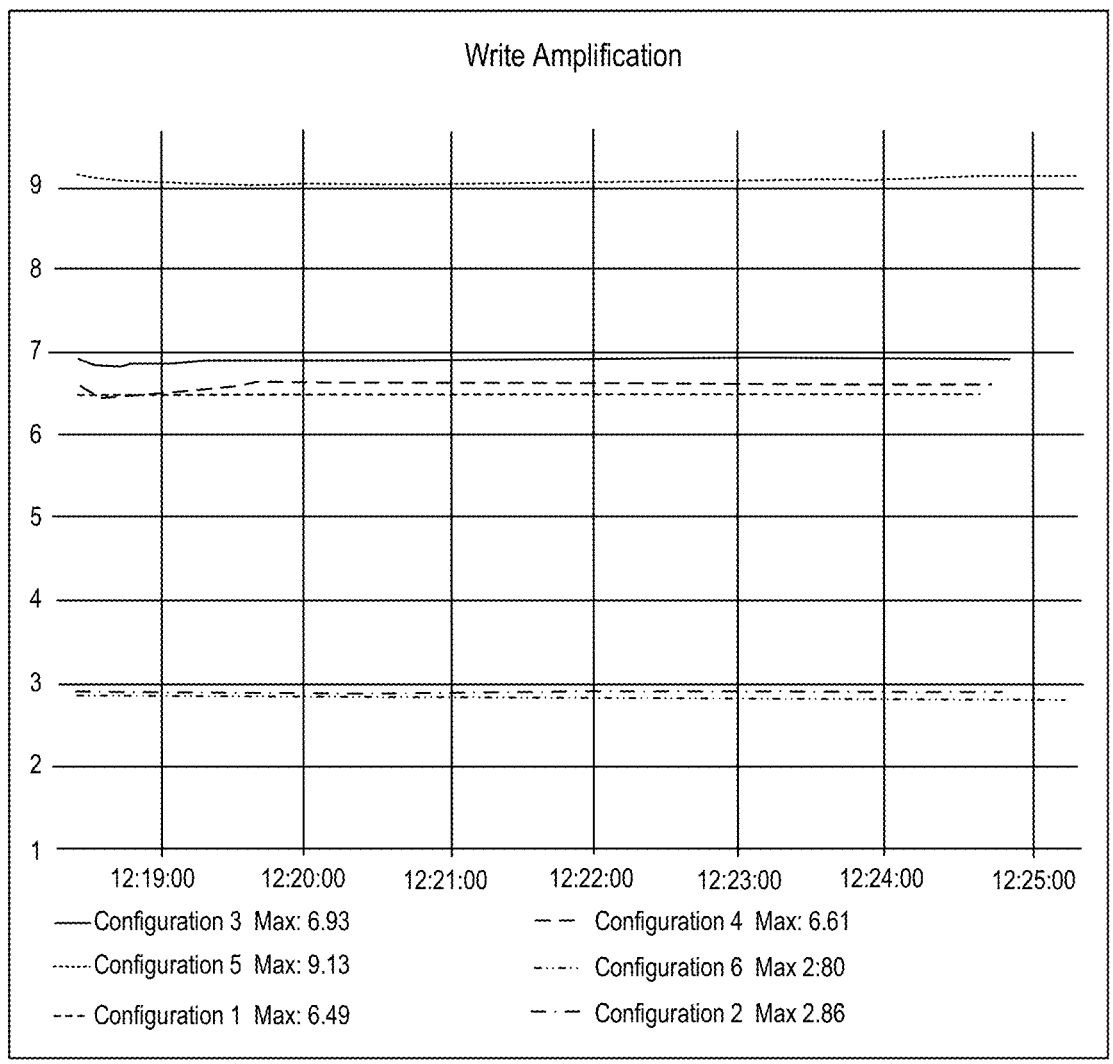
FIGS. 14A and 14B depict write and space amplification achieved on benchmarking tests by the key-value engine consistent with disclosed embodiments.
Figure 14B:
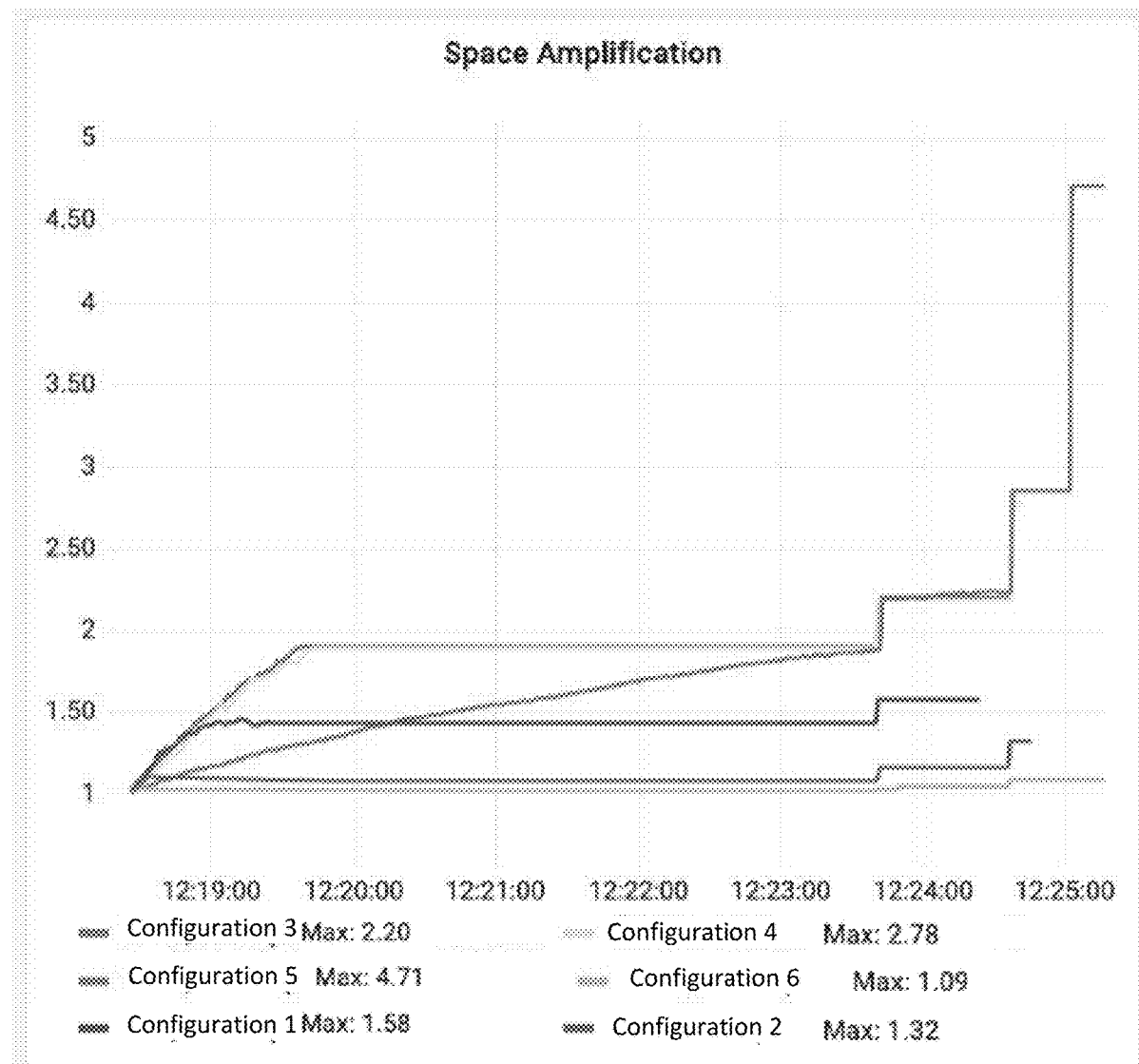

FIGS. 14A and 14B depict write and space amplification achieved on benchmarking tests by the key-value engine consistent with disclosed embodiments. The write and space amplification values obtained are competitive with expectations from existing key-value storage engines. Key-ordered insertion workloads generally produced lower (better) write- and space-amplification. Such results may be due to the triggering of fast-path code in the key-value engine.

Such code can enable the key-value engine to avoid unnecessary compaction operations on leaf pages having disjoint key ranges.

Exemplary Embodiments

The disclosed embodiments may further be described using the following clauses:

1. A data storage system, comprising: at least one processor; and at least one computer readable medium containing instructions that, when executed by the at least one processor, cause the data storage system to implement a key-value engine comprising: a storage structure including leaves and nodes, a first node including: child data indicating key ranges associated with child nodes of the first node, a first key range associated with a first child node; and a multi-level update buffer; and wherein the key-value engine is configured to: obtain a first batch of key-value entries; insert the first batch into the update buffer; determine satisfaction of an update condition for the first child node; extract a second batch of key-value entries from the update buffer, the second batch including key-value entries within the first key range; and provide the second batch to the first child node.

2. The data storage system of claim 1, wherein: inserting the first batch into the update buffer comprises: determining that a first level of the update buffer is empty; and storing the first batch in the first level of the update buffer.

3. The data storage system of claim 1, wherein: inserting the first batch into the update buffer comprises: determining that the first level of the update buffer includes a third batch of active key-value entries; generating a combined batch using the first batch and third batch of key-value entries; and storing the combined batch in a second level of the update buffer.

4. The data storage system of claim 3, wherein: inserting the first batch into the update buffer further comprises: indirectly associating subsets of the combined batch with the child nodes.

5. The data storage system of any one of claims 1 to 4, wherein: the first node further includes pending update amounts corresponding to the child nodes; and determining satisfaction of the update condition comprises: updating a first pending update amount of the pending update amounts, the first pending update amount corresponding to the first child node; and determining that the updated first pending update amount exceeds an amount threshold.

6. The data storage system of any one of claims 1 to 5, wherein: a first level of the update buffer includes at least one first filter that indicates active key ranges within the first level; and extracting the second batch of key-value entries from the update buffer includes: identifying a first key-value subset within the first level; including the first key-value subset within the second batch; and updating the at least one first filter to exclude the first key-value subset from the active key ranges.

7. The data storage system of any one of claims 1 to 6, wherein: the update buffer includes multiple levels that form an ordered set of levels of increasing target capacities.

8. The data storage system of claim 7, wherein: a second level in the ordered set of levels follows a first level of the update buffer and has a target capacity twice or approximately twice as great as the first level.

9. The data storage system of any one of claims 1 to 8, wherein: the key-value engine is further configured to: store contents of each leaf in a data portion corresponding to the leaf, store contents of each level of the update buffer in data portions corresponding to the level of the update buffer; and store references to the data portions corresponding to the levels of the update buffer in a first metadata portion corresponding to the first node.

10. The data storage system of any one of claims 1 to 9, wherein: the key-value engine further comprises a write-ahead log configured to store key-value entries; and obtaining the first batch of key-value entries comprising deduplicating and sorting a first portion of the write-ahead log.

11. A data storage system comprising: at least one processor; and at least one computer-readable medium containing instructions that, when executed by the at least one processor, cause the data storage system to perform operations comprising: appending a key-value entry to a write-ahead log; determining that a first portion of the write-ahead log satisfies a batch generation condition, the first portion of the write-ahead log including the appended key-value entry; generating a first batch by deduplicating and sorting the first portion of the write-ahead log; and writing the first batch to a storage structure including nodes and leaves, a first node of the storage structure including first key-range pivots that indicate first child nodes and a first multi-level update buffer.

12. The data storage system of claim 11, wherein: the first portion of the write-ahead log follows a first checkpoint; and the operations further comprise: appending a second checkpoint to the write-ahead log following the first portion; and trimming the write-ahead log based on a location of the second checkpoint.

13. The data storage system of any one of claims 11 to 12, wherein: determining that the first portion of the write-ahead log satisfies a batch generation condition comprises determining that a size of the first portion exceeds a size threshold.

14. The data storage system of any one of claims 11 to 13, wherein: writing the first batch to the storage structure includes: inserting the first batch into a first level of the first multi-level update buffer; or generating a combined batch using the first batch and active key-values stored in the first level and inserting the combined batch into a second level of the first multi-level update buffer.

15. The data storage system of any one of claims 11 to 14, wherein: the operations further comprise: maintaining a cache structure that stores locations of key-value entries stored in the write-ahead log.

16. The data storage system of any one of claims 11 to 15, wherein: the operations further comprise generating, in response to a read request, a snapshot object.

17. The data storage system of any one of claims 11 to 16, wherein: contents of each leaf are stored in a data portion corresponding to the leaf, and contents of each level of the update buffer are stored in data portions corresponding to the level of the update buffer.

18. A method of storing key-value entries, comprising: obtaining a first batch of key-value entries; and applying the first batch to a storage structure, application of the first batch comprising: inserting the first batch into an update buffer of a parent node in the storage structure; determining a buffer flush condition has been satisfied for a sub-structure inserted into the parent node; extracting, from the update buffer, a second batch of key-value entries, the second batch including key-value entries having keys within a key range associated with the sub-structure; generating an updated sub-structure by applying the second batch to the sub-structure; and replacing, in the storage structure, the sub-structure with the updated sub-structure.

19. The method of claim 18, wherein: replacing, in the storage structure, the sub-structure with the updated sub-structure comprises: determining a height of the updated sub-structure exceeds the height of the sub-structure; and inserting child nodes of a root node of the sub-structure into the parent node of the storage structure.

20. The method of claim 19, wherein: replacing, in the storage structure, the sub-structure with the updated sub-structure further comprises: flushing contents of an update buffer of the root node of the sub-structure to the child nodes of the root node of the sub-structure, prior to inserting the child nodes of the root node of the sub-structure into the parent node of the storage structure.

21. The method of claim 19, wherein: replacing, in the storage structure, the sub-structure with the updated sub-structure further comprises: determining the parent node of the storage structure satisfies a maximum utilization condition and splitting the parent node to generate split nodes.

22. The method of claim 21, wherein: splitting the parent node comprising partitioning the update buffer of parent node using range filters contained in the split nodes.

23. The method of claim 18, wherein: replacing, in the storage structure, the sub-structure with the updated sub-structure comprises: determining a height of the sub-structure exceeds the height of the updated sub-structure; and insert a root node of the updated sub-structure into a sibling node in the storage structure.

24. The method of any one of claims 18 to 23, wherein the method further comprises: determining that the parent node fails a minimum utilization condition; and combining the parent node with a sibling of the parent node in the storage structure, wherein the combining includes concatenating update buffers of the parent node and sibling node.

25. A method of retrieving at least one key-value entry, comprising: obtaining a search key range; searching a storage structure for at least one key-value entry matching the search key range, searching comprising: generating a first set of key-value entries matching the search key range by searching an update buffer of a root node of the storage structure; identifying a set of sub-structures having key ranges that overlap with the search key range; and generating a second set of key-value entries matching the search key range by searching the set of sub-structures; and generating the at least one key-value entry using the first set of key-value entries and the second set of key-value entries.

26. The method of claim 25, wherein: the update buffer includes multiple levels; and searching the update buffer of the root node of the storage structure comprises: searching each level of the update buffer for key-value entries matching the search key range.

27. The method of claim 26, wherein: a first level of the update buffer includes segments, each segment associated with a key range; and searching the first level of the update buffer for key-value entries matching the search key range comprises identifying at least one of the segments associated with a key range overlapping the search key range.

28. The method of any one of claims 25 to 27, wherein: the searching further comprises determining the first set of key-value entries includes only relative-value entries; and the set of sub-structures is identified and searched in response to the determination that the first set of key-value entries includes only relative-value entries for at least one key in the search key range.

29. The method of any one of claims 25 to 27, wherein: generating the at least one key-value entry using the first set of key-value entries and the second set of key-value entries comprises combining, for a key, an absolute-value entry and at least one relative value entry.

30. The method of any one of claims 25 to 29, further comprising: obtaining a third set of key-value entries using a cache structure; and wherein generating the at least one key-value entry using the first set of key-value entries and the second set of key-value entries further comprises generating the at least one key-value entry using the first set of key-value entries, the second set of key-value entries, and the third set of key-value entries.

31. The method of any one of claims 25 to 30, wherein: the method further comprises generating a snapshot object containing a reference to the storage structure and a read lock on a cache structure.

32. A method of storing key-value entries in a multi-level buffer of a node in a storage-structure of a key-value engine, comprising: receiving a sorted batch of key-value entries; and applying the sorted batch of key-value entries to the node, comprising: iterating through levels of the multi-level buffer, in each iteration updating the sorted batch of key-value entries by combining the sorted batch of key-value entries with key-value entries stored in a current level of the multi-level buffer until the current level of the multi-level buffer is inactive; and storing the sorted batch of key-value entries in the current level of the multi-level buffer.

33. The method of claim 32, further comprising: associating segments of the current level with child nodes, based on the stored, sorted batch of key-value entries.

34. The method of claim 33, wherein: the child nodes are associated with key ranges; each segment contains a subset of the stored, sorted batch of key-value entries, the subset including a range of keys; and associating segments of the current level with child nodes comprises, for each segment: identifying ones of the child nodes associated with key ranges that overlap the range of keys included in the segment; and updating range information to specify the ones of the child nodes.

35. The method of any one of claims 32 to 34, wherein: combining the sorted batch of key-value entries with key-value entries stored in a current level of the multi-level buffer comprises: identifying, using filters contained in the node, active key-value entries stored in the current level of the multi-level buffer; and combining the sorted batch of key-value entries with the active key-value entries.

36. The method of any one of claims 32 to 35, wherein: applying the sorted batch of key-value entries to the node further comprises, after storing the sorted batch of key-value entries in the current level of the multi-level buffer, updating filters contained in the node to indicate that the sorted batch of key-value entries is active.

37. The method of any one of claims 32 to 36, wherein: the multi-level buffer includes a sequence of levels, each level in the sequence having twice or approximately twice the target capacity of a preceding level in the sequence.

38. A data storage system, comprising: at least one processor; and at least one non-transitory, computer-readable medium containing instructions that, when executed by the at least one processor, cause the data storage system to implement a key-value engine, wherein: the key-value engine comprises a storage structure including nodes and leaves, a first node: including an update buffer containing key-value data; and having child nodes; and the key-value engine is configured to: determine the update buffer satisfies a buffer flush condition; generate, in response to the determination, a batch of key-value data using the update buffer, wherein a size of the batch depends on a height of the first node in the storage structure and a space amplification parameter; and provide the batch to update a first child node of the child nodes.

39. The data storage system of claim 38, wherein: the size of the batch decreases as the space amplification parameter increases.

40. The data storage system of any one of claims 38 to 39, wherein: the size of the batch further depends on a height-independent scaling parameter.

41. The data storage system of claim 40, wherein: the size of the batch decreases as the height-independent scaling parameter decreases.

42. The data storage system of any one of claims 38 to 41, wherein: the size of the batch further depends on a capacity of one of the leaves.

43. The data storage system of any one of claims 38 to 42, wherein: the size of the batch is less than a capacity of one of the leaves.

44. The data storage system of any one of claims 38 to 43, wherein: the first node indicates an amount of key-value data contained in the update buffer and associated with the first child node; and determining the update buffer satisfies the buffer flush condition comprises determining that the amount of key-value data exceeds a threshold.

45. A method of configuring a storage system, comprising: obtaining, by a key-value engine of the storage system, at least one of a space amplification parameter or a height-independent scaling parameter; extracting, from an update buffer of a parent node in a storage structure implemented by the key-value engine of the storage system, a first batch of key-value data, wherein a size of the first batch depends on the at least one of the space amplification parameter or the height-independent scaling parameter; and providing the first batch of key-value data to a child node of the parent node.

46. The method of claim 45, wherein: the key-value engine obtains the space amplification parameter; and the size of the first batch depends on the space amplification parameter and a height of the parent node in the storage structure.

47. The method of any one of claims 45 to 46, further comprises: updating the at least one of the space amplification parameter or the height-independent scaling parameter; and extracting, from the update buffer, a second batch of key-value data, wherein a size of the second batch depends on the updated at least one of the space amplification parameter or the height-independent scaling parameter; and providing the second batch of key-value data to a child node of the parent node.

48. The method of claim 47, wherein: the at least one of the space amplification parameter or the height-independent scaling parameter is updated in response to a change in a workload of the key-value engine.

49. The method of claim 48, wherein: the change in the workload of the key-value engine comprises a change in a read request rate or write request rate of the storage system.

50. The method of any one of claims 45 to 49, wherein: the size of the first batch further depends on a capacity of a leaf of the storage structure.

51. The method of any one of claims 45 to 50, wherein: the size of the first batch is less than a capacity of a leaf of the storage structure.

52. A data storage system, comprising: at least one processor; and at least one computer readable medium containing instructions that, when executed by the at least one processor, cause the data storage system to implement a key-value engine comprising: a storage structure including leaves and multiple levels of nodes, a first node including: pivots indicating child nodes associated with key ranges, a first pivot indicating a first child node associated with a first key range; and an update buffer configured to store key-value entries; and wherein the key-value engine is configured to: extract a batch of the key-value entries stored the update buffer, the batch including key-value entries within the first key range, a size of the batch depending on a height of the first node in the storage structure and a value of a space amplification parameter; and provide the batch to the first child node.

53. The data storage system of claim 52, wherein: the size of the batch further depends on a height-independent scaling factor and a data portion size.

54. The data storage system of any one of claims 52 to 53, wherein: the update buffer includes multiple levels, and the key-value engine is further configured to: insert a first batch into a first level of the multiple levels; or generate a combined batch using the first batch and active key-values stored in the first level and insert the combined batch into a second level of the multiple levels.

55. The data storage system of any one of claims 52 to 54, wherein: the first node further includes pending update amounts corresponding to the child nodes, a first pending update amount corresponding to the first child node; and the key-value engine is further configured to: update the first pending update amount; and determine that the updated first pending update amount exceeds a size threshold; and the batch is extracted in response to the determination that the updated pending update amount exceeds the size threshold.

56. The data storage system of claim 55, wherein: the first pending update amount is updated based on a size of the key-value entries within the first key range stored in the update buffer.

57. The data storage system of any one of claims 52 to 56, wherein: the key-value engine is further configured to approximate a specified average batch size by selecting among a set of predetermined batch sizes.

58. A storage system, comprising: a key-value engine including: a storage structure in a first version comprising a root node connected to a child node, wherein: the child node comprising: a first node data portion, a second node data portion, and a child metadata portion, the child metadata portion including references to the first node data portion and the second node data portion; and the root node comprises: a root metadata portion including a reference to the child metadata portion; and wherein the key-value engine is configured to: update the storage structure to a second version by: updating the child node by: generating an updated first node data portion containing updated key value entries, and generating an updated child metadata portion containing references to the updated first node data portion and the second node data portion; and in response to updating the child node, update the root node by: generating an updated root metadata portion containing a reference to the updated child metadata portion; traverse the storage structure using the root metadata portion in response to a first scan request; and traverse the storage structure using the updated root metadata portion in response to a second scan request that specifies the second version.

59. The storage system of claim 58, wherein: the key-value engine is configured to generate a snapshot object in response the first scan request, the snapshot object containing a reference to the updated root metadata portion.

60. The storage system of claim 59, wherein: the key-value engine includes a cache structure; and the snapshot object contains read locks on at least a portion of the cache structure.

61. The storage system of any one of claims 59 to 60, wherein: the key-value engine includes a write-ahead log containing key-value data; and the snapshot object includes or is stored in memory together with a copy of the key-value data.

62. The storage system of claim 61, wherein: the copy is a sorted, deduplicated copy of the key-value data.

63. The storage system of any one of claims 58 to 62, wherein: the key-value engine is configured to store in a write-ahead log a reference to the root metadata portion and a reference to the updated root metadata portion.

64. The storage system of claim 63, wherein: the key-value engine is configured to traverse the storage structure in response to the second scan request using the reference to the updated root metadata portion stored in the write-ahead log.

65. A storage system, comprising: a key-value engine including: a storage structure comprising nodes, wherein a first node comprises: a first data portion stored in a first type of solid-state memory, a size of the first data portion configured to align with an erasure block size of the first type of solid-state memory, the first data portion configured to store first key-value data; and a metadata portion stored in a second type of solid-state memory, a size of the metadata portion configured to align with a sector size of the second type of solid-state memory, the metadata portion configured to store a first reference to the first data portion and a first filter for the first data portion; and wherein the key-value engine is configured to: read the metadata portion; load the first key-value data using the first reference to the first data portion; generate new data portions using the key-value data and the filter; and write the new data portions to the first type of solid-state memory.

66. The storage system of claim 65, wherein: the size of the metadata portion is an integer multiple of the sector size.

67. The storage system of any one of claims 65 to 66, wherein: the size of the data portion is more than 10 times the size of the metadata portion.

68. The storage system of any one of claims 65 to 67, wherein: the first type of solid-state memory comprises multi-layer flash memory.

69. The storage system of any one of claims 65 to 68, wherein: the first type of solid-state memory and the second type of solid-state memory are the same type of flash memory.

70. The storage system of any one of claims 65 to 69, wherein: loading the first key-value data comprises prefetching the first key-value data in response to reading the metadata portion.

71. The storage system of any one of claims 65 to 70, wherein: the key-value engine loads the first key-value data using a blocking I/O model and implements asynchronous operations using user context switching.

72. The storage system of any one of claims 65 to 71, wherein: writing the new data portions to the first type of flash memory comprises: writing the new data portions to an in-memory ring buffer; and writing, using concurrent, zero-copy asynchronous writes, the new data portions to the first type of flash memory.

73. The storage system of any one of claims 65 to 72, wherein: the key-value engine further includes: a write-ahead log stored in a third type of solid-state memory; the key-value engine is configured to: append batches to the write-ahead log; and generate an update batch using the appended batches; and the new data portions are generated using the key-value data, the filter, and the update batch.

74. The storage system of claim 73, wherein: the third type of solid-state memory comprises at least one of dynamic random-access memory, 3D cross point or phase change storage, spin-transfer torque magnetic random-access memory, or resistive random-access memory.

75. The storage system of claim 73, wherein: the third type of solid-state memory comprises at least one of single-level NAND or multi-level NAND.

76. A system for just-in-time computation, comprising: at least one processor; and at least one non-transitory computer readable medium containing instructions that, when executed by the at least one processor, cause the system to perform operations for just-in-time computation, comprising: storing batches of key-value data in a key-value engine, the key-value data including an absolute key and relative keys for a first key, the relative keys specifying operators; receiving a request for a current value of the first key; and in response to the request: generating a key-value entry for the first key, comprising: retrieving the absolute key and the relative keys for the first key; and combining the absolute key and the relative keys to generate the key-value entry for the first key; and providing a response including the key-value entry for the first key.

77. The system of claim 76, wherein: storing the batches of the key-value data in the key-value engine comprises: storing, using multiple tasks, write requests to a write-ahead log implemented using a ring buffer; and periodically generating a combined batch and flushing the combined batch to a storage structure.

78. The system of any one of claims 76 to 77, wherein: retrieving the absolute key and the relative keys for the first key comprises identifying, using at least one producer task, segments in a storage structure of the key-value engine that contain the first key.

79. The system of claim 78, wherein: identifying the segments in the storage structure comprises: obtaining a metadata portion for a node in the storage structure, the metadata portion containing references to the segments and range information for the segments; and identifying the segments based on the range information.

80. The system of any one of claims 76 to 79, wherein: combining the absolute key and the relative keys to generate the key-value entry for the first key comprises iterative pairwise merging portions of segments in a storage structure of the key-value engine using at least one consumer task.

81. The system of claim 80, wherein: combining the absolute key and the relative keys to generate the key-value entry for the first key further comprises generating the portions by truncating the segments based on a lowest upper bound or greatest lower bound of the segments.

82. The system of any one of claims 76 to 81, wherein: the operators comprise at least one of increment, decrement, sum, divide, multiply, truncate, bit-shift, exponentiate, sign flip, log, absolute value, dot product, cross product, invert, logical, min, or max operators.

83. The system of any one of claims 76 to 82, wherein: the relative values further specify relative key values.

84. The system of any one of claims 76 to 83, wherein: the request specifies a key-range, the key-range including the first key, and the response includes current key-values for keys in the key-range.

The disclosed embodiments further include non-transitory, computer-readable media containing instructions for performing the above methods, and systems configured by such computer-readable media to perform such methods. The disclosed embodiments further include methods performed by the above systems, and computer-readable media containing instructions for configuring such systems to perform such methods.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A data storage system, comprising:
at least one processor; and
at least one non-transitory, computer-readable medium containing instructions that, when executed by the at least one processor, cause the data storage system to implement a key-value engine, wherein:
the key-value engine comprises a storage structure including nodes and leaves, a first node:
including an update buffer containing key-value data; and
having child nodes; and
the key-value engine is configured to:
determine the update buffer satisfies a buffer flush condition, the buffer flush condition being dependent on a height of the first node in the storage structure and a space amplification parameter;
generate, in response to the determination, a batch of key-value data using the update buffer, wherein a size of the batch depends on the height of the first node in the storage structure and the space amplification parameter; and
provide the batch to update a first child node of the child nodes.

2. The data storage system of claim 1, wherein:
the size of the batch decreases as the space amplification parameter increases.

3. The data storage system of claim 1, wherein:
the size of the batch further depends on a height-independent scaling parameter.

4. The data storage system of claim 3, wherein:
the size of the batch decreases as the height-independent scaling parameter decreases.

5. The data storage system of claim 1, wherein:
the size of the batch further depends on a capacity of one of the leaves.

6. The data storage system of claim 1, wherein:
the size of the batch is less than a capacity of one of the leaves.

7. The data storage system of claim 1, wherein:
the first node indicates an amount of key-value data contained in the update buffer and associated with the first child node; and
determining the update buffer satisfies the buffer flush condition comprises determining that the amount of key-value data exceeds a threshold dependent on the height of the first node in the storage structure and the space amplification parameter.

8. A method of configuring a storage system, comprising:
obtaining, by a key-value engine of the storage system, a height-independent scaling parameter;
extracting, in response to satisfaction of a buffer flush condition dependent on a height of a parent node in a storage structure implemented by the key-value engine of the storage system and from an update buffer of the parent node in the storage structure implemented by the key-value engine of the storage system, a first batch of key-value data, wherein a size of the first batch depends on the height-independent scaling parameter; and
providing the first batch of key-value data to a child node of the parent node.

9. The method of claim 8, wherein:
the key-value engine further obtains a space amplification parameter; and
the size of the first batch depends on the space amplification parameter and the height of the parent node in the storage structure.

10. The method of claim 9, further comprising:
updating at least one of the space amplification parameter or the height-independent scaling parameter; and
extracting, from the update buffer, a second batch of key-value data, wherein a size of the second batch depends on the updated at least one of the space amplification parameter or the height-independent scaling parameter; and
providing the second batch of key-value data to a child node of the parent node.

11. The method of claim 10, wherein:

the at least one of the space amplification parameter or the height-independent scaling parameter is updated in response to a change in a workload of the key-value engine.

12. The method of claim 11, wherein:

the change in the workload of the key-value engine comprises a change in a read request rate or write request rate of the storage system.

13. The method of claim 8, wherein:

the size of the first batch further depends on a capacity of a leaf of the storage structure.

14. The method of claim 8, wherein:

the size of the first batch is less than a capacity of a leaf of the storage structure.

15. A data storage system, comprising:

at least one processor; and at least one computer readable medium containing instructions that, when executed by the at least one processor, cause the data storage system to implement a key-value engine comprising:

a storage structure including leaves and multiple levels of nodes, a first node including:

pivots indicating child nodes associated with key ranges, a first pivot indicating a first child node associated with a first key range; and an update buffer configured to store key-value entries; and wherein the key-value engine is configured to:

extract a batch of the key-value entries stored in the update buffer in response to satisfaction of a buffer flush condition dependent on a height of the first node in the storage structure and on a space amplification parameter, the batch including key-value entries within the first key range, a size of the batch depending on the height of the first node in the storage structure and a value of the space amplification parameter; and provide the batch to the first child node.

16. The data storage system of claim 15, wherein:

the size of the batch further depends on a height-independent scaling factor and a data portion size.

17. The data storage system of claim 15, wherein:

the update buffer includes multiple levels, and the key-value engine is further configured to:

insert a first batch into a first level of the multiple levels; or generate a combined batch using the first batch and active key-values stored in the first level and insert the combined batch into a second level of the multiple levels.

18. The data storage system of claim 15, wherein:

the first node further includes pending update amounts corresponding to the child nodes, a first pending update amount corresponding to the first child node; and the key-value engine is further configured to:

update the first pending update amount; and determine that the updated first pending update amount exceeds a size threshold; and the batch is extracted in response to the determination that the updated pending update amount exceeds the size threshold.

19. The data storage system of claim 18, wherein:

the first pending update amount is updated based on a size of the key-value entries within the first key range stored in the update buffer.

20. The data storage system of claim 15, wherein:

the key-value engine is further configured to approximate a specified average batch size by selecting among a set of predetermined batch sizes.

* * * * *

UNITED STATES PATENT AND TRADEMARK OFFICE
CERTIFICATE OF CORRECTION

PATENT NO. : 12,271,625 B1  
APPLICATION NO. : 18/595064  
DATED : April 8, 2025  
INVENTOR(S) : Anthony Paul Astolfi Page 1 of 1

It is certified that error appears in the above-identified patent and that said Letters Patent is hereby corrected as shown below:

On the Title Page

Item (73), in the Assignee, Line 1, "The Math Works, Inc.," should read --The MathWorks, Inc.,--.

Signed and Sealed this  
Eighth Day of July, 2025

Coke Morgan Stewart  
*Acting Director of the United States Patent and Trademark Office*